US011059443B2

(12) United States Patent
Davis

(10) Patent No.: US 11,059,443 B2
(45) Date of Patent: Jul. 13, 2021

(54) OFF-HIGHWAY RECREATIONAL VEHICLE

(71) Applicant: Textron Inc., Providence, RI (US)

(72) Inventor: Hunter Scott Davis, Augusta, GA (US)

(73) Assignee: TEXTRON, INC., Charlotte, NC (US)

( * ) Notice: Subject to any disclaimer, the term of this patent is extended or adjusted under 35 U.S.C. 154(b) by 98 days.

(21) Appl. No.: 16/675,123

(22) Filed: Nov. 5, 2019

(65) Prior Publication Data
US 2020/0156582 A1 May 21, 2020

Related U.S. Application Data

(60) Provisional application No. 62/755,745, filed on Nov. 5, 2018.

(51) Int. Cl.
*B60R 21/13* (2006.01)
*B62D 27/06* (2006.01)

(52) U.S. Cl.
CPC .............. *B60R 21/13* (2013.01); *B62D 27/06* (2013.01); *B60R 2021/134* (2013.01)

(58) Field of Classification Search
CPC . B60R 21/13; B60R 2021/134; B60R 21/131; B60R 2021/137; B62D 27/06; F16B 2200/10
See application file for complete search history.

(56) References Cited

U.S. PATENT DOCUMENTS

| | | |
|---|---|---|
| 2,319,869 A | 5/1943 | Kramer |
| 2,805,887 A | 9/1957 | Selby |
| 3,036,858 A | 5/1962 | Fingerut |
| 3,289,871 A | 12/1966 | La et al. |
| 3,472,550 A | 10/1969 | Marco |
| 3,520,571 A | 7/1970 | Rogers |
| 3,524,674 A | 8/1970 | Medeiros |
| 3,563,401 A | 2/1971 | Gandolfo |
| 3,584,897 A | 6/1971 | Frantz et al. |
| 3,687,484 A | 8/1972 | Cosby |
| 3,933,371 A | 1/1976 | Graham |
| 4,026,597 A | 5/1977 | Miller et al. |
| 4,047,750 A | 9/1977 | Samide |
| 4,249,769 A | 2/1981 | Barecki |
| 4,411,464 A | 10/1983 | Bauer |
| 5,042,835 A | 8/1991 | Burns |

(Continued)

FOREIGN PATENT DOCUMENTS

| | | | |
|---|---|---|---|
| DE | 102010017784 A1 | 1/2012 | |
| DE | 102015107810 A1 * | 11/2016 | ............. B60R 21/13 |

OTHER PUBLICATIONS

LTATV Performance Specification v0.4, 8 pages.

*Primary Examiner* — Paul N Dickson
*Assistant Examiner* — Mary E Young
(74) *Attorney, Agent, or Firm* — Billion & Armitage

(57) ABSTRACT

An off-road vehicle includes a frame, a passenger compartment, a cargo box, and a foldable roll-over protection system (ROPS). The ROPS includes a front ROPS section and a rear ROPS section, wherein in a first position the front ROPS section is folded at least partially into the passenger compartment and the rear ROPS section is folded at least partially into the passenger compartment. In a second position the front ROPS section is connected to the rear ROPS section via interlocking joint components.

20 Claims, 56 Drawing Sheets

(56) References Cited

U.S. PATENT DOCUMENTS

| | | | |
|---|---|---|---|
| 5,954,364 A * | 9/1999 | Nechushtan | B62D 23/005 |
| | | | 280/781 |
| 7,717,495 B2 | 5/2010 | Leonard et al. | |
| 7,735,896 B2 | 6/2010 | Kubota | |
| 7,871,106 B2 | 1/2011 | Leonard et al. | |
| 7,950,486 B2 | 5/2011 | Van Bronkhorst et al. | |
| 7,992,911 B2 | 8/2011 | Naruoka et al. | |
| 8,132,827 B2 | 3/2012 | Bergman et al. | |
| 8,167,072 B2 | 5/2012 | Leonard et al. | |
| 8,205,910 B2 | 6/2012 | Leonard et al. | |
| 8,998,253 B2 | 4/2015 | Novotny et al. | |
| 9,150,182 B1 | 10/2015 | Schlangen et al. | |
| 9,592,782 B2 | 3/2017 | Raska et al. | |
| 9,623,912 B2 | 4/2017 | Schlangen | |
| 9,718,351 B2 | 8/2017 | Ripley et al. | |
| 9,776,481 B2 | 10/2017 | Deckard et al. | |
| 9,789,909 B2 | 10/2017 | Erspamer et al. | |
| 9,884,647 B2 | 2/2018 | Peterson et al. | |
| 10,036,428 B2 | 7/2018 | Doner et al. | |
| 2013/0256050 A1* | 10/2013 | Novotny | B62D 21/12 |
| | | | 180/271 |
| 2014/0117653 A1* | 5/2014 | Deschambault | B60R 21/13 |
| | | | 280/756 |
| 2014/0183906 A1* | 7/2014 | Kaku | B60R 21/13 |
| | | | 296/190.03 |
| 2016/0090057 A1* | 3/2016 | Hirooka | B60N 2/30 |
| | | | 296/190.03 |
| 2016/0339960 A1 | 11/2016 | Leonard et al. | |
| 2017/0028881 A1* | 2/2017 | Proulx | B60N 2/803 |
| 2017/0166255 A1* | 6/2017 | Peterson | B60R 21/13 |
| 2018/0178677 A1* | 6/2018 | Swain | B62D 21/183 |
| 2018/0281722 A1* | 10/2018 | Stuber | B60R 21/13 |
| 2019/0232911 A1* | 8/2019 | Hisamura | B62D 27/02 |
| 2020/0290441 A1* | 9/2020 | Spitsnogle | B60R 21/13 |
| 2020/0346526 A1* | 11/2020 | Cotnoir | B60J 1/085 |
| 2021/0001667 A1* | 1/2021 | Davis | F16D 3/16 |

* cited by examiner

OFF-HIGHWAY RECREATIONAL VEHICLE

RELATED APPLICATION

This application claims benefit of U.S. Provisional Application No. 62/755,745, filed on Nov. 5, 2018 and which application is incorporated herein by reference. A claim of priority is made.

TECHNICAL FIELD

This invention relates generally to recreational vehicles, and in particular to side-by-side off-highway recreational vehicles.

BACKGROUND

Side-by-side recreational off-highway vehicles ("ROVs") are quite capable in a wide variety of riding environments and situations, whether for sport, utility, or military purposes. The ability of the vehicles to carry multiple occupants in a side-by-side seating arrangement makes them socially enjoyable and useful in a number applications. The vehicles can be easy to enter and exit and easy to operate with controls and ergonomics somewhat similar to automobiles. However, unlike most automobiles, ROVs can be driven on harsh off-road terrain. The extent to which such terrain can be accessed depends on multiple factors, including the vehicle width, suspension, turning radius, under-carriage clearance, wheelbase, center of gravity, and power. The arrangement of these aspects and their interrelations can be important in determining the occupant ride characteristics, reliability, ease of maintenance, transportability, and terrain and cargo capabilities of the ROV.

SUMMARY

According to some aspects, an off-road vehicle is provided that includes a foldable roll-over protection system (ROPS) to decrease a total height of the off-road vehicle. In some embodiments, the off-road vehicle includes a frame, a passenger compartment, a cargo box, and a foldable roll-over protection system (ROPS). The ROPS includes a front ROPS section and a rear ROPS section, wherein in a first position the front ROPS section is folded at least partially into the passenger compartment and the rear ROPS section is folded at least partially into the passenger compartment. In a second position the front ROPS section is connected to the rear ROPS section via interlocking joint components.

According to other aspects, the interlocking joint between front ROPS and rear ROPS includes a first interlocking joint component and a second interlocking joint component. The first interlocking joint component may include a first end, a first male component extending away from the first end, and a first female component extending away from the first end. The first male component includes at least a bottom surface, a side surface, and an outer surface, wherein the male component includes a locking feature extending away from the bottom surface of the male component. The first female component extending away from the first end and having at least a top surface and a side surface, wherein a groove/alignment feature is formed within the top surface. Similarly, the second interlocking joint component includes a first end, a second male component extending away from the first end of the second interlocking joint component, and a second female component extending away from the first end. The second male component includes at least a bottom surface, a side surface, and an outer surface, wherein the male component includes a locking feature extending away from the bottom surface of the male component. The second female component includes at least a top surface and a side surface, wherein a groove/alignment feature is formed within the top surface.

In some aspects, the first interlocking joint component is interlocked with the second interlocking joint component by interlocking the first male component with the second female component and the first female component with the second male component, wherein the locking feature of the first male component interlocks with the groove/alignment feature of the second female component and the locking feature of the second male component interlocks with the groove/alignment feature of the first female component.

DETAILED DESCRIPTION

Figure 1:
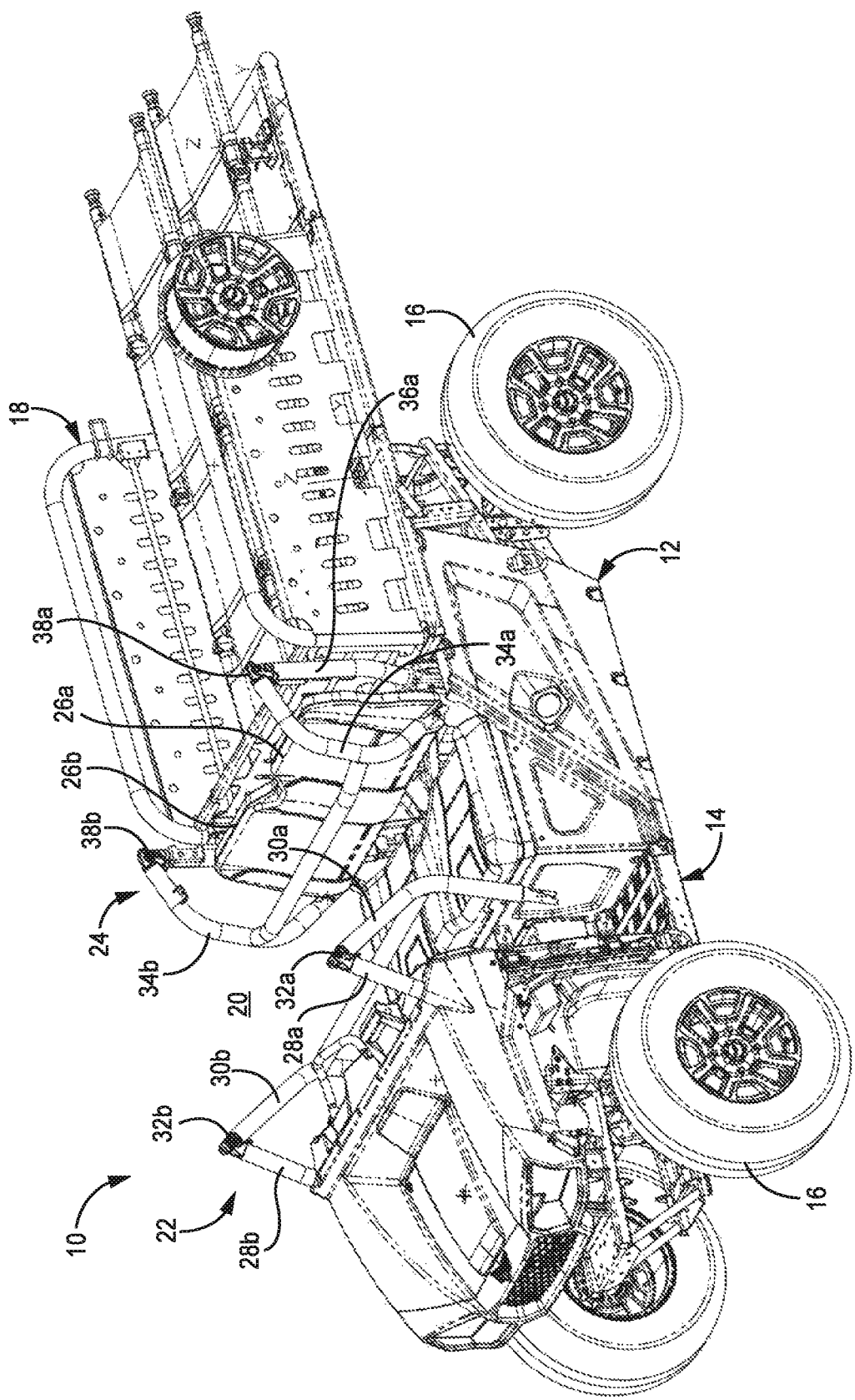
FIG. 1 is a front perspective view of a utility vehicle with the roll-over protection system (ROPS) in a folded stage according to some embodiments.
Figure 2:
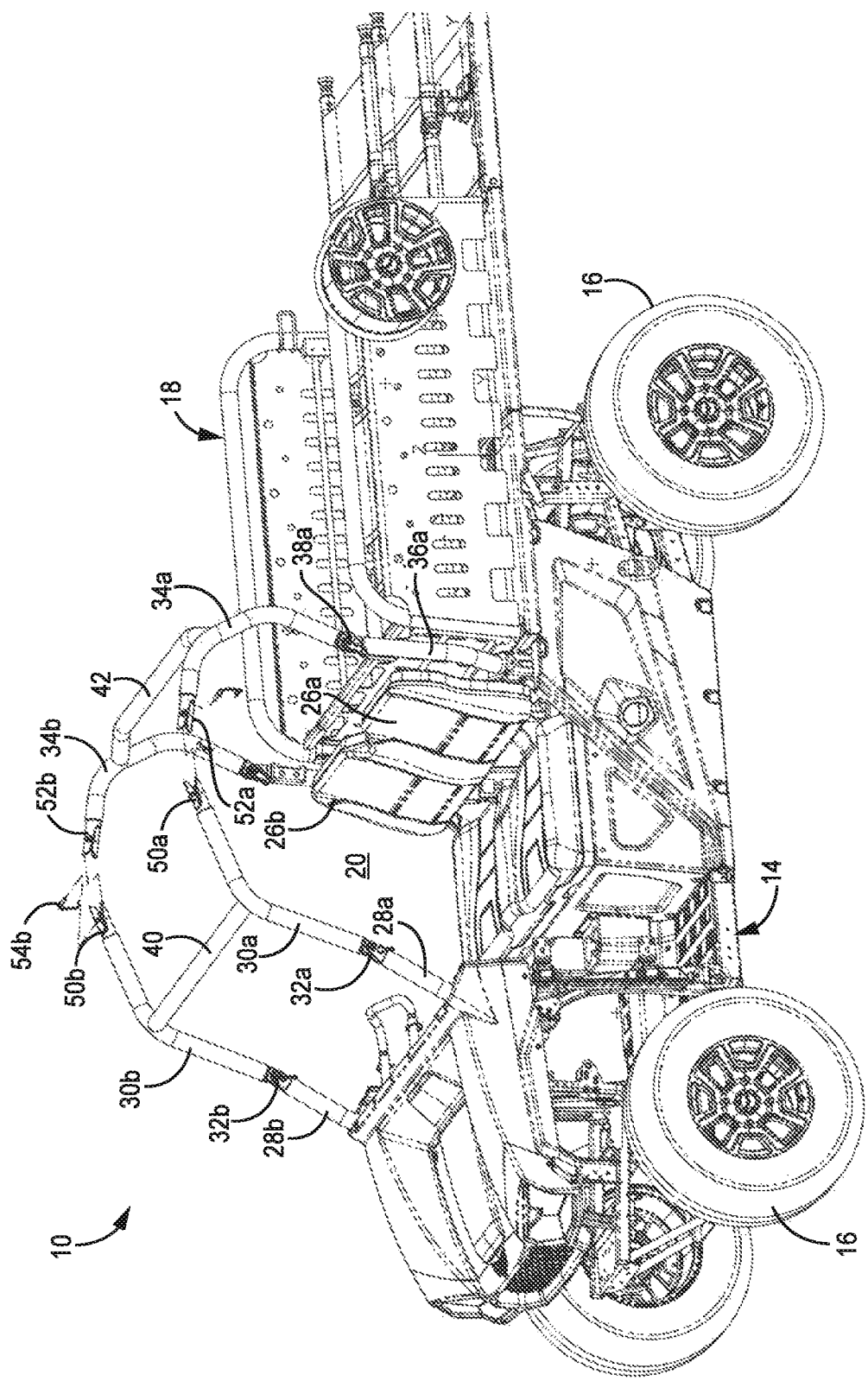
FIG. 2 is a front perspective view of a utility vehicle illustrating interlocking of front ROPS portion and rear ROPS portion according to some embodiments.
Figure 3:
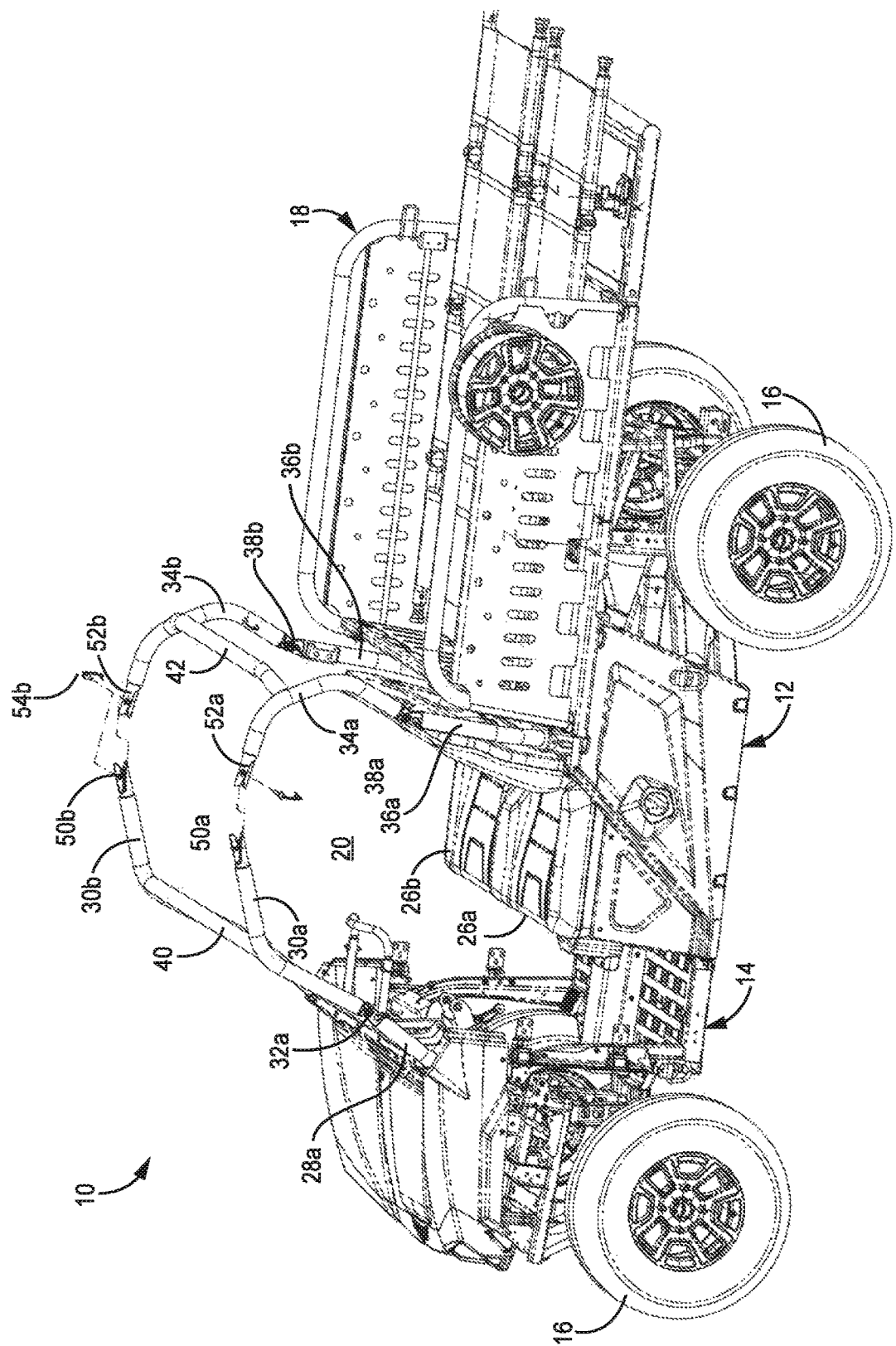
FIG. 3 is a rear perspective view of a utility vehicle illustrating interlocking of front ROPS portion and rear ROPS portion according to some embodiments.
Figure 4:
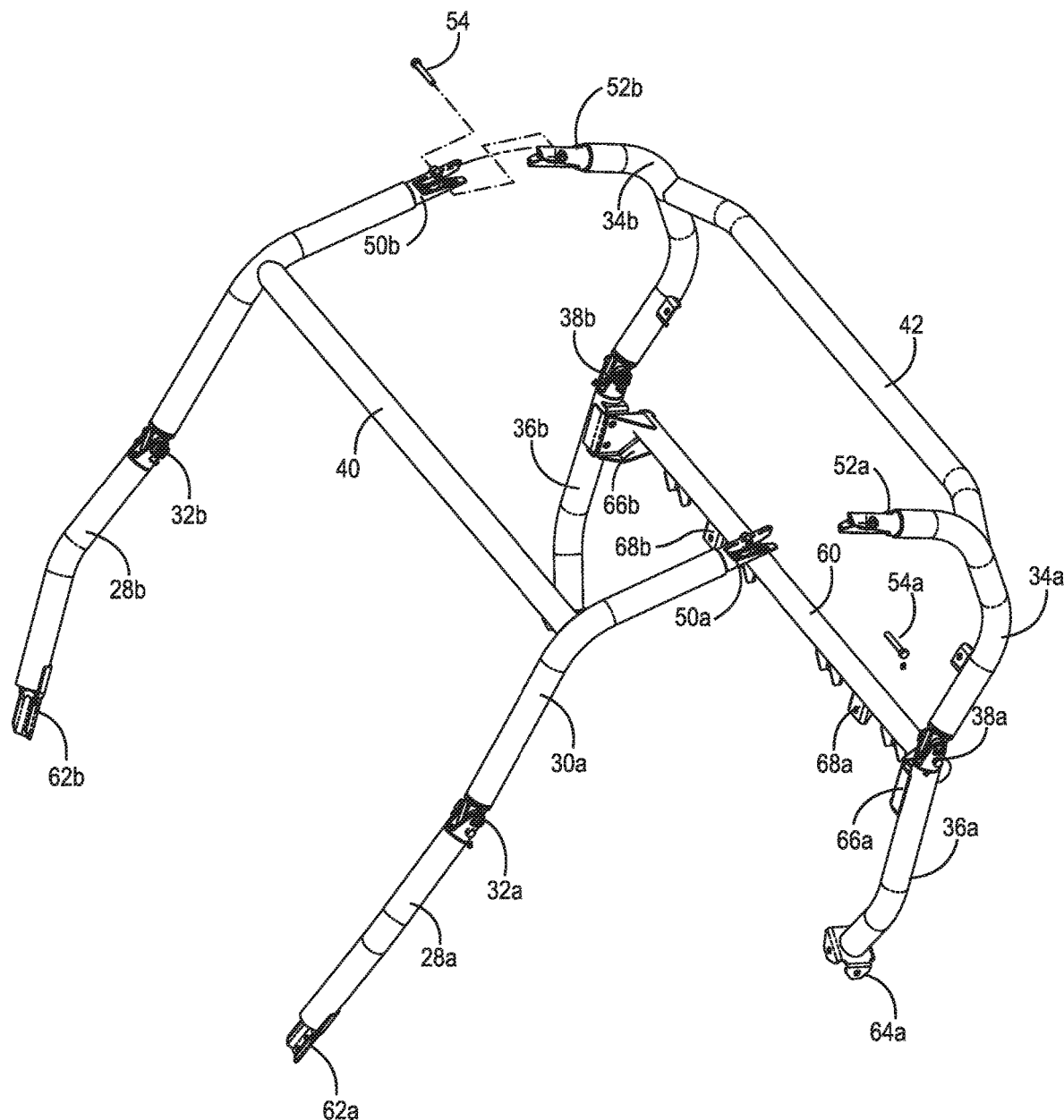
FIG. 4 is perspective view of a ROPS illustrating connection of front ROPS portion and rear ROPS portion according to some embodiments.
Figure 5:
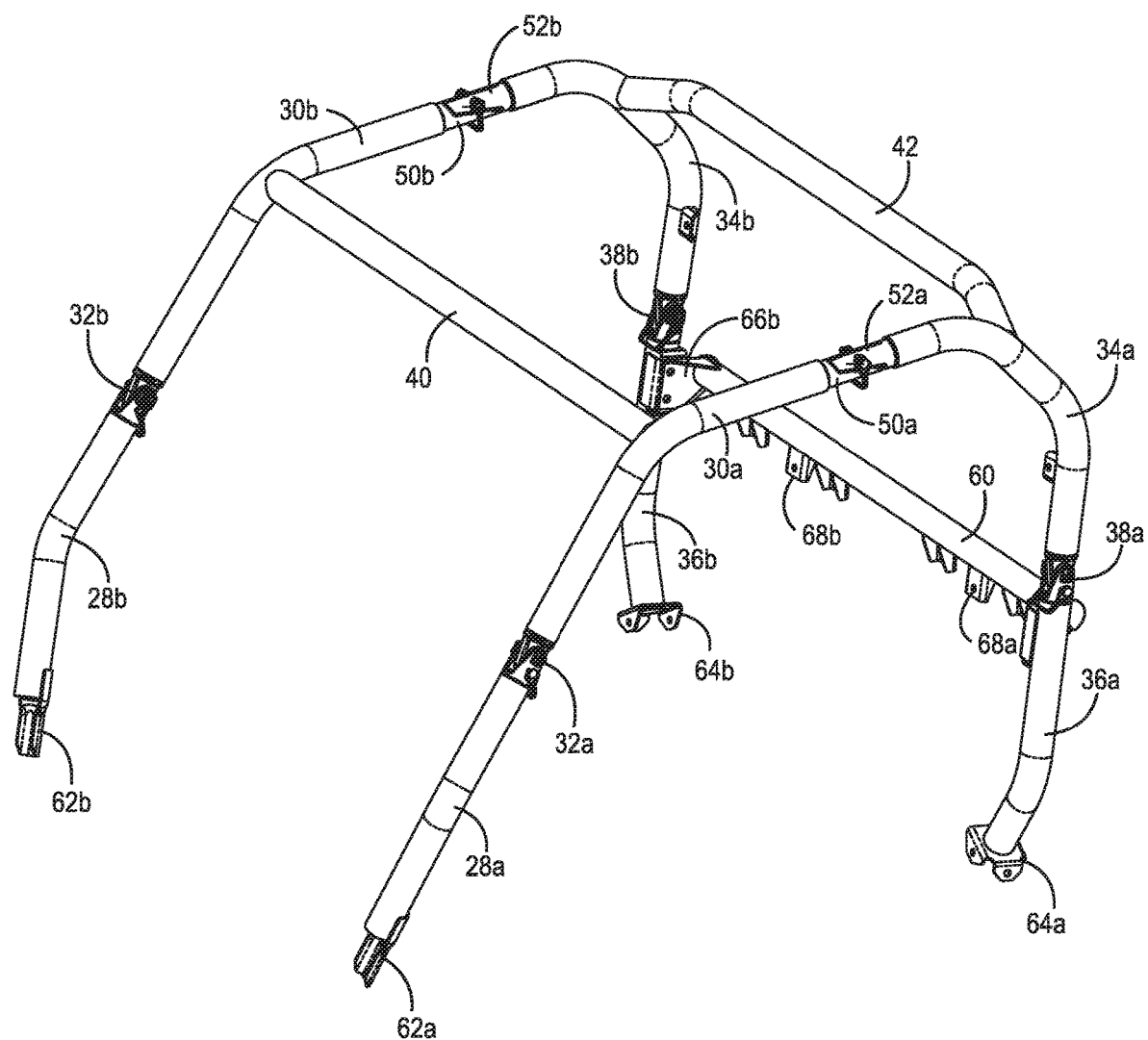
FIG. 5 is perspective view of a ROPS with front ROPS portion and rear ROPS portion connected according to some embodiments.

Referring to FIGS. 1-5, a utility vehicle is illustrated that includes a foldable roll-over protection system (ROPS). In particular, FIG. 1 is a front perspective view of a utility vehicle with the roll-over protection system (ROPS) in a folded stage, FIG. 2 is a front perspective view of a utility vehicle illustrating interlocking of front ROPS portion and rear ROPS portion, and FIG. 3 is a rear perspective view of a utility vehicle illustrating interlocking of front ROPS portion and rear ROPS portion. FIG. 4 is a perspective view of a ROPS that illustrates interlocking of front ROPS portion and rear ROPS portion. FIG. 5 is a perspective view of a ROPS in which front ROPS portion is connected to rear ROPS portion. Reference is made to FIGS. 1-5 in describing the various features visible in these views. Like reference numbers are used throughout. For those components that include an identical or nearly identical (e.g., mirrored) component located on both side of utility vehicle 10, the suffix 'a' is utilized for components located on the driver side and the suffix 'b' is utilized for components located on the passenger side.

As shown in FIGS. 1-3, utility vehicle 10 is comprises a body 12, frame 14, ground-engaging members 16, cargo box 18, seating area 20, and a roll-over protection system (ROPS), which includes front ROPS 22 and rear ROPS 24. In at least some embodiments, utility vehicle 10 includes a cargo carrying portion such as a cargo box 18. As shown in FIGS. 1-3, cargo box 18 is rearward of seating area 20. Body 12 is supported by frame 14, which includes a plurality of structural members (not shown). Structural members comprising frame 14 may be tubular steel or aluminum, stamped sheet metal (e.g., steel, aluminum), hydroformed, cast, forged, or formed in any other suitable manner. The utility vehicle 10 may be 2-wheel or 4-wheel drive. Further, it can have any suitable drive system. In some embodiments, utility vehicle 10 is 4-wheel drive and includes a differential in both the front end and rear end. The differentials can include optional locking differentials or they can be open differentials, which can be manually selectable by an operator or engaged automatically in response to terrain conditions (e.g., wheel slip). In some embodiments, the vehicle has a limited slip differential (e.g., clutch pack, Quaife, Torsen) or any other suitable configuration (e.g., spool).

In the embodiment shown in FIGS. 1-3 seating area 20 includes one or more seats 26a, 26b arranged in a side-by-side configuration. The seats 26a and 26b can include bench seating or bucket seating such as that illustrated in FIGS. 1-3. In other embodiments, however, seating area 20 may utilize a bench seat in a three-abreast configuration or may be arranged in a 60/40 arrangement. Further, in some embodiments, one or more of the seat bottoms and/or seat backs is adjustable. In some embodiments, the driver's seat 26a is adjustable (e.g., forward and back) and one or more of the passenger seats 26b is not adjustable. In some embodiments, both the driver's seat 26a and passenger seat 26b are adjustable. In some embodiments, one or more of the seat bases are adjustable, for example vertically, horizontally, and/or laterally. In some embodiments one or more of the seat back are adjustable, for example vertically, horizontally, and/or laterally. In some embodiments, the seat bases are adjustable, in other embodiments the seat backs, and in other embodiments both the seat bases and the seat backs.

In some embodiments, front foldable ROPS 22 includes front side members 28a, 28b, front foldable members 30a, 30b, front pivot joints 32a, 32b, front lateral member 40 and front interlocking joint component 50a, 50b. Rear foldable ROPS 24 includes rear foldable members 34a, 34b, rear side members 36a, 36b, rear pivot joints 38a, 38b, rear lateral member 42, rear interlocking joint component 52a, 52b. Front side members 28a, 28b are rigidly connected on one end to frame 14 (not visible in this view). In some embodiments, front side members 28a, 28b are pivotally connected to front foldable members 30a, 30b, respectively, via front pivot joints 32a, 32b. As shown in FIG. 1, front pivot joints 32a, 32b allow front foldable members 30a, 30b to be placed in a folded position, which decreases the overall height of the utility vehicle. For example, in some embodiments the front foldable ROPS 22 may be placed in a folded position for transport and/or storage of the utility vehicle 10. Similarly, rear side members 34a, 34b are rigidly connected on one end to frame 14 (not visible in this view). In some embodiments, rear side members 36a, 36b are pivotally connected to rear foldable members 34a, 34b, respectively via rear pivot joints 38a, 38b. As shown in FIG. 1, rear pivot joints 38a, 38b allow rear foldable members 34a, 34b to be placed in a folded position, which decreases the overall height of the utility vehicle. In some embodiments, support members are constructed of 1"-2", round, square, and/or rectangular tubing, typically steel but other materials may also be utilized that provide sufficient durability during a roll-over event.

FIG. 1 illustrates the ROPS in a folded state. In some embodiments, the height of front pivot joints 32a, 32b and rear pivot joints 38a, 38b are selected to be approximately equal to the height of cargo box 18. In this way, the height of the utility vehicle 10 in the folded state is approximately equal to the height of cargo box 18. In some embodiments, the front folded members 30a and 30b extend into the seating area in the region forward of seats 26a, 26b. In some embodiments, the width of the rear folded members 34a, 34b is greater than the width of seats 26a, 26b, but less than the width of housing 12 associated with utility vehicle 10.

FIGS. 2 and 3 illustrate the ROPS in an unfolded state. As shown in FIGS. 2 and 3, front ROPS 22 is coupled to rear ROPS 24 to form a canopy over the region to be utilized by operator—presumably seated in seats 26a, 26b. Front ROPS 22 includes front interlocking joint components 50a, 50b located at the rear end of front foldable members 30a, 30b, respectively. Likewise, rear ROPS 24 includes rear interlocking joint components 52a, 52b located at the front end of rear foldable members 34a, 34b, respectively. As discussed in more detail below with respect to FIGS. 4-14, front interlocking joint component 50a is configured to interlock with rear interlocking joint components 52a to form an interlocked, rigid joint. Likewise, front interlocking joint components 50b is configured to mate with rear interlocking joint components 52b to form an interlocked, rigid joint, thereby connecting the front ROPS 22 to the rear ROPS 24. In some embodiments, front and rear interlocking joint components (e.g., components 50a and 52a) are mirrored components configured to interlock with one another. In some embodiments, front interlocking joint components 50a and rear interlocking joint components 52a are approximately identical in geometry, albeit oriented in opposite directions to allow interlocking between features. Interlocking joint components 50a and 52a interlock with one another to form a secure mechanical connection between the front ROPS 22 and the rear ROPS 24. In some embodiments, front interlocking joint component 50a includes an aperture that aligns with an aperture in rear interlocking joint components 52a, wherein a pin may be inserted and retained with the apertures to secure the connection between interlocking joint components 50a and 52a. In some embodiments, the interlocking joint components 50a, 52a and 50b, 52b allow the ROPS to be assembled and secured without requiring tools. In some embodiments, the interlocking connection joint components 50a, 52a (and 50b, 52b) allow the ROPS to be disassembled/folded without the use of any tools.

Referring now to FIGS. 4 and 5, the ROPS, disengaged from the vehicle, is shown prior to connection and following connection of the front ROPS 22 and rear ROPS 24, respectively. In some embodiments, front side members 28a, 28b include brackets 62a, 62b, respectively, for rigid connection to the frame 12 of utility vehicle 10. Likewise, rear side members 36a, 36b include brackets 64a, 64b, respectively, for rigid connection to frame 12. Rear lateral member 60 extends between rear side members 36a, 36b, and includes brackets 66a, 66b for connection to rear side members 36a, 36b, respectively. In some embodiments, rear lateral member 60 includes one or more brackets 68 for attachment of accessories, such as additional seatbelt straps or accessory mounts. In some embodiments, rear side members 36a, 36b include a pivot type joint 38a, 38b configured to allow rear foldable members 34a, 34b to be pivotally connected to the respective rear side members. In some embodiments, rear lateral member 60 is connected between rear side members 36a, 36b, and therefore does not move when rear foldable member 34a, 34b are pivoted with respect to rear side members 36a, 36b. In some embodiments, rear lateral member 42 is connected between rear foldable members 34a, 34b, and therefore does rotate/move along with rear foldable members 34a, 34b. In some embodiments, the position of rear lateral member 42 is selected to ensure real lateral member 42 clears the seats 26a, 26b when placed in a folded condition.

Referring now to FIGS. 6-10, the interlocking joint components 50a and 52a (and 50b and 52b) are utilized to connect the front ROPS 22 to the rear ROPS 24 is described. For purposes of this discussion, components of front interlocking joint component 50a are designated without the use of a suffix, while components of rear interlocking joint component 52a are designed with a prime suffix ('), although in some embodiments front interlocking joint component 50a may not be identical to rear interlocking joint component 52a.

Figure 6:
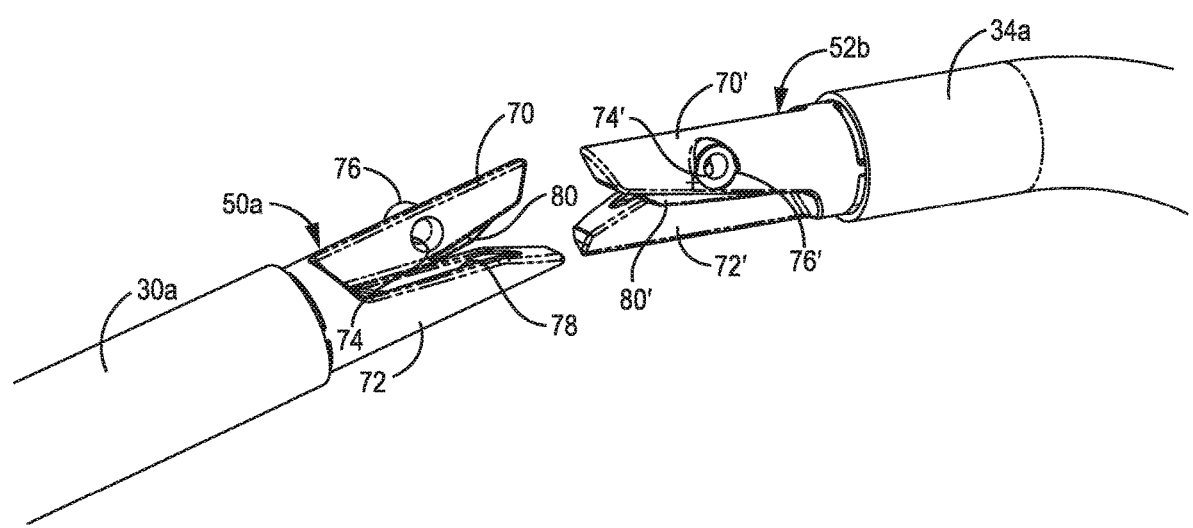
FIG. 6 is a perspective view of the connection joint components utilize to connect the front ROPS portion and the rear ROPS portion according to some embodiments.
Figure 7:
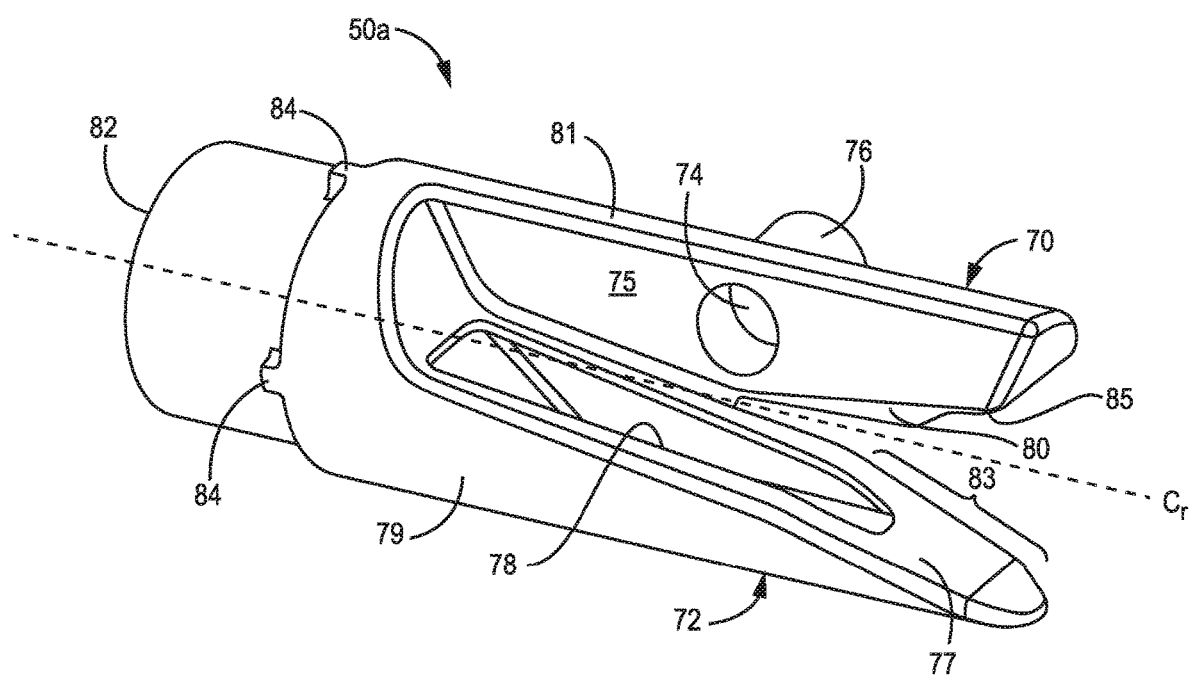
FIG. 7 is a perspective view of one of the interlocking joints according to some embodiments.
Figure 8:
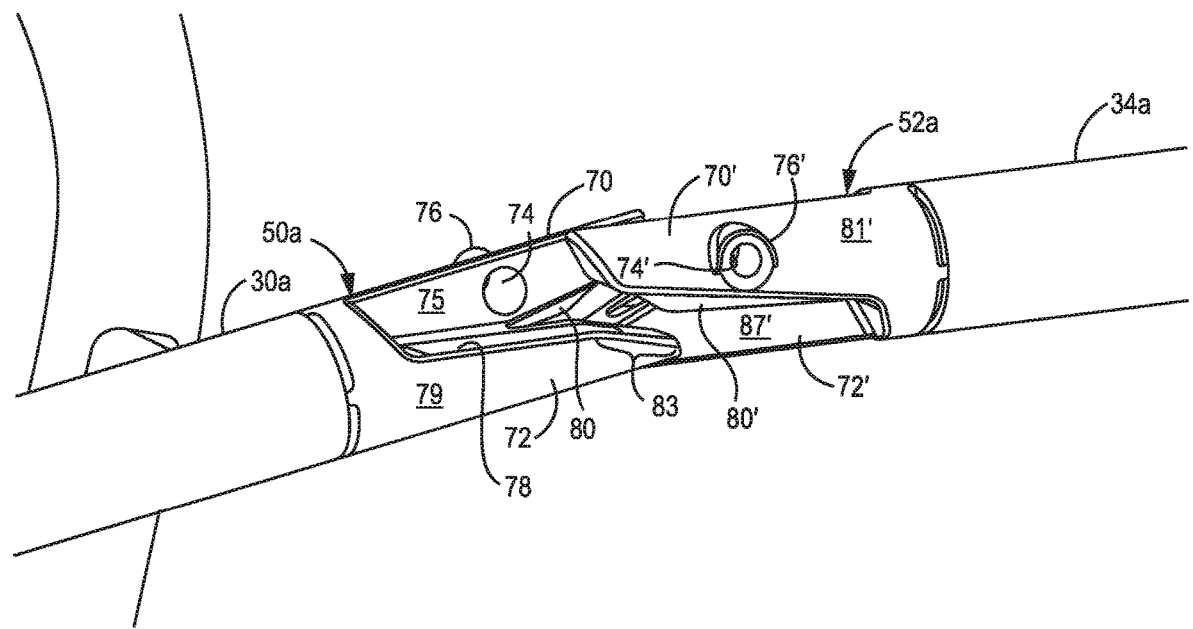
FIG. 8 is a perspective view illustrating the interlocking of the interlocking joint components with one another according to some embodiments.

In the embodiment shown in FIGS. 6 and 7, front interlocking joint component 50a includes a first end 82 configured for mechanical connection to the front foldable member 30a. Likewise, rear interlocking joint component 52a includes a first end 82' configured for mechanical connection to the rear foldable member 34a. A second end opposite the first end 82a includes two finger-like protrusions referred to as a male component 70 and a female component 72. In some embodiments, male component 70 and female component 72 are offset horizontally and vertically from one another relative to a centerline $C_r$ through connection joint 50a (as shown in FIG. 7). For example, in the embodiment shown in FIG. 7, male component 70 is offset horizontally from female component 72 (e.g., male component 70 located on the left side of the centerline and female component 72 located on the right side of the centerline). Similarly, male component 70 is offset vertically from female component 72 (e.g., male component 70 located above female component 72 relative to the centerline). In some embodiments, male component 70 includes an aperture 74 located through the side wall (e.g. side wall 75, visible in FIG. 7) of the male component 70, an alignment feature 76 located on an outer side wall (not visible), and a locking feature 80 extending away from a bottom surface 85 of male component 70. In some embodiments, female component 72 includes a groove/alignment feature 78 formed within a top surface 77 of the second finger 72a.

As shown in FIG. 6, rear interlocking joint component 52a includes the same components as those described with respect to front interlocking joint component 50a. In particular, rear interlocking joint component 52a includes male component 70' and female component 72'. As described above with respect to front interlocking joint component 50a, male component 70' and female component 72' are offset horizontally and vertically from one another relative to a centerline through rear interlocking joint component 52a. For example, in the embodiment shown in FIG. 6, male component 70' is offset horizontally from female component 72' (e.g., male component 70' located on the left side of the centerline and female component 72' located on the right side of the centerline). Similarly, male component 70' is offset vertically from female component 72' (e.g., male component 70' located above female component 72' relative to the centerline). In some embodiments, male component 70' includes an aperture 74' located through the side walls of the male component 70', an alignment protrusion 76' located on an outer side wall 81', and a locking feature 80' extending away from a bottom surface (not visible3) of male component 70'. In some embodiments, female component 72' includes a groove/alignment feature 78' formed within a top surface (not visible) of the female component 72'.

Figure 9:
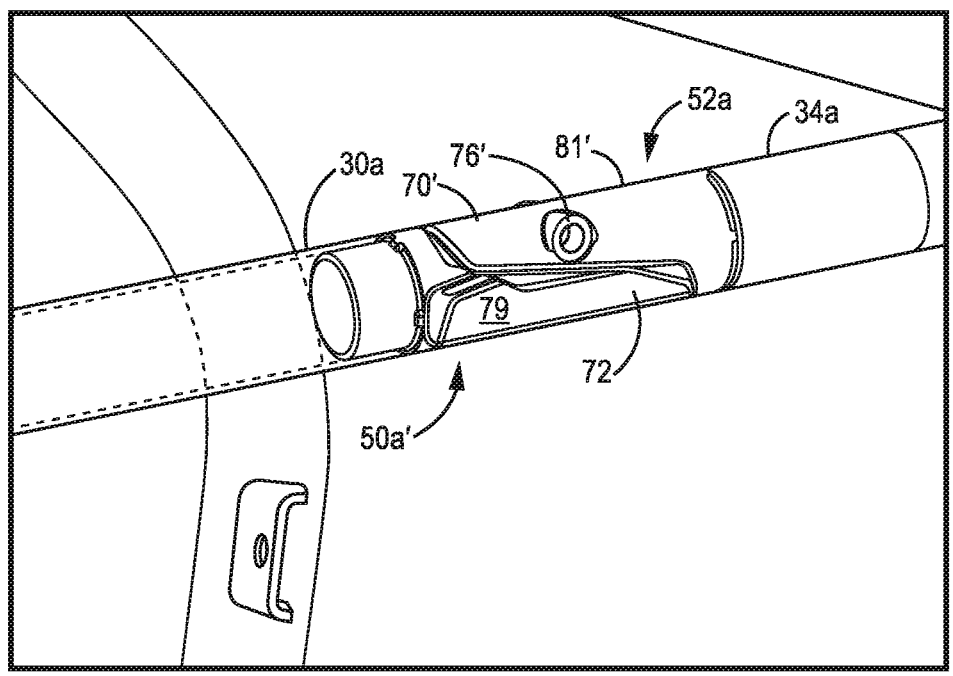
FIG. 9 is a perspective view illustrating the interlocked joint according to some embodiments.
Figure 10:
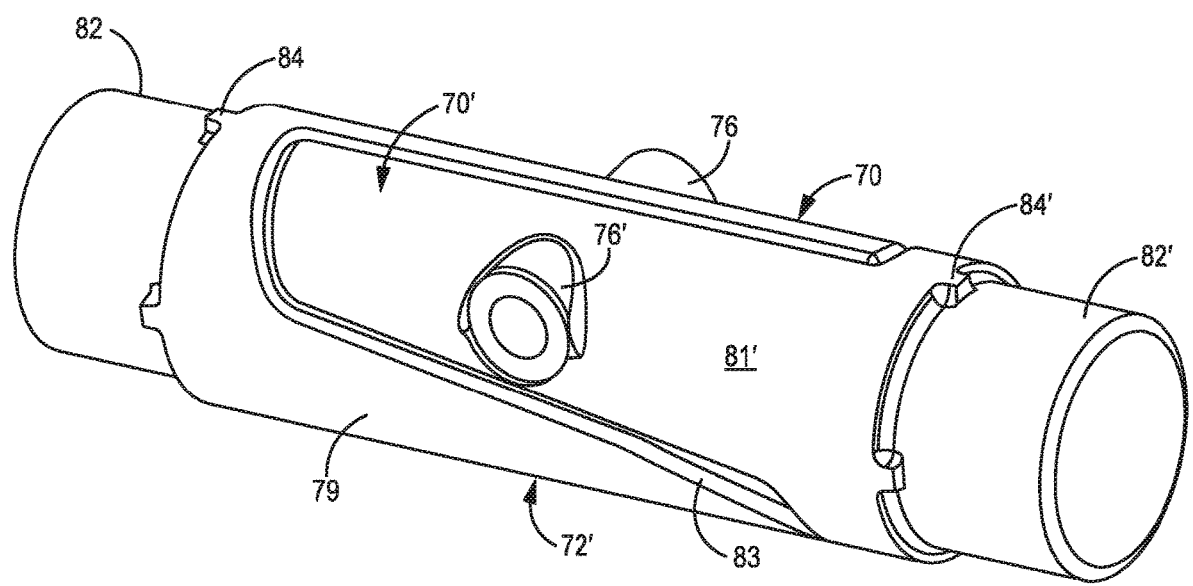
FIG. 10 is a perspective view illustrating the interlocked joint according to some embodiments.
Figure 11:
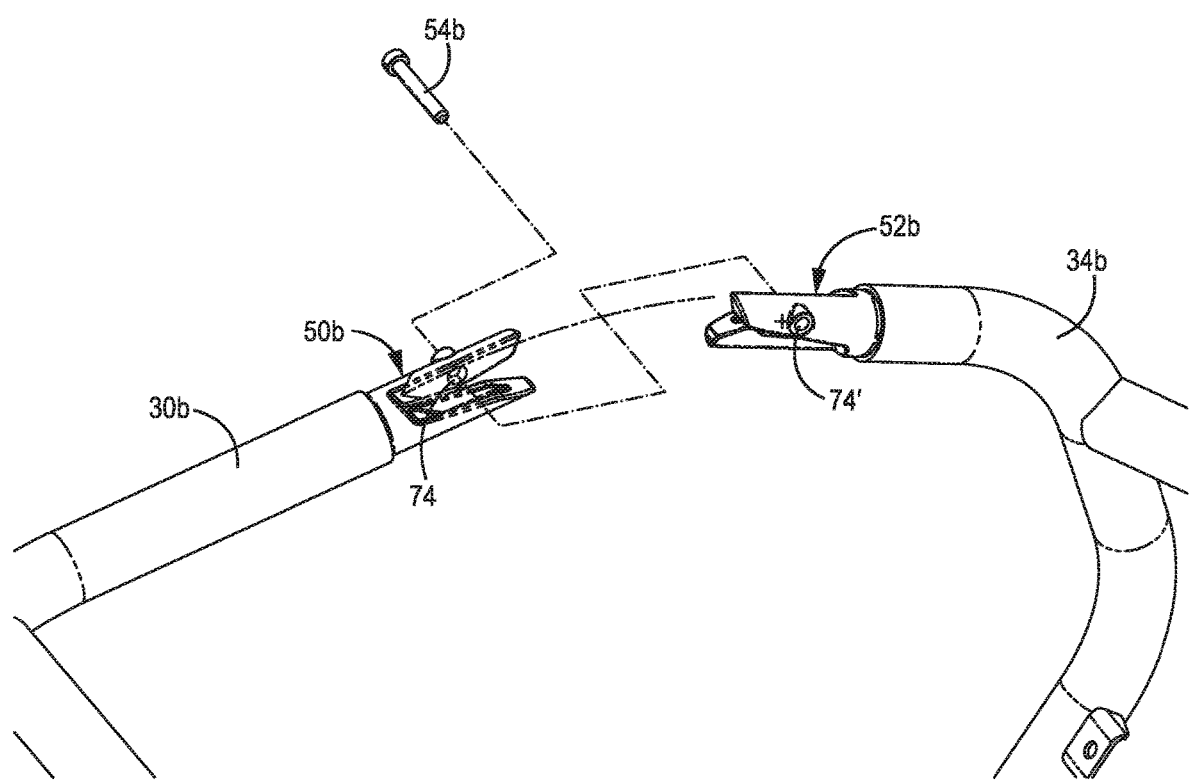
FIG. 11 is a perspective view of a locking mechanism utilized to lock the interlocked joint according to some embodiments.

A mechanical connection between front interlocking joint component 50a and rear interlocking joint component 52a is made by aligning the respective components 50a, 52b and sliding them together such that male component 70 interlocks with corresponding female component 72', and male component 70' interlocks with female component 72. Once interlocked, alignment feature 76 and 76' is utilized to align apertures 74 and 74' (as shown in FIGS. 9 and 10) to ensure the components are correctly positioned. In some embodiments, a locking mechanism 54 can be placed through the respective apertures to secure front interlocking joint component 50a to rear interlocking joint component 52a. As discussed in more detail below, the locking mechanism 54 may be a pin utilized in conjunction with a locking mechanism.

In some embodiments, male component 70—associated with front interlocking joint component 50a—is configured to interact with female component 72' associated with rear interlocking joint component 52a. In particular, the locking feature 80 extending from the bottom surface 85 of male component 70 engages with the groove/alignment feature 78' located on a top surface 77' of female component 72'. In some embodiments, the locking feature 80 is configured to fit within the groove/alignment feature 78'. Similarly, female component 72—associated with front interlocking joint component 50a—is configured to interact with male component 70' associated with connection joint 52a. In particular, the locking feature 80' located on a bottom surface of male component 70' (as shown in FIG. 6) engages with the groove/alignment feature 78 located on a top surface 77 of female component 72. In this way, the male and female components interlock with one another. In some embodiments, additional rigidity is provided by interaction of side surface 75 of male component 70 with side surface 75' of male component 70'. Similarly, in some embodiments inner surface 87 of female component 72 is in contact with inner surface 87' of female component 72' to provide additional rigidity. This interlocking of these features provides mechanical rigidity with respect to compressive forces (e.g., radial forces) likely to be experienced by the joint in operation. To disconnect the interlocking joint, a tensile force is applied to the joint to pull the respective components apart from one another in an arcuate or semi-axial manner (as dictated by the pivot joints). In some embodiments, to prevent a tensile force from causing the interlocking joint to disconnect, a locking mechanism such as a pin 54a is placed through the aligned apertures 74, 74' to lock the respective male components 70, 70' together and provide tensile (e.g., axial) rigidity.

In some embodiments, when interlocked the outer surfaces—including outer surface 81 of male component 70 and outer surface 79 of female component 72 as well as outer surface 81' of male component 70' and outer surface 79 of female component 72'—form a surface that is approximately aligned with the surfaces of forward front foldable member 30a and rear foldable member 34a. Once interlocked, the interlocked joint has an outer radius and surface that is approximately equal to the outer radius and surface of the components being connected together as shown in FIG. 9, giving the appearance of an approximately integral piece.

In some embodiments, the top surface 77 of female component 72 utilizes a ramp geometry to aid in interlocking female component 72 with the corresponding male component 70'. Likewise, the top surface 77' of female component 72' (associated with rear interlocking joint component 52a) may utilize a ramp geometry to aid in interlocking female component 72' with male component 70. This geometry allows the interlocking components—and in particular the locking feature 80'—to slide along the ramp 83 and into the corresponding groove/alignment feature 78 as shown in FIG. 7. In some embodiments, because of the fact that the front foldable member 30a and rear foldable member 34a are connected to other members by pivot joints 32a and 38a, the arc path of the female components 72 and 72'—due to the location relative to the male components 70 and 70'—is shorter than that of male components 70 and 70'. The ramp portions 83 and 83' located on the female components 72 and 72', respectively, allow the male components 70 and 70' to engage and slide along the ramp portions 83, 83'. In some embodiments, the top surface 77, 77' of the female components 72, 72' includes a steep ramp angle associated with ramp portion 83, and a less steep ramp angle over the remainder of the top surface 77 (e.g., in the portion adjacent groove/alignment feature 78. That is, the top surface tends to ramp towards the centerline as the top surface moves towards the first end 82 of the component. In some embodiments, the bottom surface 85 of male component may be angled (as you move toward first end 82) toward the centerline. For example, in the embodiment shown in FIG. 9, the bottom surface of the male component 70' and the top surface of female component 72 and angled or ramped such that they fit together along at least a portion of the length. For example, in the embodiment shown in FIG. 9, a small gap exists between the ramp portion 83 of female component 72 and the bottom surface 80 of male component 70', due to the geometry of ramp portion 83.

In some embodiments, side surface 75 associated with male component 70 is angled towards the centerline $C_r$ as the surface extends closer to first end 82. As a result, male component 70 has a slightly narrower width at the end opposite first end 82. In some embodiments, the angled side surface 75 allows male components 70 and 70' to be slide into position without interfering with one another. In particular, this may be application in situations in which one of the male components 70 or 70' has been bent or damaged slightly.

In some embodiments, rather than align apertures 74 and 74' to ensure alignment with one another during interlocking, the apertures 74 and 74' are mis-aligned slightly. For example, in some embodiments the apertures 74 and 74' are mis-aligned in the axial direction slightly, such that engagement of a pin through the apertures 74 and 74' provides a pre-load of the joint. In some embodiments, pre-loading the joint reduces wear, squeaking, and attrition of the joint as compared with a joint that is not pre-loaded.

Figure 12:
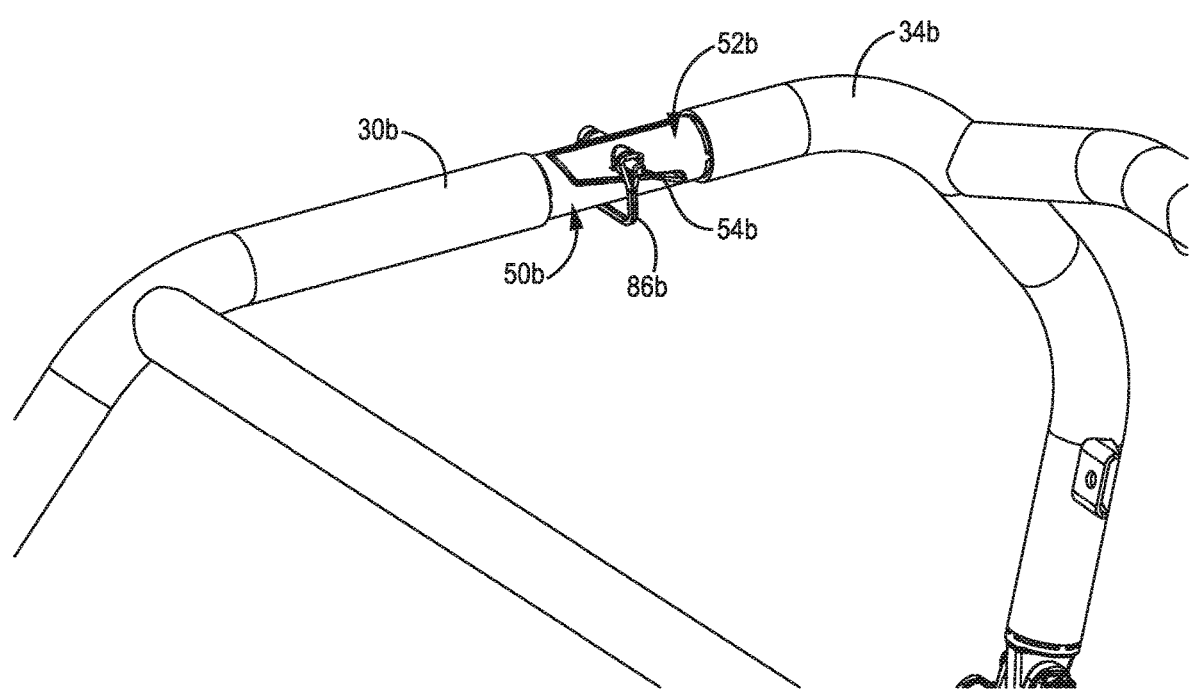
FIG. 12 is a perspective view of the interlocked joint which further includes a capture component to capture a locking pin within the connection joint according to some embodiments.

In some embodiments, such as that shown in FIG. 12, a capture mechanism 86 is utilized to capture pin 54a in the locked position. In some embodiments, the capture mechanism 86 may be implemented using a wire retainer—such as a square or rounded wire retainer—that prevents pin 54a from being removed. In other embodiments, other mechanisms may be utilized to capture the pin once installed.

Figure 13:
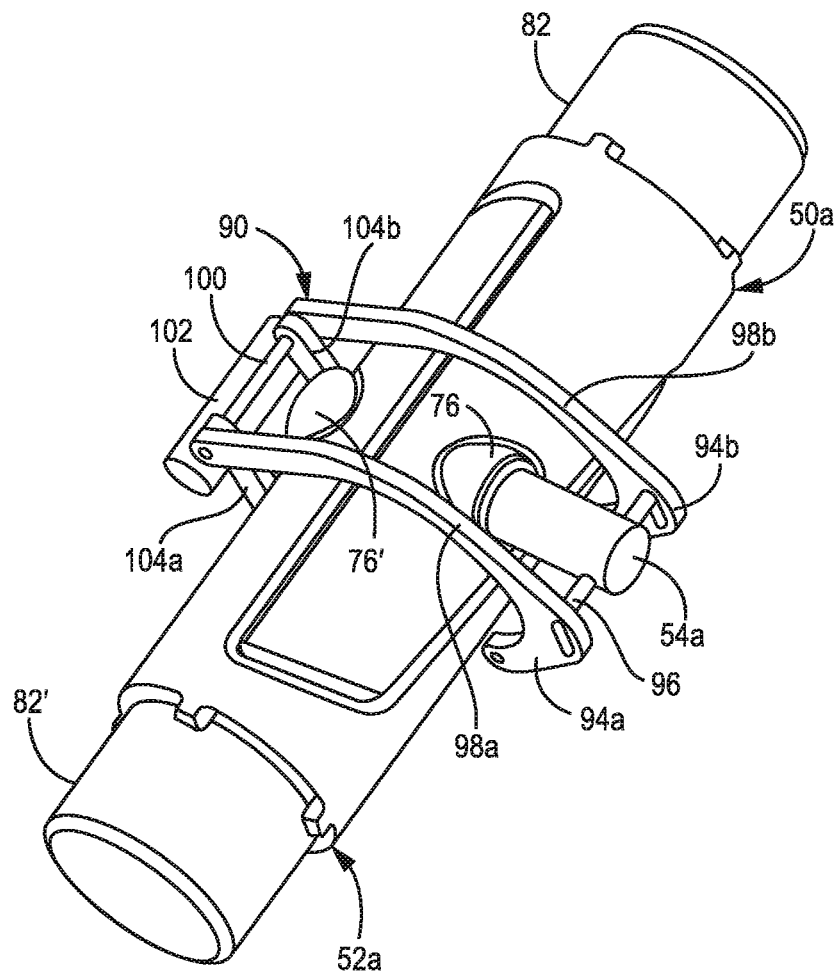
FIG. 13 is a perspective view of the interlocked joint which further includes a mechanical feature for capturing the locking pin within the interlocked joint according to some embodiments.
Figure 14:
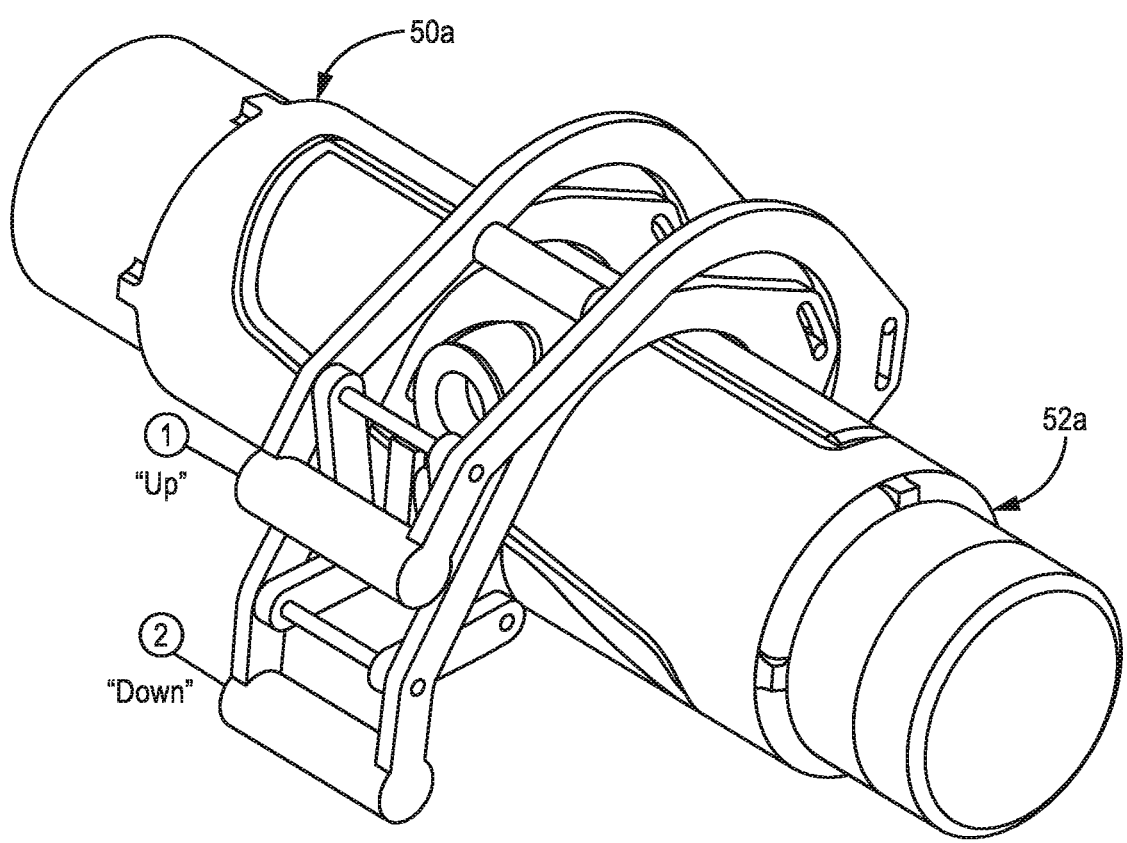
FIG. 14 is a perspective view of the interlocked joint that illustrates operation of the mechanical feature to lock and unlock the locking pin within the interlocked joint according to some embodiments.

Referring now to FIGS. 13 and 14, an over center locking mechanism 90 is utilized to provide a mechanical advantage to insert pin 54a within the respective apertures. The over center locking mechanism 90 may be used to preload an interlocking joint and one more pins positioned to secure the mechanism in place, preventing any accidental or unintentional disengagement. The one or more pins may be further secured, such as by a friction fit, spring loaded detent ball internal to the pin, tethering via braided line, in some embodiments. For example, in some embodiments the over center locking mechanism includes a first pin 92, first and second side members 94a, 94b, each having respective arc slot 96a, 96b for receiving and retaining the first pin 92, first and second arms 98a, 98b extending away from first and second side members 94a, 94b, respectively, second pin 100, handle 102, and pivot arms 104a, 104b. The pin 54a to be inserted into the apertures associated with front interlocking joint component 50a and rear interlocking joint component 52a has an aperture on one end for receiving the first pin 92. In turn, the first pin 92 is captured by the arc slots 96a. 96b located within respective first and second side members 94a, 94b. The arc slots allow the first pin 94 to slide between a first position and a second position. When in the first position (top of the arc slots 96a, 96c), pin 54a is disengaged from the apertures. When in the second position (bottom of the arc slots 96a, 96b) pin 54a is engaged within the aperture.

The mechanical leverage is provided by handle 102, second pin 100, and pivot arms 104a, 104b. For example, FIG. 14 illustrates handle 102 in a first or "up" position and a second or "down" position. When handle 102 is in the "up" position, pivot arms 104a, 104b are approximately vertical and as a result pin 96 is allowed to slide to the top of the arc slots 96a, 96b to move pin 54a out of engagement with the apertures in the first and second fingers. As shown in FIG. 14, as handle 102 is moved into the "down" position, pivot arms 104a, 104b provide a lever and therefore mechanical advantage for pushing the pin 54a into the respective apertures. As handle 102 moves downward, pivot arms 104a, 104b push against the side of the connector and move from an approximately vertical position to a horizontal position. This causes the mechanism holding first pin 96 to push pin 54a into the respective apertures. As pin 54a is engaged, the first pin 92 slides along the arc slots 96a, 96b to the bottom position (as shown in FIG. 14).

A benefit of the over center locking mechanism 90 shown in FIGS. 13 and 14 is that it allows the pin 54a to be inserted into aligned (or slightly misaligned) apertures in the respective first and second fingers without requiring the use of tools to insert or remove the pin from the apertures.

Figure 15:
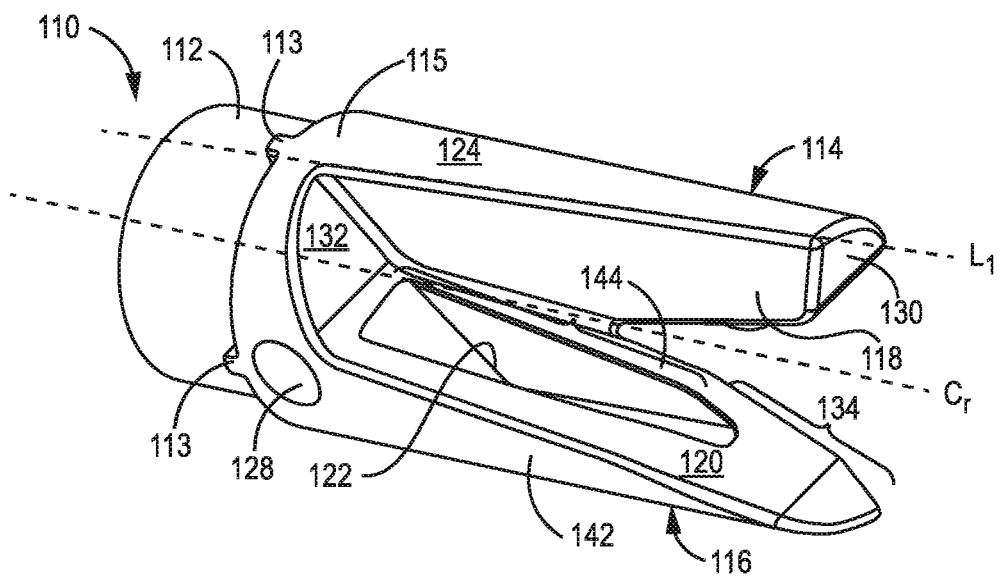
FIG. 15 is a perspective view of an interlocking joint component according to some embodiments.
Figure 16:
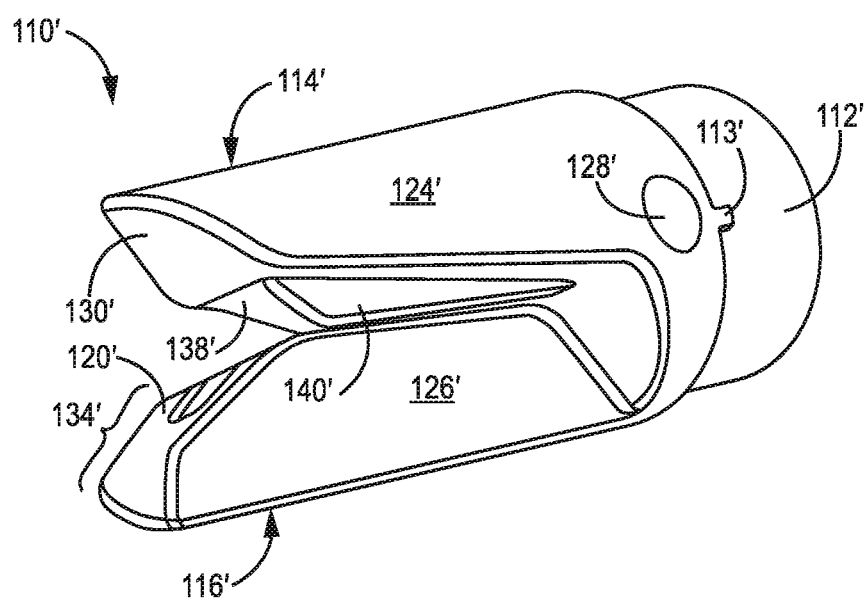
FIG. 16 is a perspective view of the interlocking joint component shown in FIG. 15 according to some embodiments.
Figure 17:
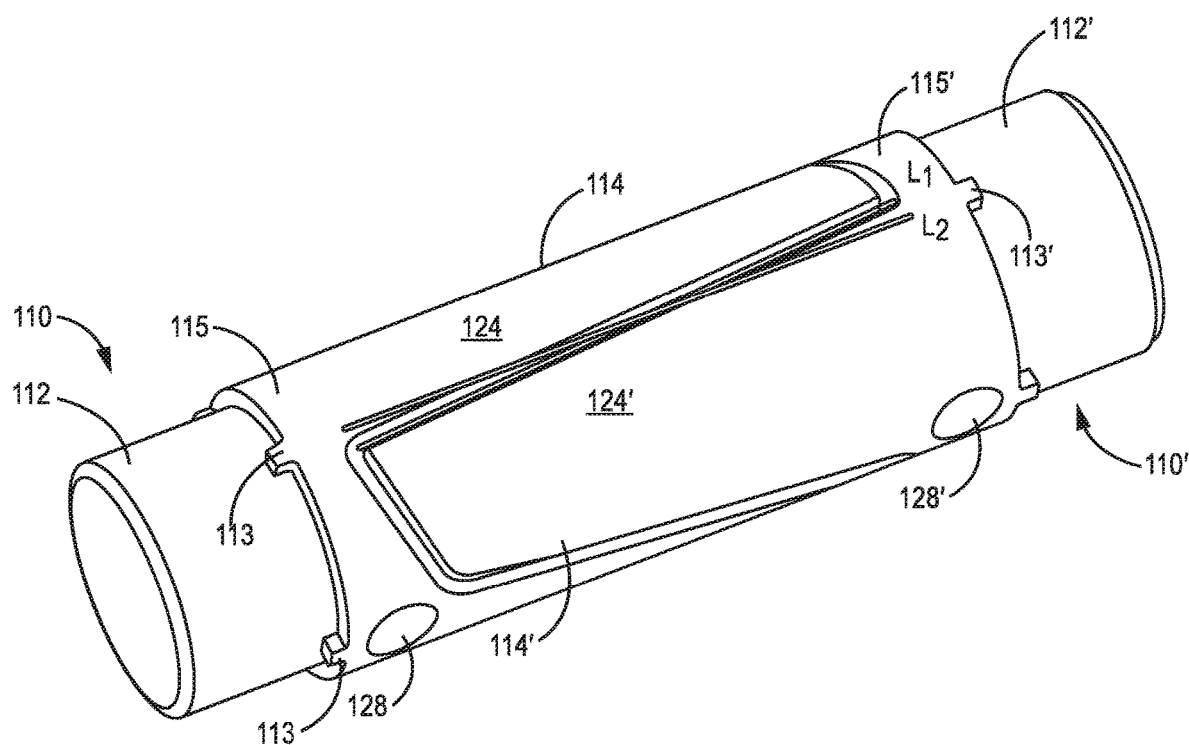
FIG. 17 is a perspective view illustrating the interlocked joint according to some embodiments.

Referring now to FIGS. 15-17, a connection joint component 110 is provided in FIG. 15, a complimentary connection joint component 110' is provided in FIG. 16, and the interlocking of connection joint component 110 and 110' is shown in FIG. 17. In some embodiments, connection joint component 110 and connection joint component 110' share the same features. For purposes of this discussion, when referring to features associated with connection joint component 110, no suffix will be provided, but the same features associated with connection joint component 110' will be identified using the prime suffix ('). The feature is described with respect to the Figure in which the feature is visible, but it is understood that the feature is associated with the components shown in FIGS. 15-17.

As described above, connection joint 110 includes a first end 112, a male component 114 and a female component 116. In some embodiments, the first end 112 is cylindrical in geometry and is configured to be received with the front or rear foldable member to which it is attached. Adjacent to the first end 112 is base portion 115, having a larger radius than first end 112 and including protrusions 113 for securing the connection joint 110 to either the front or rear foldable member. Male component 114 and female component 116 extend away from base portion 115. An inner surface 132 of base portion 115 is located adjacent to male component 114 and female component 116.

As discussed above, the male component 114 includes an inner surface 118, an outer surface 124, an end surface 130, and a bottom surface 138 (shown in FIG. 16), wherein a locking feature 140 extends away from the bottom surface 138. Female component 116 includes an inner surface 126 (shown in FIG. 16), a top surface 120, an outer surface 142, and an end/ramp portion 134, wherein the top surface 120 includes a groove/alignment feature 122 configured to receive the locking feature 140' associated with a complimentary male component 114' (shown in FIG. 17, for example).

In some embodiments, the width of male component 114 narrows as the component extends away from first end 112. For example, inner surface is maintained as a planar surface, but is angled towards the centerline $C_r$ as the surface moves towards the first end 112. This angle associated with inner surface 118 is illustrated by the line $L_1$ as shown in FIG. 15, and is contrasted with a straight line $L_2$ shown in FIG. 17. One example benefit of this geometry is that during interlocking, the end portion 130 of male component 114 will not interfere the end portion 130' of male component 114' as the connection joints 110 and 110' are brought into contact. This may be beneficial if during use one of the connection joints is bent or otherwise damaged, allowing the connection joints to be interlocked despite the damage.

In the embodiment shown in FIGS. 15-17, the angle of inner surface 118 of male component 114 is configured to align with the inner surface (not visible in FIG. 17) of male component 114', as shown in FIG. 17. In some embodiments, the inner surface 126 of female component 116 may be similarly angled and configured to align with the inner surface 126' of female component 116'. Once engaged fully, the inner surfaces of the respective components 114, 114' (as well as the inner surfaces 126, 126' of female components 116, 116', respectively) are engaged with one another to provide a secure fit between the respective components. In addition, the end surface 130 is configured to engage with the inner surface 132' of the opposite joint component 110'.

In some embodiments, female component 116 utilizes a geometry that aids in interlocking the respective components. For example, in some embodiments the height of female component 116 decreases as the component extends away from base portion 115. In some embodiments, the decrease in height is linear along the entire length of female component 116. In other components, the height of female component 116 is flat or linear for a first distance, and then decreases at a greater rate toward the end of female component 116. For example, in the embodiment shown in FIG. 15, the height of female component 116 decreases at a first angle for a first portion 144 of female component 116, and then at a second angle or rate for end portion 134. In some embodiments, the second angle is steeper than the first angle, creating a ramp-like geometry at the end of female component 116. As discussed above, a benefit of providing a ramp geometry on the bottom component (in this case, the female component 116), is that the arc path of the bottom components is steeper or greater than the arc path of the top components (in this case the male components 114). The ramp geometry of end portion 134 makes it easier for interlocking between respective male component 114' and female component 116 along the arc path defined by the pivot joints.

Interlocking of connection joint 110 and 110' as shown in FIG. 17 brings into engagement a number of surfaces. For example, end portion 130 will engage with inner surface 132' of base portion 115' (associated with joint component 110'). Similarly, inner surface 118 of male component 114 engages with inner surface 118' of male component 114'. Inner surface 126 of female component 116 engages with inner surface 126' of female component 116'. Bottom surface 138 of male component 114 engages with top surface 120' of female component 116', and locking feature 140 of male component 114 engages with the groove/alignment feature 122' of female component 116'. Similarly, bottom surface 138' of male component 114' engages with top surface 120 of female component 116, and locking feature 140' of male component 114' engages with the groove/alignment feature 122 of female component 116. In some embodiments, the outer surfaces 124, 124' of male components 114, 114' and the outer surfaces 142, 142' of female components 116, 116' form an outer surface having a radius approximately equal to the radius of base portion 115 (as shown in FIG. 17).

In some embodiments, aperture 128 is formed in base portion 115 and aperture 128' is formed in base portion 115'. This is in contrast with other embodiments, in which the aperture was formed through the male component and aligned with the aperture on the opposite male component. In this embodiment, aperture 128 located on connection joint component 110 and aperture 128' located on connection joint component 110' do not align with one another even during interlocking. In some embodiments, each aperture 128, 128' is configured to receive a locking pin (not shown), wherein a locking mechanism is secured to the respective locking pins to provide tensile rigidity to the interlocking joint.

Figure 18:
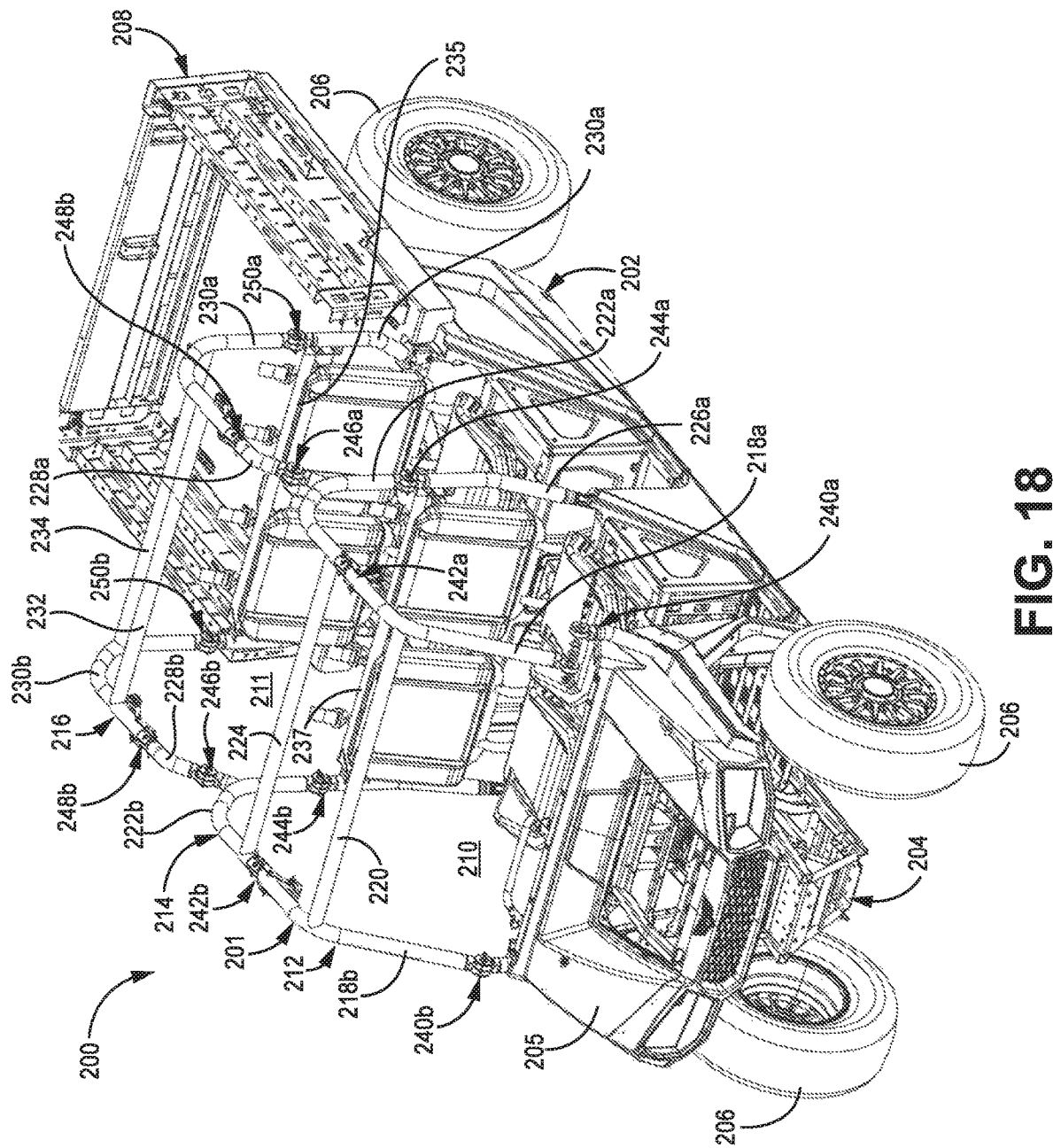
FIG. 18 is a front perspective view of a utility vehicle illustrating interlocking of the various roll-over protection system (ROPS) portions according to some embodiments.
Figure 19:
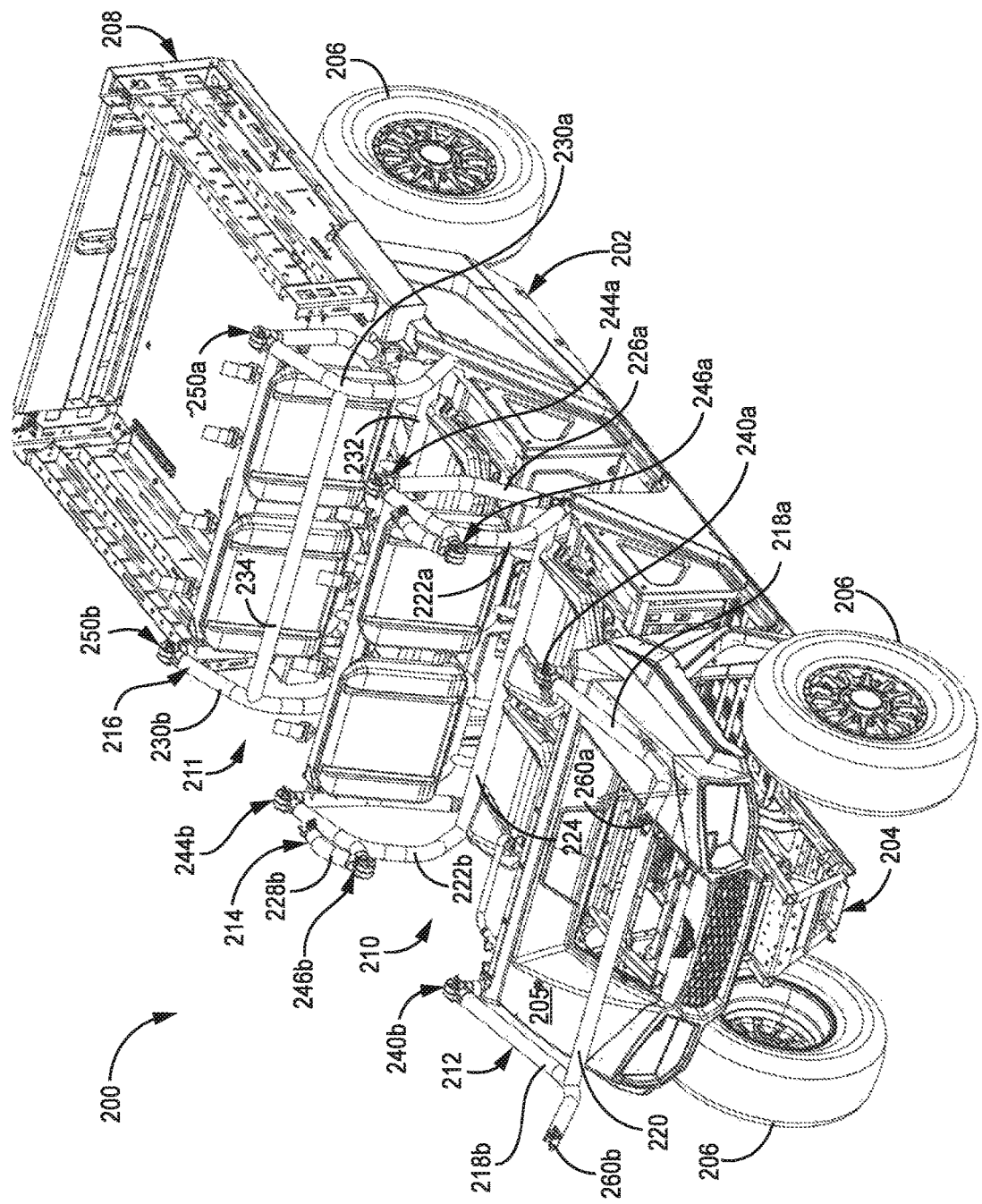
FIG. 19 is a front perspective view of a utility vehicle with the roll-over protection system (ROPS) in a folded stage according to some embodiments.
Figure 20:
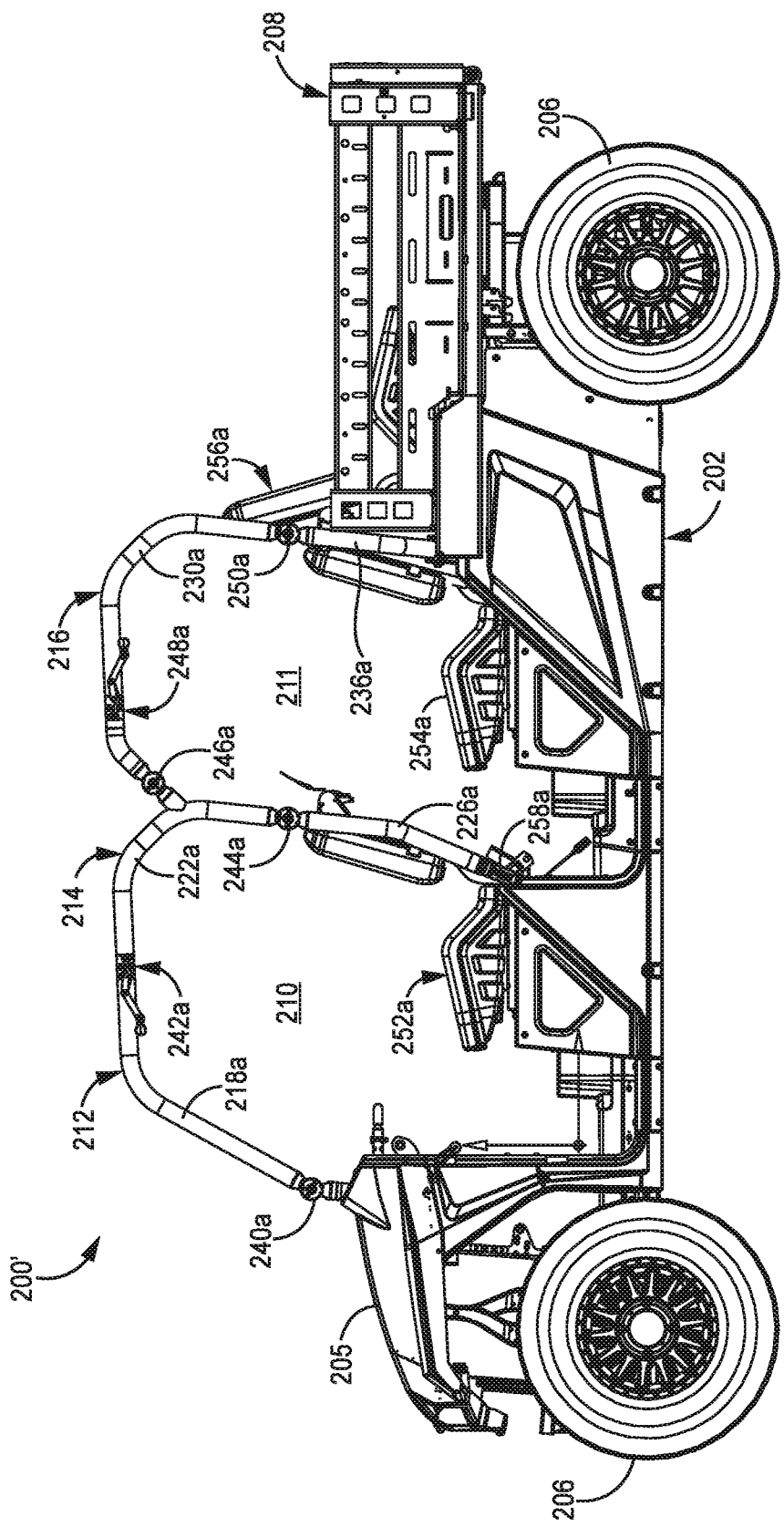
FIG. 20 is a side view of a utility vehicle illustrating interlocking of the various ROPS portions according to some embodiments.
Figure 21:
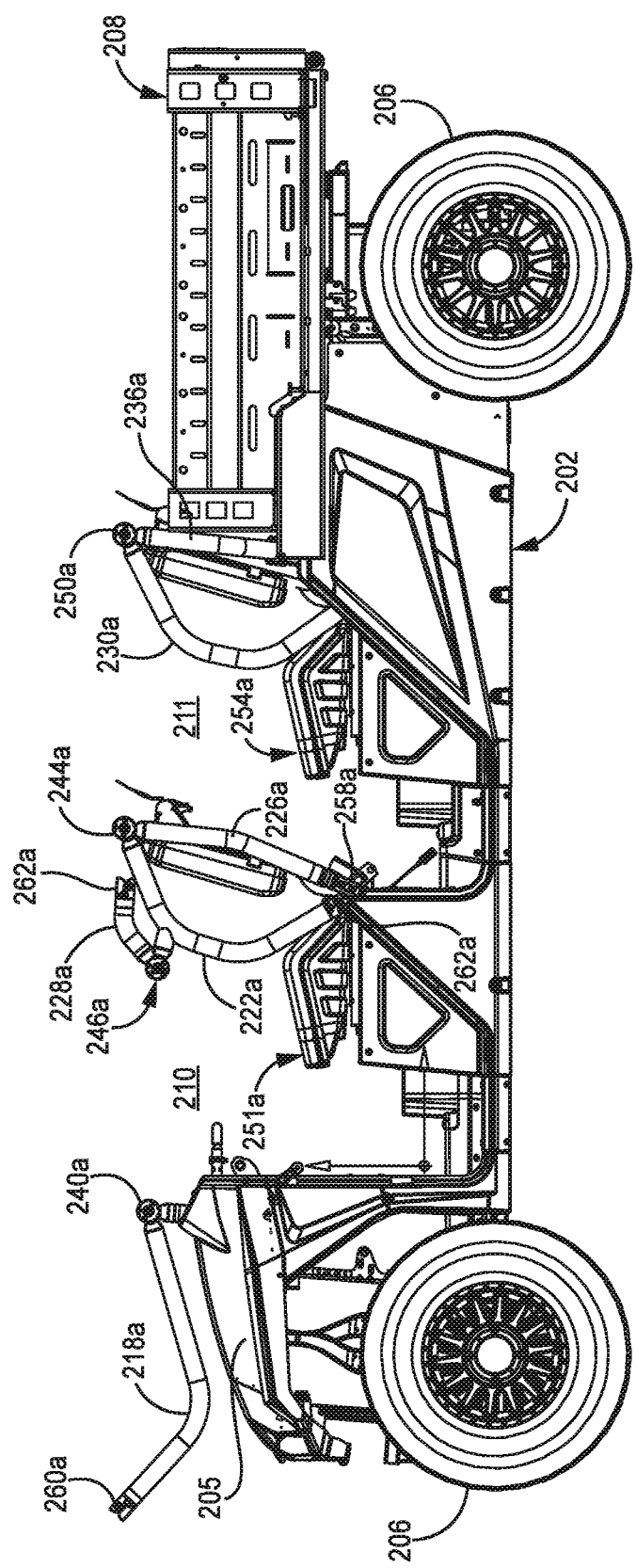
FIG. 21 is a side view of a utility vehicle with the roll-over protection system (ROPS) in a folded stage according to some embodiments.

Referring to FIGS. 18-33, a utility vehicle 200 is illustrated that includes a foldable roll-over protection system (ROPS) 201. In particular, FIGS. 18 and 20 are front perspective and side views, respectively, of the utility vehicle 200 with the ROPS 201 in the interlocked or installed position, FIGS. 19 and 21 are front and side views, respectively, of the utility vehicle 200 with the ROPS 201 in the folded position. Reference is made to FIGS. 18-21 in describing the various features visible in these views. Like reference numbers are used throughout. For those components that include an identical or nearly identical (e.g., mirrored) component located on both side of utility vehicle 10, the suffix 'a' is utilized for components located on the driver side and the suffix 'b' is utilized for components located on the passenger side.

As shown in FIGS. 18-33, utility vehicle 200 is comprises a ROPS 201, a body 202, frame 204, ground-engaging members 206, cargo box 208, and one or more seating areas 210 and 211. In some embodiments, the ROPS 201 comprises a plurality of sections that can be disengaged from one another and folded to decrease the overall height of the vehicle. In the embodiment shown in FIGS. 18-22, the ROPS 201 includes a first ROPS portion 212, a second ROPS portion 214 and a third ROPS portion 216. In some embodiments, the first ROPS portion 212 is configured to interlock with the second ROPS portion 214, and second ROPS portion 214 is configured to interlock with both the first ROPS portion 212 and the third ROPS portion 216, wherein first ROPS portion 212 is located forward of the other ROPS portions and third ROPS portion 216 is located rearward of the other ROPS portions. In at least some embodiments, utility vehicle 10 includes a cargo carrying portion such as a cargo box 208. As shown in FIGS. 18-21, cargo box 208 is rearward of seating area 210 and 211. Body 202 is supported by frame 204, which includes a plurality of structural members (not shown). Structural members comprising frame 204 may be tubular steel or aluminum, stamped sheet metal (e.g., steel, aluminum), hydroformed, cast, forged, or formed in any other suitable manner. The utility vehicle 200 may be 2-wheel or 4-wheel drive. Further, it can have any suitable drive system. In some embodiments, utility vehicle 200 is 4-wheel drive and includes a differential in both the front end and rear end. The differentials can include optional locking differentials or they can be open differentials, which can be manually selectable by an operator or engaged automatically in response to terrain conditions (e.g., wheel slip). In some embodiments, the utility vehicle 200 has a limited slip differential (e.g., clutch pack, Quaife, Torsen) or any other suitable configuration (e.g., spool).

In the embodiment shown in FIGS. 18-21 seating area 210 includes one or more seats 252a and 252b arranged in a side-by-side configuration, and seating area 211 includes one or more seats 254a and 254b arranged in a side-by-side configuration. The seats 252a, 252b, 254a, and 254b can include bench seating or bucket seating such as that illustrated in FIGS. 18-21. In other embodiments, however, seating areas 210 and 211 may utilize a bench seat in a three-abreast configuration or may be arranged in a 60/40 arrangement. Further, in some embodiments, one or more of the seat bottoms and/or seat backs is adjustable. In some embodiments, the driver's seat 252a is adjustable (e.g., forward and back) and one or more of the passenger seats 252b, 254a, and/or 254b is not adjustable. In some embodiments, both the driver's seat 252a and passenger seats 252b, 254a, and 254b are adjustable. In some embodiments, one or more of the seat bases are adjustable, for example vertically, horizontally, and/or laterally. In some embodiments one or more of the seat back are adjustable, for example vertically, horizontally, and/or laterally. In some embodiments, the seat bases are adjustable, in other embodiments the seat backs, and in other embodiments both the seat bases and the seat backs.

Figure 22:
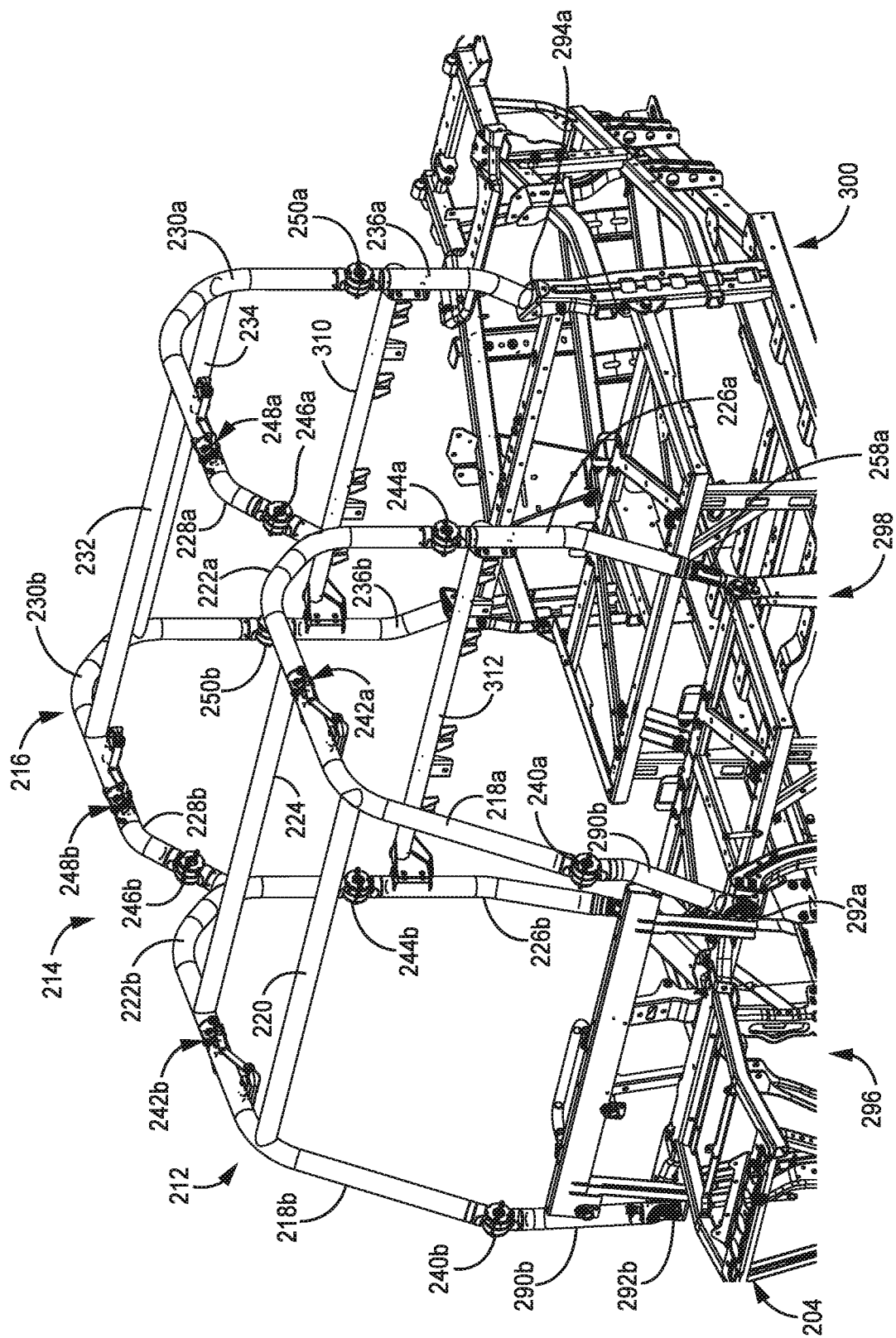
FIG. 22 is a front perspective view of the ROPS connected to the utility vehicle frame according to some embodiments.
Figure 39:
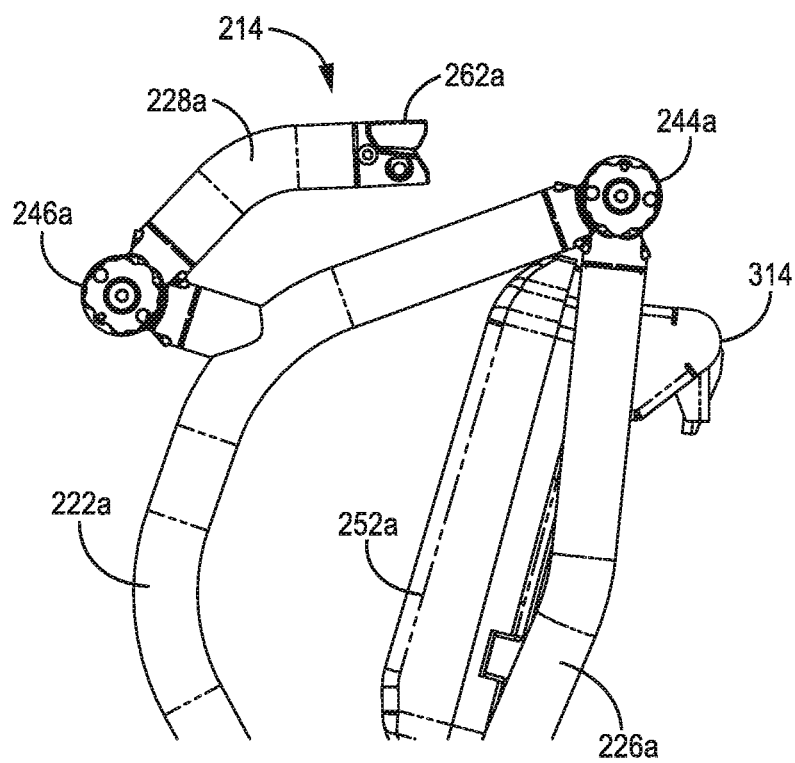
FIG. 39 illustrates a partial side view of second ROPS portion, including a seat backrest, according to some embodiments.
Figure 41A:
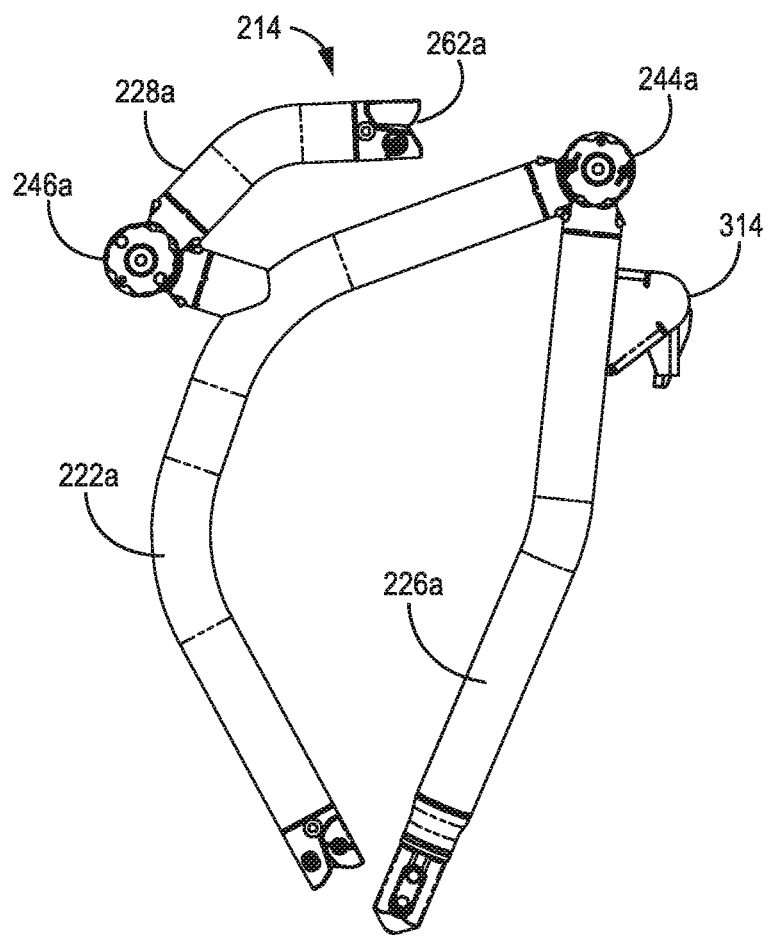
FIGS. 41A-B illustrate a side view (41A), and top view (41B) of first ROPS portion, according to some embodiments.
Figure 41B:
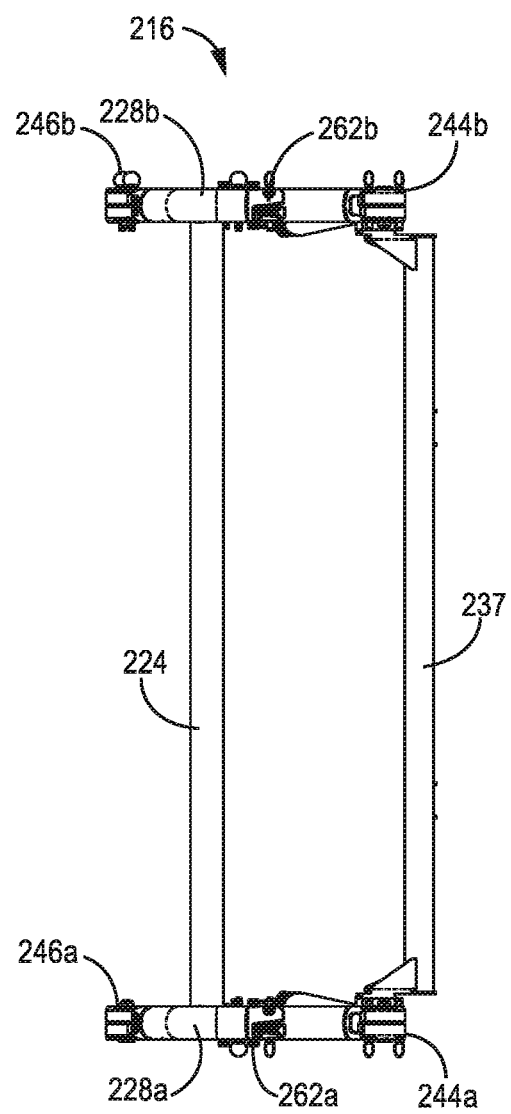
Figure 42A:
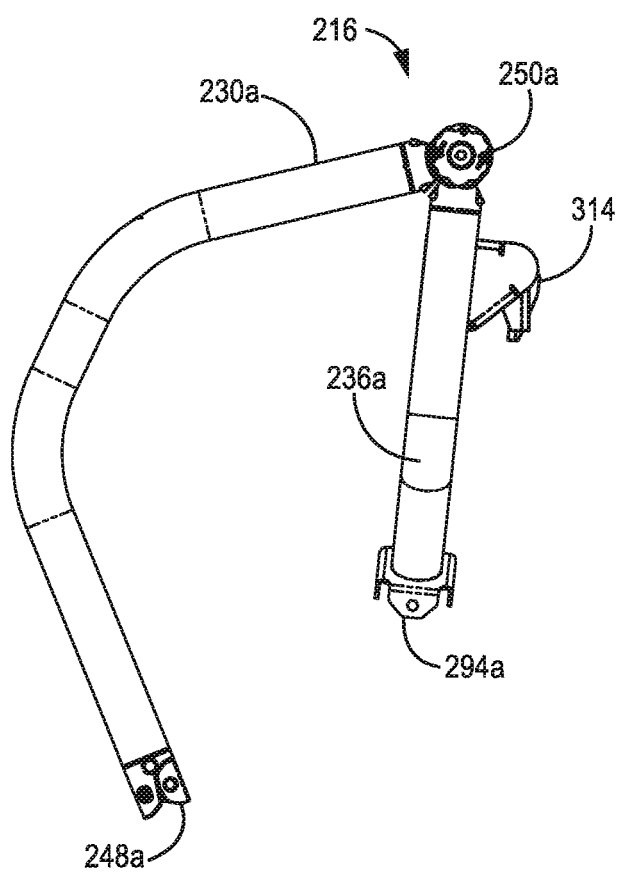
FIGS. 42A-B illustrate a side view (42A), and top view (42B) of third ROPS portion, according to some embodiments.
Figure 42B:
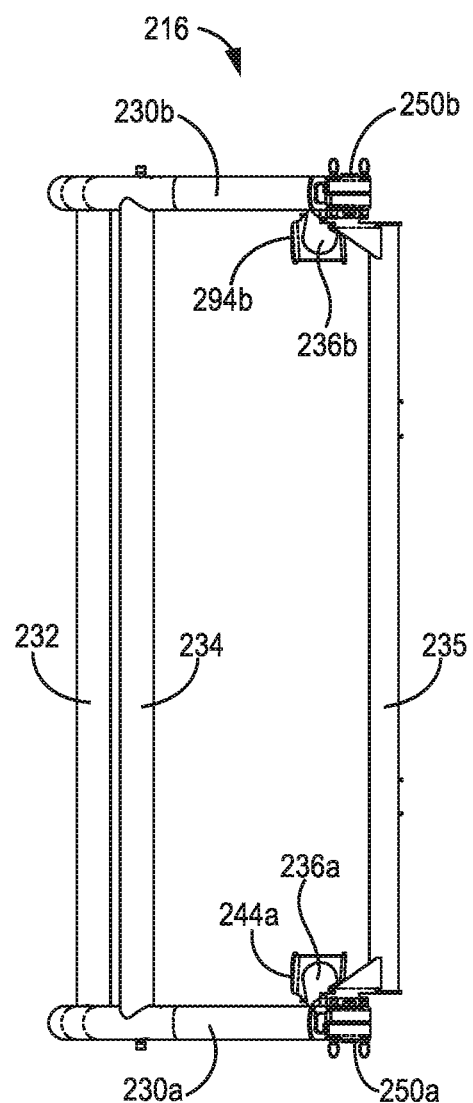

As shown in FIG. 22, ROPS 201 is secured to the frame 204 of the utility vehicle 200. In some embodiments, first ROPS portion 212 includes front side members 290a, 290b (shown in FIG. 23), front foldable members 218a, 218b, front pivot joints 240a, 240b, front lateral member 220 and a portion of front interlocking joint 242a, 242b (see FIGS. 41A-B). Second ROPS portion 214 includes intermediate foldable members 222a, 222b, intermediate side members 226a, 226b, first intermediate pivot joints 244a, 244b, second intermediate pivot joints 246a, 246b, side members 228a, 228b and a portion of rear interlocking joint 248a, 248b. (see FIG. 39, and FIGS. 40A-B). Third ROPS portion 216 includes rear foldable members 230a, 230b, rear side members 236a, 236b, a plurality of rear lateral members 232, 234 and 310, rear pivot joints 250a, 250b, and a portion of rear interlocking joint 248a, 248b (see FIGS. 42A-B). In some embodiments, support members are constructed of 1"-2", round, square, and/or rectangular tubing, typically steel but other materials may also be utilized that provide sufficient durability during a roll-over event.

With respect to first ROPS portion 212, front side members 290a, 290b are rigidly connected via brackets 292a, 292b to frame 14 (as shown in FIG. 22). In some embodiments, front side members 290a, 290b are pivotally connected to front foldable members 218a, 218b, respectively, via front pivot joints 240a, 240b. As shown in FIG. 1, front pivot joints 240a, 240b allow front foldable members 218a, 218b to be placed in a folded position, which decreases the overall height of the utility vehicle. In some embodiments, front foldable members 218a, 218b fold forward onto hood 205 as shown in FIG. 19. In other embodiments, front foldable members 218a, 218b may fold rearward within seating area 210. In some embodiments the first ROPS portion 212 may be placed in a folded position for transport and/or storage of the utility vehicle 200.

With respect to second ROPS portion 214, intermediate side members 226a, 226b are rigidly connected on via brackets 258a, 258b to frame 14 (shown in FIG. 22). In some embodiments, intermediate side members 226a, 226b are pivotally connected to intermediate foldable members 222a, 222b respectively via intermediate pivot joints 244a, 244b. In some embodiments, intermediate pivot joints 244a, 244b allow intermediate foldable members 222a, 222b to be placed in a folded position, which decreases the overall height of the utility vehicle. In some embodiments, intermediate foldable members 222a, 222b fold forward into seating area 210 (as shown in FIG. 19), but in other embodiments may fold rearward into seating area 211.

With reference to FIGS. 18 and 20, the ROPS 201 is shown in the installed or engaged state. In some embodiments, first ROPS portion 212 is connected to second ROPS portion 214 through front interlocking joints 242a, 242b, and second ROPS portion 214 is connected to third ROPS portion 216 through rear interlocking joints 248a, 248b. For example, front interlocking joint 242a includes first interlocking joint component 260a affixed to front foldable member 218a and second interlocking component 262a affixed to intermediate foldable members 222a. As discussed in more detail below with respect to FIGS. 27-33, first interlocking joint component 260a is configured to interlock with second interlocking joint components 262a to form an interlocked, rigid joint. Likewise, first interlocking joint component 260b is configured to mate with second interlocking joint components 262b to form an interlocked, rigid joint, thereby connecting the first ROPS portion 212 to the second ROPS portion 214. In some embodiments, first and second interlocking joint components (e.g., components 260a, 260b and 262a, 262b) are mirrored components configured to interlock with one another. In some embodiments, first interlocking joint components 260a, 260b and second interlocking joint components 262a, 262b are approximately identical in geometry, albeit oriented in opposite directions to allow interlocking between features. Interlocking joint components 260a, 260b and 262a, 262b interlock with one another to form a secure mechanical connection between the first ROPS portion 212 and the second ROPS portion 214. In some embodiments, first interlocking joint component 260a includes an aperture that aligns with an aperture in second interlocking joint component 262a, wherein a pin may be inserted and retained with the apertures to secure the connection between interlocking joint components 260a and 262a. In some embodiments, the interlocking joint components 260a, 262a and 260b, 262b allow the ROPS to be assembled and secured without requiring tools. In some embodiments, the interlocking connection joint components 260a, 262a (and 260b, 262b) allow the ROPS to be disassembled/folded without the use of any tools.

In some embodiments, in addition to first ROPS portion 212 and second ROPS portion 214, a third ROPS portion 216 is provided over the seating area 211. With respect to third ROPS portion 216, rear side members 236a, 236b are rigidly connected via brackets 294a, 294b to frame 14 (as shown in FIG. 22). In some embodiments, rear side members 236a, 236b are pivotally connected to rear foldable members 230a, 230b, respectively, via rear pivot joints 250a, 250b. As shown in FIG. 19, rear pivot joints 250a, 250b allow rear foldable members 230a, 230b to be placed in a folded position, which decreases the overall height of the utility vehicle. In some embodiments, rear foldable members 230a, 230b folds forward within the seating area 211 as shown in FIGS. 19 and 21. In other embodiments, third ROPS portion 216 may fold rearward toward cargo box 208. In some embodiments the third ROPS portion 216 may be placed in a folded position for transport and/or storage of the utility vehicle 200.

Second ROPS portion 214 and third ROPS portion 216 are connected to one another through rear interlocking joints 248a, 248b. For example, rear interlocking joint 248a includes first interlocking member 264a affixed to side member 228b and second interlocking member 324a affixed to rear foldable members 230a. First interlocking member 264a is connected to second interlocking member 324a (and similarly first interlocking member 264b is connected to second interlocking member 324b) to connect second ROPS portion 214 to third ROPS portion 216. In the installed position, second ROPS portion 214 and third ROPS portion 216 provide roll-over protection for the seating area 211.

As shown in FIG. 21, the height of front pivot joints 240a, 240b, intermediate pivot joints 244a, 244b, and rear pivot joints 250a, 250b are selected based on the height of adjacent fixed items in order to minimize the height of the vehicle in the folded or stowed position. For example, front pivot joints 240a, 240b may be positioned at a height approximately equal to or slightly greater than the height of the hood 205 to allow front foldable members 218a, 218b to rest on the hood 205 of the utility vehicle. In some embodiments, the height of intermediate pivot joints 244a, 244b are selected based on the height of seats 252a and 252b. Likewise, in some embodiments the height of rear pivot joints 250a, 250b are selected based on the height of seats 254a, 254b and/or based on the height of the cargo box 208. In this way, the height of the utility vehicle 10 in the folded state is approximately equal to the height of cargo box 18 and/or the height of the seats 252a, 252b, 254a, 254b In the embodiment shown in FIGS. 19 and 21, the front foldable members 218a and 218b extend forward onto the hood 205 of the utility vehicle and the intermediate foldable members 222a and 222b extend forward into the seating area 210. In other embodiments, the front foldable members 218a and 218b extend rearward within the seating area 210 forward of seats 252a and 252b along with the intermediate foldable members 222a and 222b. In some embodiments, the width of the front foldable members 218a and 218b and/or of intermediate foldable members 222a and 222b is greater than the width of seats 252a and 252b, but less than the width of body 202 associated with utility vehicle 200. Similarly, the width of rear foldable members 230a and 230b may be greater than the width of seats 254a and 254b, but less than the width of body 202 associated with utility vehicle 200.

Figure 23:
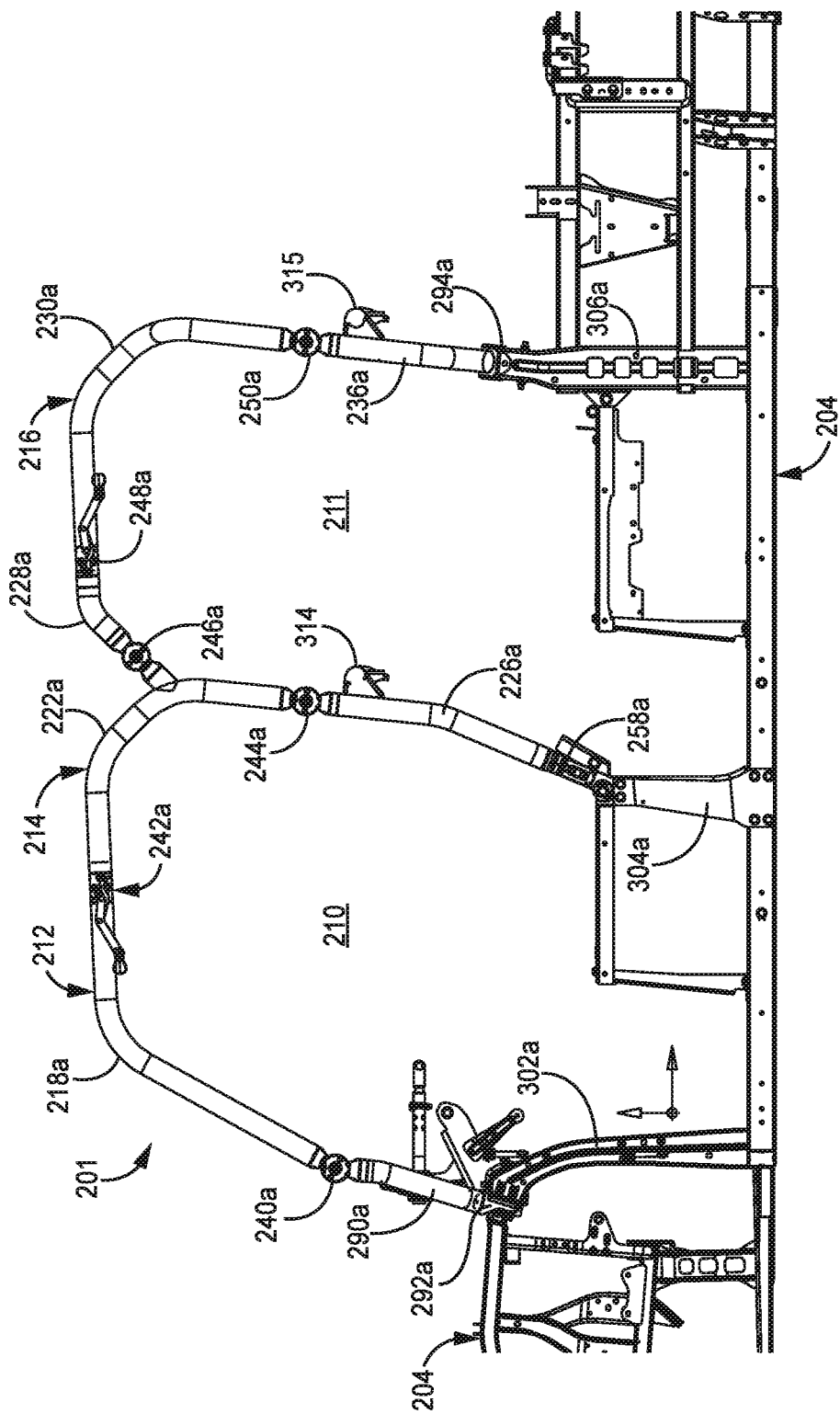
FIG. 23 is a side view of the ROPS connected to the utility vehicle frame according to some embodiments.
Figure 24:
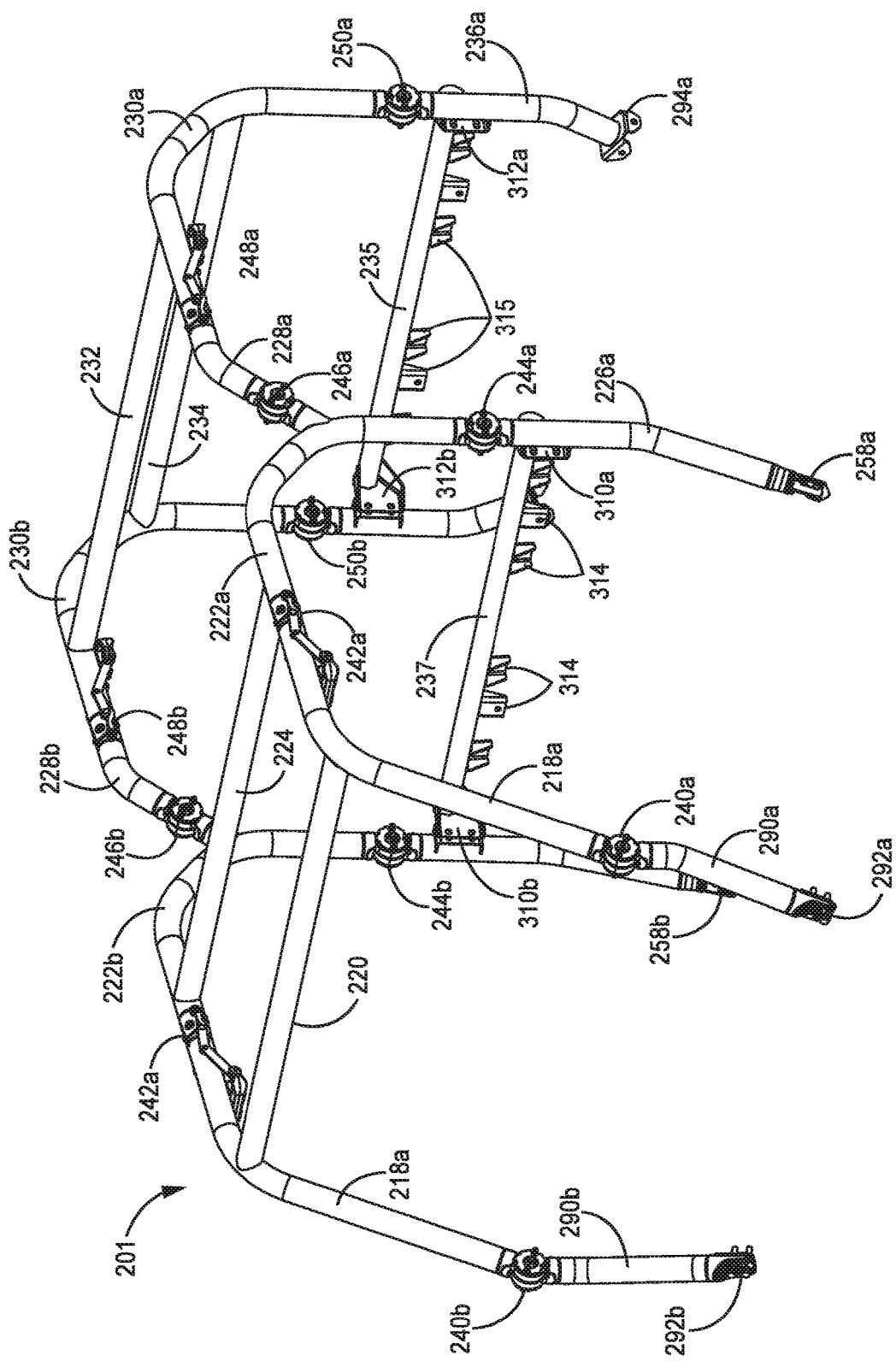
FIG. 24 is a front perspective view of the ROPS according to some embodiments.
Figure 25:
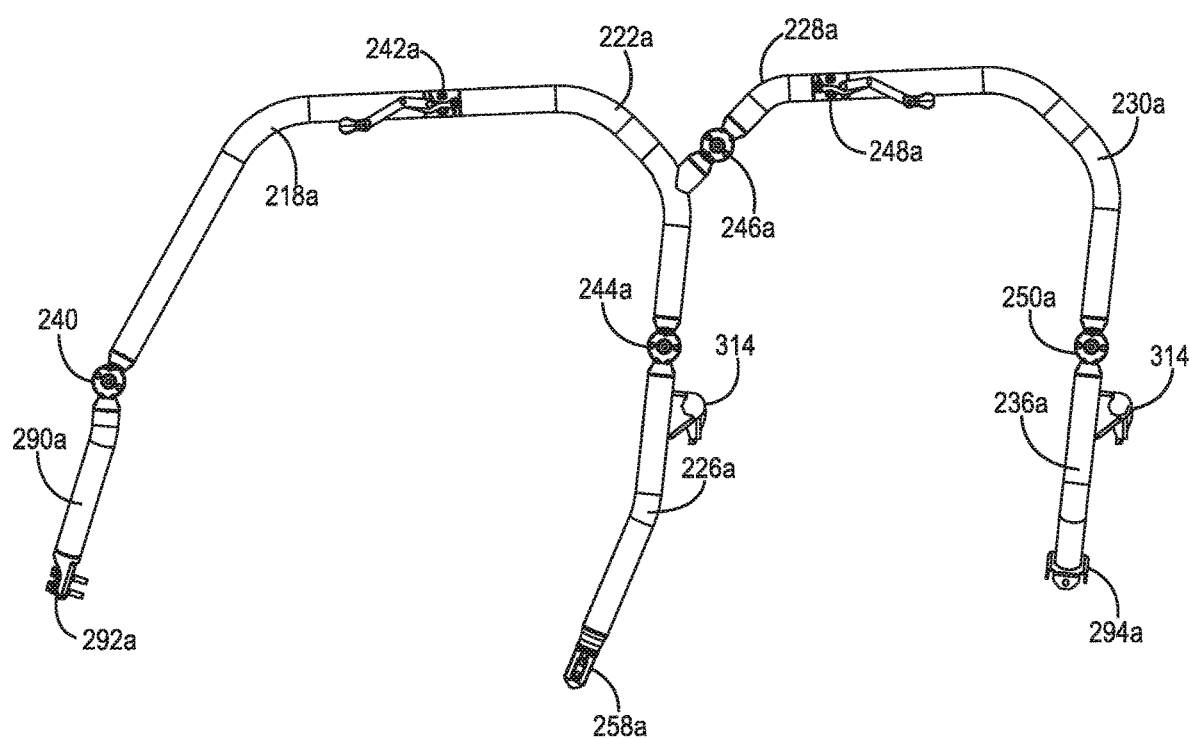
FIG. 25 is a side view of the ROPS according to some embodiments.
Figure 26:
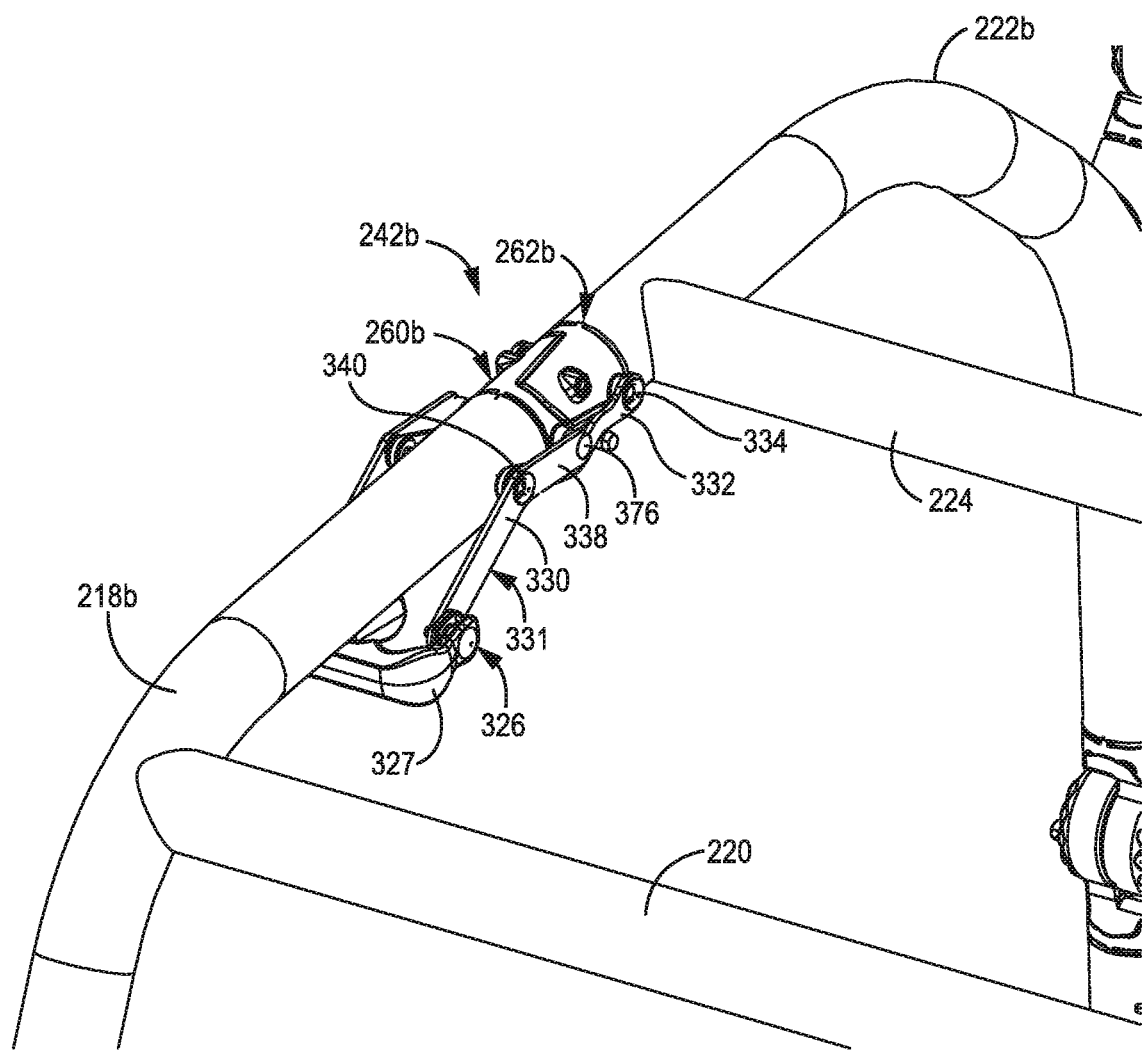
FIG. 26 is a side view of the interlocking joint included in the ROPS according to some embodiments.
Figure 27:
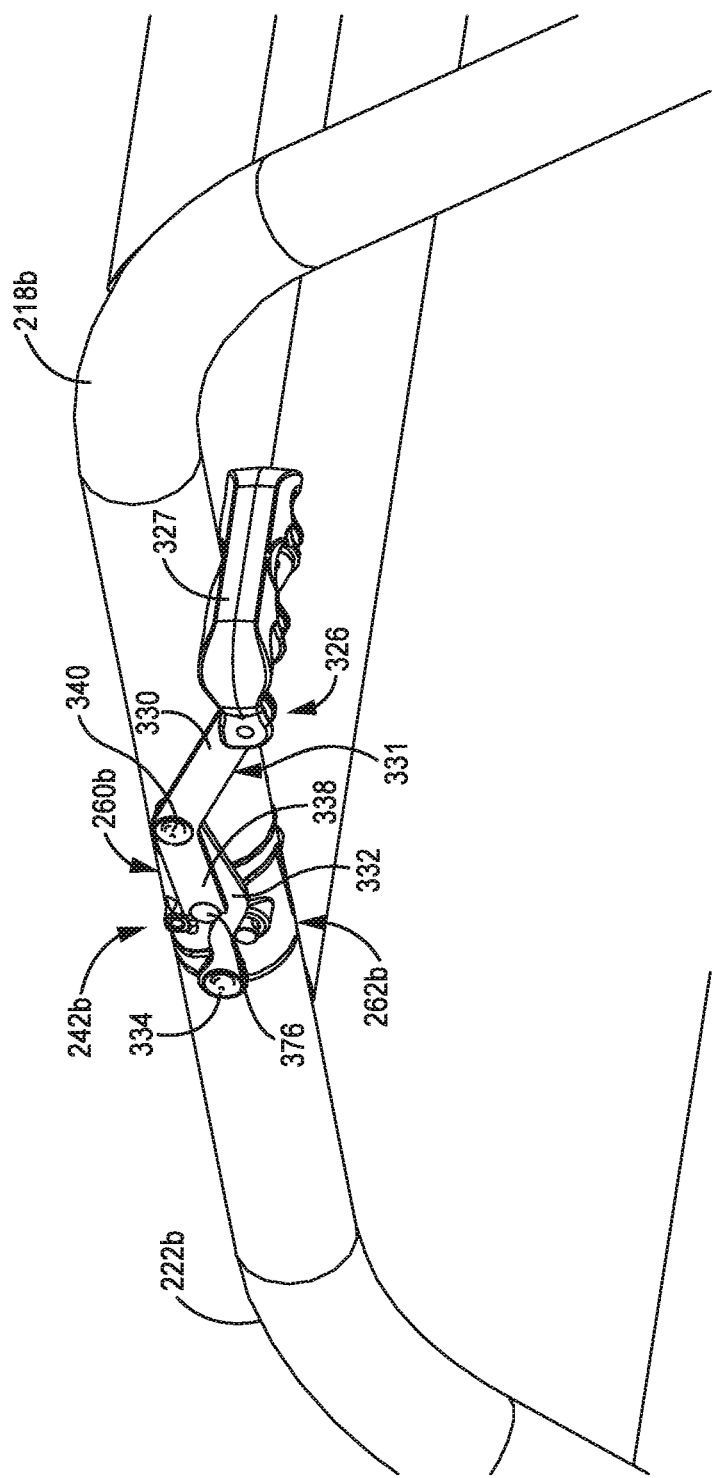
FIG. 27 is a front perspective view of the interlocking joint included in the ROPS according to some embodiments.

Referring now to FIGS. 22 and 23, the connection of the ROPS 201 to the frame 204 is shown. In some embodiments, front side members 290a, 290b include brackets 292a, 292b, respectively, for rigid connection of the ROPS 201 to the frame 204 of utility vehicle 200. Likewise, intermediate side members 226a, 226b include brackets 258a, 258b, respectively, for rigid connection to the frame 204, and rear side members 236a, 236b include brackets 294a, 294b, respectively, for rigid connection to the frame. Rear lateral member 60 extends between rear side members 36a, 36b, and includes brackets 66a, 66b for connection to rear side members 36a, 36b, respectively. In some embodiments, intermediate lateral member 312 extends between intermediate side members 226a, 226b and includes one or more brackets 314 for attachment of accessories, such as additional seatbelt straps or accessory mounts. In some embodiments, rear lateral member 235 extends between rear side members 236a, 236b and includes one or more brackets 315 for attachment of accessories, such as additional seatbelt straps or accessory mounts.

Referring to FIGS. 26-30, embodiments of the interlocking joint—including front interlocking joints 242a, 242b and rear interlocking joints 248a, 248b—are shown. In some embodiments, the front interlocking joint 242a, 242b is approximately identical to the rear interlocking joints 248a, 248b. The components included in the respective interlocking joints are given the same reference number, although depending on the application differences may be provided with respect to the front interlocking joint 242a, 242b and rear interlocking joint 248a, 248b. For the sake of simplicity, both front interlocking joints 242a, 242b and rear interlocking joints 248a, 248b will be referred to generically as interlocking joint.

The interlocking joint includes a first interlocking joint component 260 and a second interlocking component 262. The first interlocking joint component 260 is affixed to a foldable member (e.g., front foldable member 218a, 218b) and second interlocking component 262 is affixed to another foldable member (e.g., intermediate foldable member 222a, 222b). In some embodiments, a locking mechanism 326 is utilized to engage first interlocking joint component 260 with second interlocking joint component 262. In some embodiments, a locking mechanism 326 provides a mechanical advantage for securing first interlocking joint component 260 with second interlocking component 262, allowing the interlocking components to be engaged with one another and secured without requiring additional tools. In one embodiment, locking mechanism 326 comprises a handle 327, a first pair of arms 331, second pair of arms 332, pivot pin 340, pivot pin 334. First pair of arms 331 includes a first part 330 connected to the handle 327 and a second part 338 that is selectively engaged with protrusions 376 associated with first interlocking joint component 260. A pivot pin 340 is positioned along the length of the first pair of arms 331 and is configured to pivotally connect the first pair of arms 331 with the second pair of arms 332. In some embodiments, the second pair of arms 332 are connected on a first end to the pivot pin 340 and on a second end pivotally affixed via pivot pin 334 to the second interlocking component 262.

Figure 28:
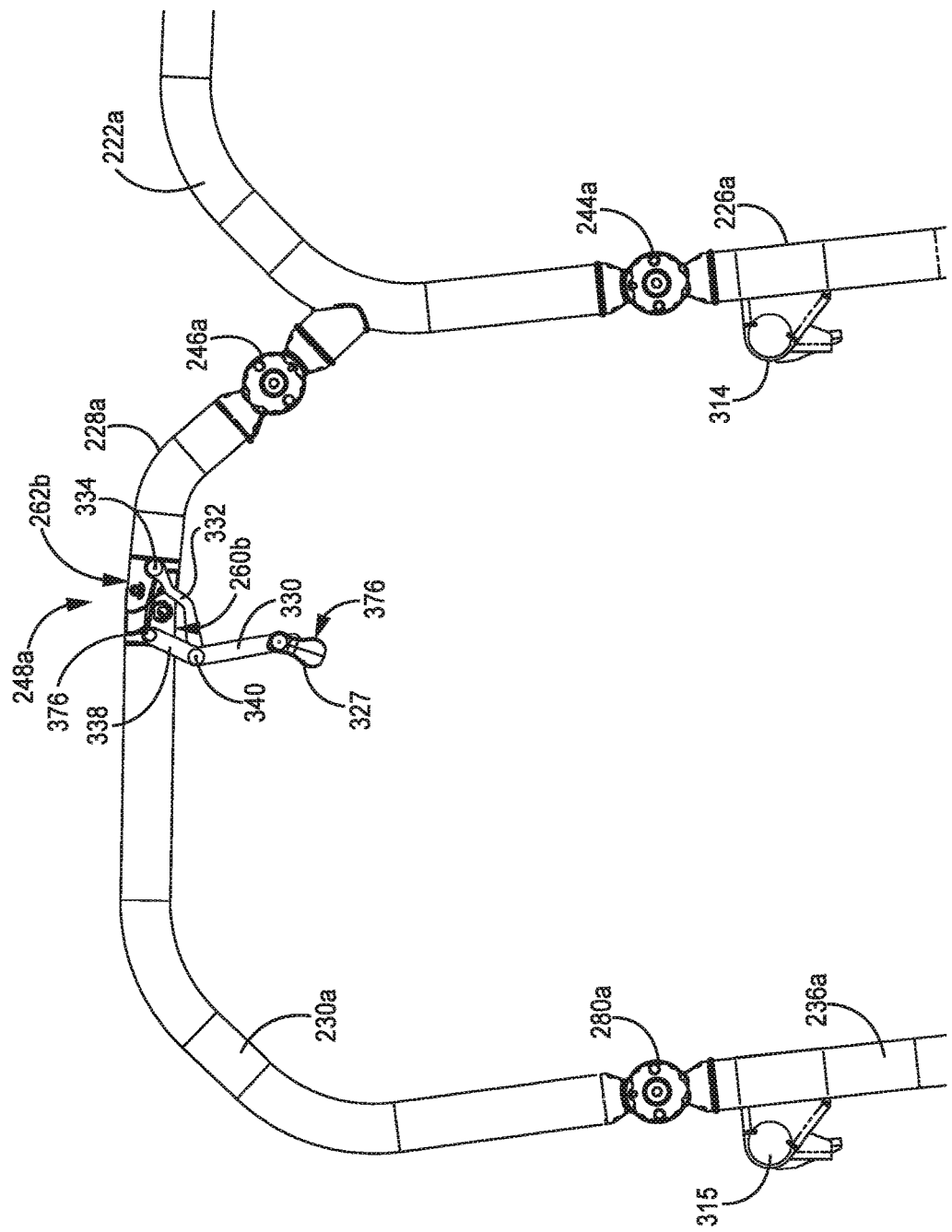
FIG. 28 is a front perspective view of the interlocking joint included in the ROPS according to some embodiments.

Referring to FIG. 28, locking mechanism 326 is in the unlocked position, and first interlocking joint component 260 is disengaged from second interlocking component 262. To interlock the first interlocking joint component 260 and second interlocking component 262, the distal end 339 of the first pair of arms 331 is positioned adjacent to protrusions 376 associated with first interlocking joint component 260. Handle 327 is actuated clockwise (in the embodiment shown in FIG. 28) to cause second interlocking component 262 (pivotally attached to the locking mechanism 326 via the second pair of arms 332) to move towards or become engaged with first interlocking joint component 260 as a result of force exerted by the first pair of arms 331 on the protrusion 376 associated with first interlocking joint component 260.

Figure 29:
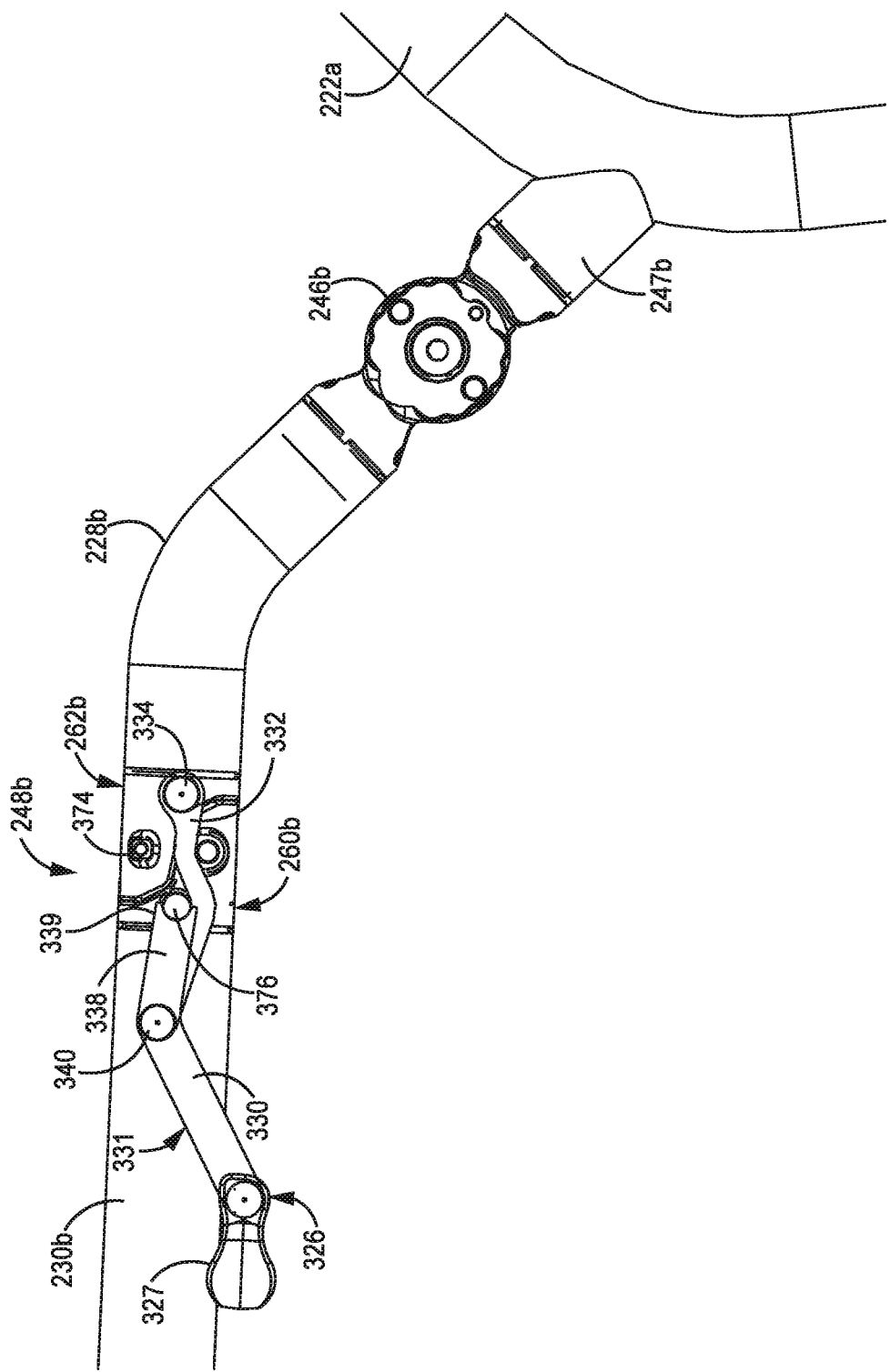
FIG. 29 is a side view of the interlocking joint included in the ROPS according to some embodiments.
Figure 30:
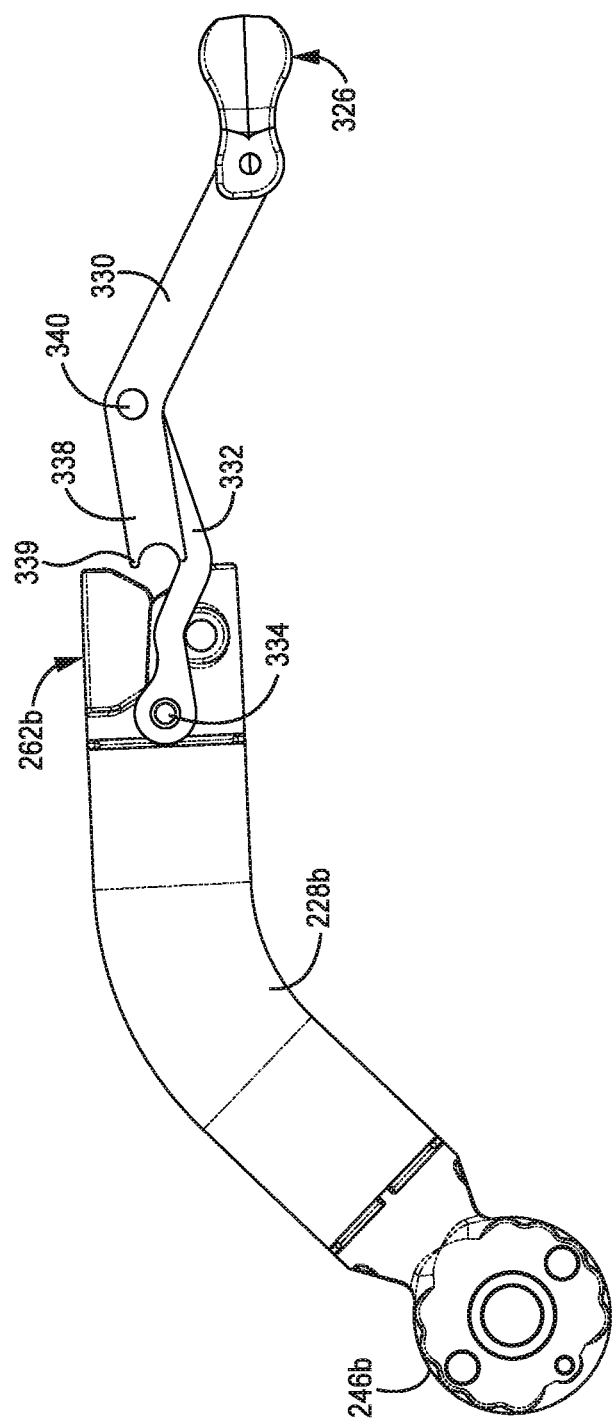
FIG. 30 is a side view of a first portion of the interlocking joint according to some embodiments.
Figure 31B:
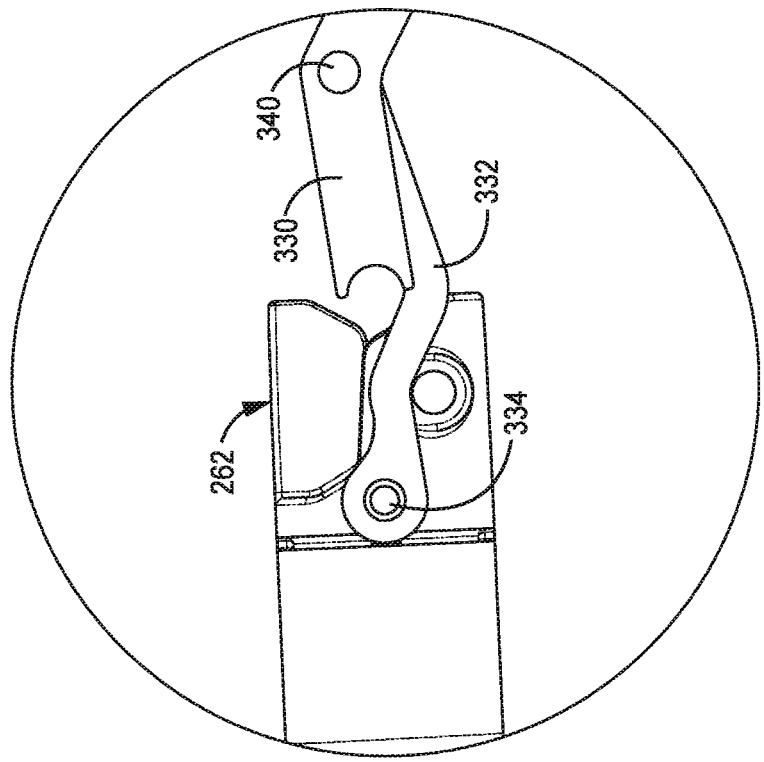
FIG. 31A is a side view of a pivotable joint according to some embodiments and FIG. 31B is a side view of a first portion of the interlocking joint according to some embodiments.
Figure 31A:
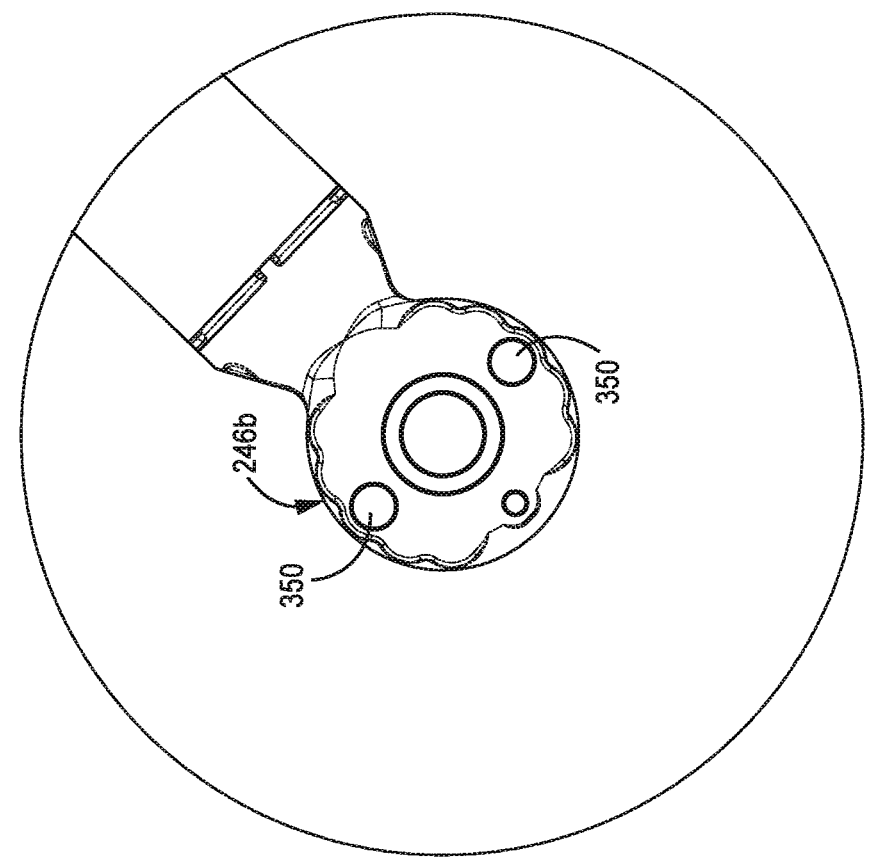

Referring to FIG. 29, locking mechanism 326 is in the locked position, resulting in first interlocking joint component 260 being fully engaged with second interlocking component 262. In some embodiments, a locking pin (not shown) is provided through the first interlocking joint component 260 and second interlocking component 262 via aperture 368 to secure first interlocking joint component 260 and second interlocking component 262 in the locked position. The locking mechanism 326 may be used to preload an interlocking joint and one more pins positioned to secure the mechanism in place, preventing any accidental or unintentional disengagement. The one or more pins may be further secured, such as by a friction fit, spring loaded detent ball internal to the pin, tethering via braided line, in some embodiments Referring to FIGS. 32A-32F, various views of the interlocking joint component 260a are shown. In some embodiments, first and second interlocking joint components (e.g., 260a, 262a) are mirrored components configured to interlock with one another. In some embodiments, first interlocking joint components 260a and second interlocking joint components 262a are approximately identical in geometry, albeit oriented in opposite directions to allow interlocking between features. Interlocking joint components 260a and 262a interlock with one another to form a secure mechanical connection between the foldable ROPS members (e.g., between front foldable member 218a, 218b and intermediate foldable member 222a, 222b, respectively, or between intermediate foldable member 222a, 222b and rear foldable member 230a, 230b, respectively). For the sake of simplicity, first interlocking joint component 260a is described with respect to FIGS. 32A-32F, which would interact with a mirrored counterpart component (e.g., second interlocking component 262a shown in FIGS. 26-29).

In the embodiment shown in FIGS. 32A-32F, first interlocking joint component 260a includes a first end 390 configured for mechanical connection to a foldable member (e.g., first foldable member 218a). A second end opposite the first end 390 includes two finger-like protrusions referred to as a male component 360 and a female component 362. In some embodiments, male component 360 and female component 362 are offset horizontally and vertically from one another relative to a centerline $C_r$ through the interlocking joint component 260a. For example, in the embodiment shown in FIG. 32A male component 360 is offset horizontally from female component 362 (e.g., male component 360 is located on one side of the centerline $C_r$ and female component 362 is located on the opposite side of the centerline). Similarly, male component 360 is offset vertically from female component 362 (e.g., male component 360 located above female component 362 relative to the centerline). In some embodiments, male component 360 includes an aperture 368 located through the side wall (e.g. side surface 364, visible in FIG. 32A) of the male component 360, an alignment feature 374 located on an outer surface 382 (shown in FIG. 32C), and a locking feature 370 extending away from a bottom surface 384 of male component 360. In some embodiments, aperture 368 is co-aligned with alignment feature 374 and extends from the side surface 364 to the outer surface 382. In some embodiments, female component 362 includes a groove/alignment feature 372 formed within a top surface 367 of the female component 362. Interlocking first interlocking joint component 260a with second interlocking joint component 262a, the locking feature (e.g., locking feature 370) of the second joint component 262a slides into the groove/alignment feature 372 associated with the first interlocking joint component 260a. Likewise, the locking feature 370 of the first interlocking joint component 260a slides into the groove alignment feature (e.g., groove/alignment feature 372) of the second interlocking joint component 262a.

Figure 32A:
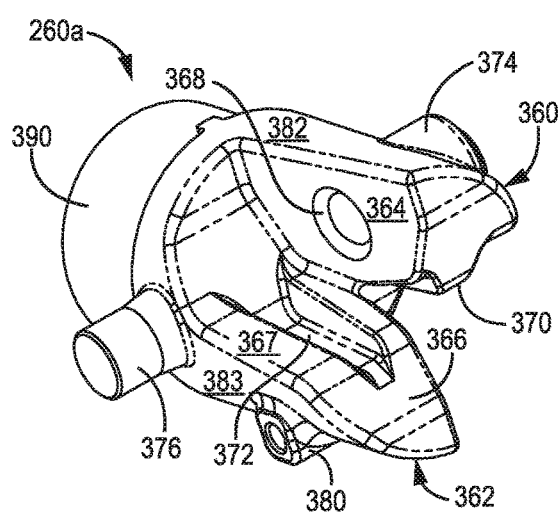
FIGS. 32A-32F illustrate the interlocking joint according to some embodiments.
Figure 32B:
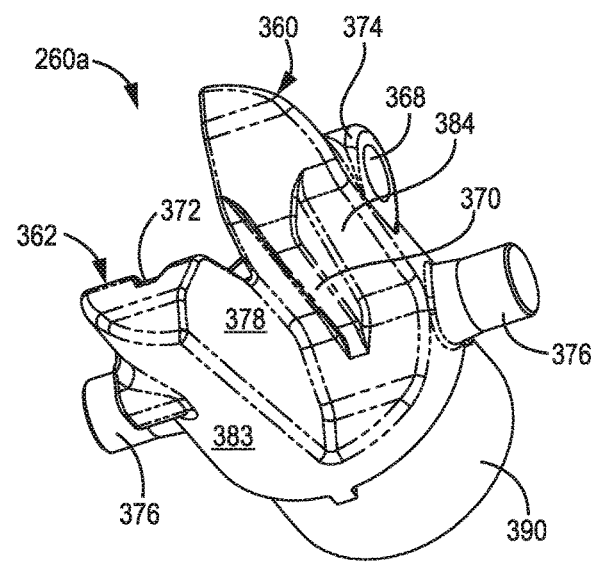
Figure 32C:
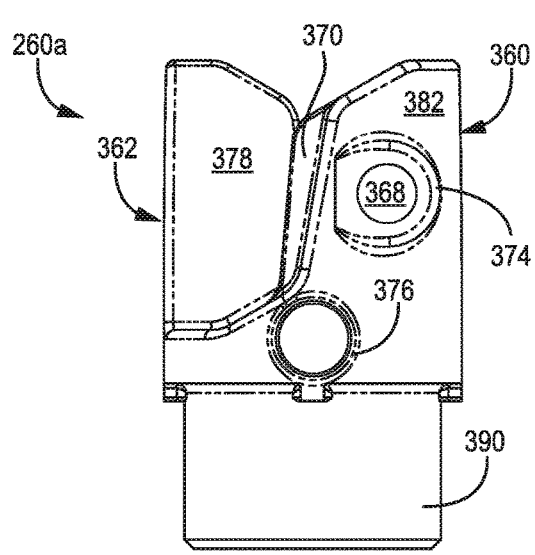
Figure 32D:
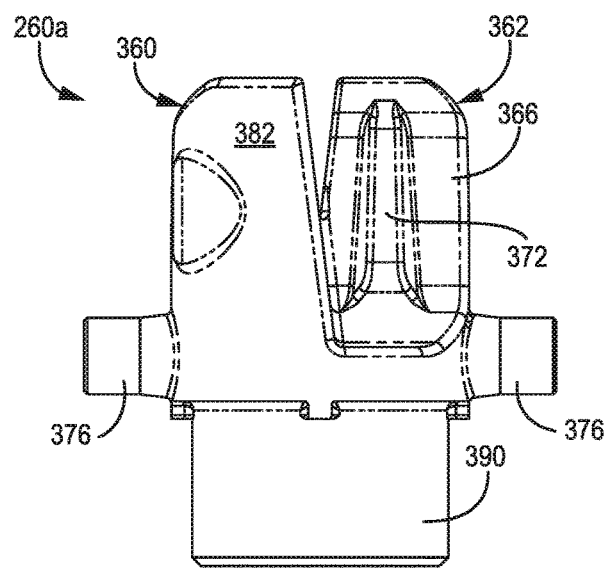
Figure 32E:
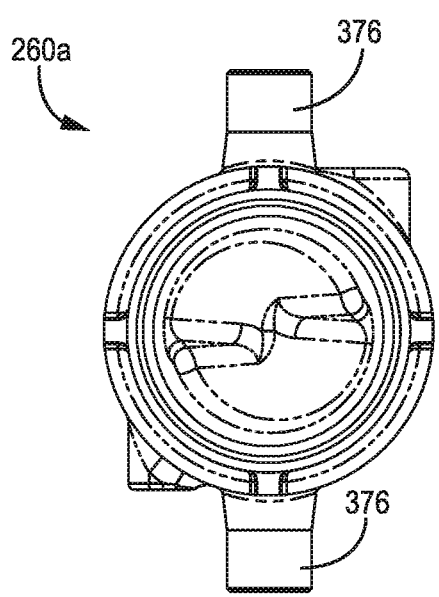
Figure 32F:
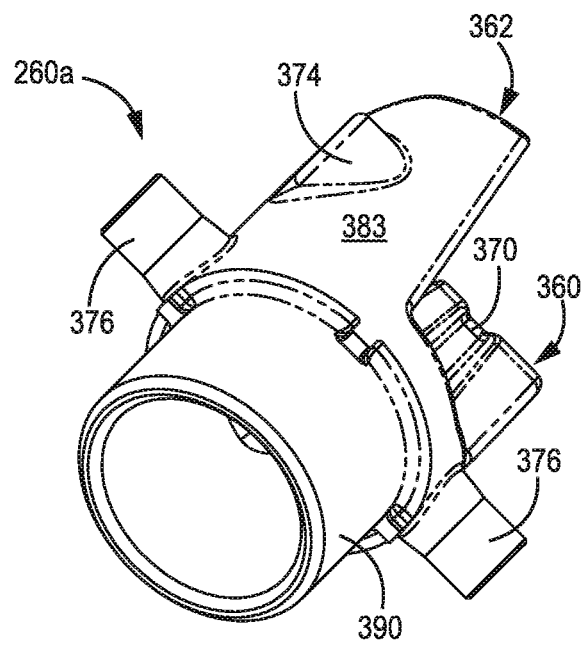

A mechanical connection between first interlocking joint component 260a and second interlocking joint component 262a is made by aligning the respective components 260a, 262ba and sliding them together, wherein male component 360 of the first interlocking joint component 260a interlocks with corresponding female component 362 of the second interlocking joint component 262a. In particular, locking feature 370 (associated with male component 360) interfaces with groove/alignment feature 372 (associated with female component 362. The dimensions of locking feature 370 and groove/alignment feature 372 are selected to allow locking feature 370 to fit within the groove/alignment feature 372. In some embodiments, female component 362 includes a ramped surface 366 to accommodate engagement between the male component 360 and female component 362. In this way, the male and female components interlock with one another. In some embodiments, additional rigidity is provided by interaction of side surface 364 of male component 360 (associated with first interlocking joint component 260) with side surface 364 of the opposite male component 360 (associated with the second interlocking joint component 262). Similarly, in some embodiments additional rigidity is provided by the interaction of side surface 378 of female component 362 (associated with first interlocking joint component 260, as shown in FIG. 32B) with side surface 378 of female component 362 (associated with the second interlocking component 262). This interlocking of these features provides mechanical rigidity with respect to compressive forces (e.g., radial forces) likely to be experienced by the joint in operation. To disconnect the interlocking joint, a tensile force is applied to the joint to pull the respective components apart from one another in an arcuate or semi-axial manner (as dictated by the pivot joints).

In some embodiments, an alignment feature (e.g., alignment feature 374) is utilized to aid in alignment and securing of the first interlocking joint component 260 to the second interlocking joint component. In some embodiments (shown in FIGS. 32A-32F) the alignment feature 374 is located on the male component 360 of the interlocking joints—including both the first interlocking joint component 260a and the second interlocking joint component 262a (not shown in this view). In other embodiments, the alignment feature may be located on the female component 362 or on both the male and female components. In some embodiments, the alignment feature 374 include an aperture 368 configured to receive a locking pin, wherein alignment of the alignment features 374 of both the first interlocking joint component 260 and the second interlocking component 262 allows a pin to be received through both apertures 368 to secure engagement of the first interlocking joint component 260a and the second interlocking joint component 262a.

In some embodiments, locking mechanism 326 (shown in 26-30) is utilized to provide a mechanical advantage to aid in the engagement of first interlocking joint component 260a and second interlocking joint component 262a. When properly engaged, alignment features 374 located on the respective male components 360 are aligned to receive a locking pin (not shown) through apertures 368.

In some embodiments, when interlocked the outer surfaces—including outer surface 382 of male component 360 and outer surface 383 of female component 362—form a surface that is approximately aligned with the surfaces of the foldable members to which the interlocking joint component is attached (e.g., front foldable members 218a, 218b, intermediate foldable members 222a, 222b, rear foldable members 230a, 230b). Once interlocked, the interlocked joint has an outer radius and surface that is approximately equal to the outer radius and surface of the components being connected together as shown in FIG. 9, giving the appearance of an approximately integral piece.

In some embodiments, side surface 364 associated with male component 360 is angled towards the centerline $C_r$ as the surface extends closer to first end 390. As a result, male component 360 has a slightly narrower width at the end opposite first end 390. In some embodiments, the side surface 364 is angled to allow male component 360 of first interlocking joint component 260a to be engaged with male component of the second interlocking joint component (not shown, but for example, second interlocking joint component 262a). In particular, this may be applicable in situations in which one of the male components 360 has been bent or damaged slightly.

In some embodiments, rather than position apertures 368 of corresponding first and second interlocking joint components to ensure alignment with one another during interlocking, the position of the respective apertures are misaligned slightly and intentionally (e.g., in the axial direction) such that engagement of a pin through the respective apertures 368 provides a pre-load of the joint. In some embodiments, pre-loading the joint reduces wear, squeaking, and attrition of the joint as compared with a joint that is not pre-loaded.

In some embodiments, protrusions 376 extend from the outer surface of both sides of interlocking joint component 260. As described with respect to FIGS. 28 and 29, locking mechanism 326 is configured to engage with protrusions 376 on either side of side of the interlocking joint component 260, wherein mechanical force applied by a user through locking mechanism 326 is transferred to protrusions 376 to force the interlocking joint component 260 into engagement with a corresponding interlocking joint component (e.g., interlocking joint component 262, as shown in FIGS. 28 and 29).

Figure 33:
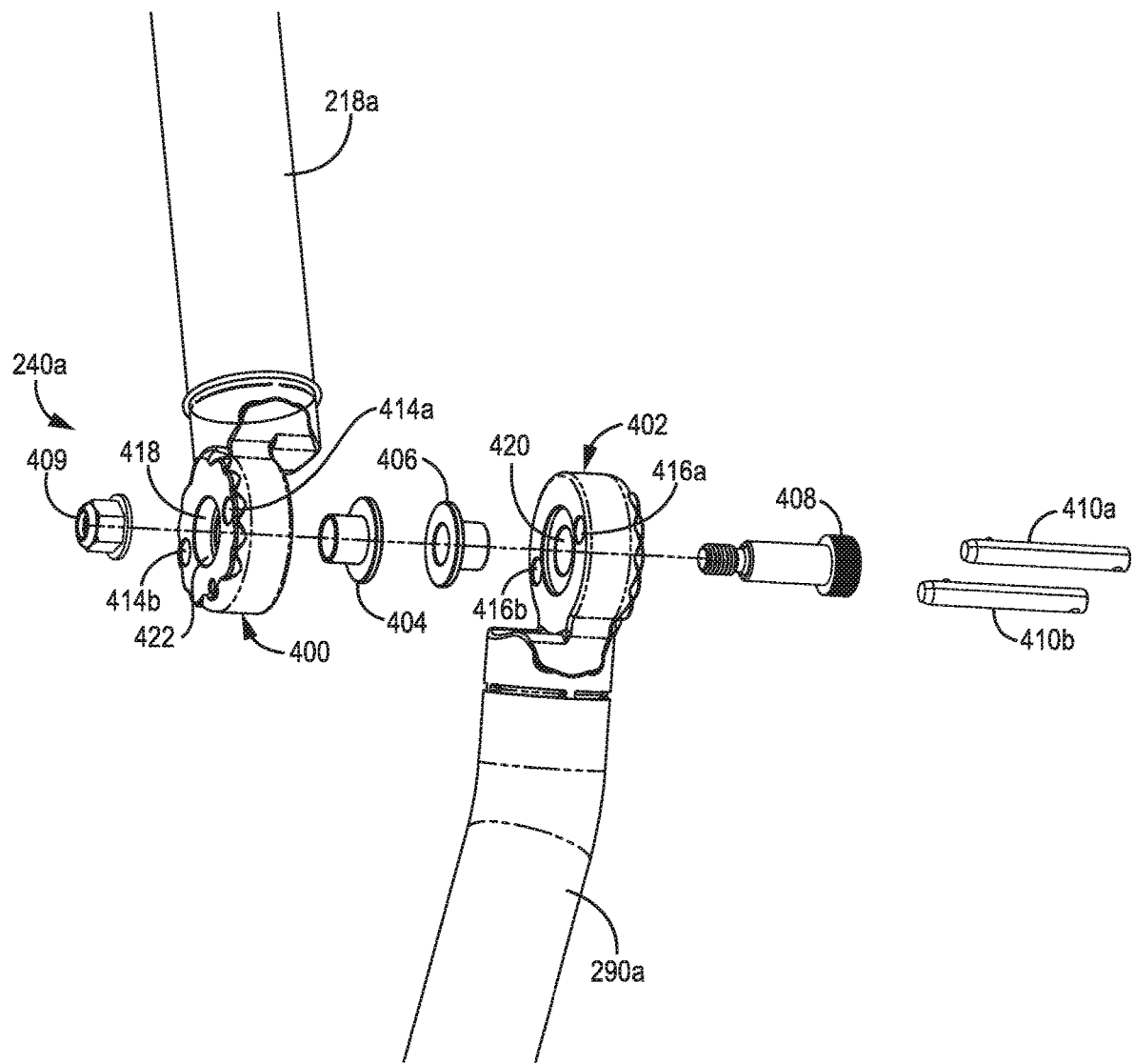
FIG. 33 is an exploded view of the pivotable joint according to some embodiments.

Referring now to FIG. 33, an exploded view of a pivot joint 240 is provided, which includes a first pivot component 400, second pivot component 402, first bushing 404, a second bushing 406, a shoulder bolt 408, locking pins 410, and locking nut 409. As shown in FIG. 22, a plurality of pivot joints 246 may be utilized as part of the ROPS. For example, front pivot joints 240a, 240b are connected between front side members 290a, 290b, respectively, and front foldable members 218a, 218b. In addition, intermediate pivot joints 244a, 244b are connected between intermediate side members 226a, 226b and intermediate foldable members 222a, 222b, respectively. Rear pivot joints 250a, 250b are connected between rear side members 236a, 236b and rear foldable members 230a, 230b, respectively. In some embodiments, each pivot joint may be modified slight based on the geometry between the members to which the pivot joint is connected. For the sake of simplicity, front pivot joint 240a is utilized to explain the operation and assembly of the pivot joint, but each of the pivot joints 240a, 240b, 244a, 244b, 250a, and 250b operate in the same manner.

As shown in FIG. 33, first pivot component 400 is connected to one end of front foldable member 218a and second pivot component 402 is connected to one end of front side member 290a. In some embodiments, first pivot component 400 and second pivot component 402 are approximately identical (i.e., mirrored components). In some embodiments, the first pivot component 400 and second pivot component 402 are approximately identical except for the location of first apertures 414a, 414b in first pivot component 400 and the location of second apertures 416a, 416b in second pivot component 402. Both the first pivot component 400 and second pivot component 402 include a central aperture 418 and 420, respectively. In some embodiments, the central apertures 418 and 420 are countersunk (e.g., chamfered) on an interior surface (the surfaces of first and second pivot components 400, 402 facing each other) to receive a flanged portion of first and second bushings 404 and 406, respectively. The diameter of first and second central apertures 418 and 420 are selected to receive the outer diameter of first and second bushings 404 and 406, respectively. In particular, the first bushing 404 is placed within first aperture 418 and the flanged portion of the bushing 404 is located within the countersunk portion of the first aperture 418. Likewise, the second bushing 406 is placed within second aperture 420 and the flanged portion of the bushing 406 is located within the countersunk portion of the second aperture 420. Shoulder bolt 408 is secured through the second bushing 406 and the first bushing 404 and is secured by locking nut 409. In some embodiments, the central aperture 418 and 420 is includes a countersunk or chamfered portion on the outer surface to accommodate the locking nut 409 and shoulder bolt 408, respectively. Tightening of the shoulder bolt 408 against the locking nut 409 creates surface friction between the surfaces associated with the flanged portion of bushings 404 and 406 and the countersunk surfaces that are in contact with the bushings. Tightening the shoulder bolt 408 against the locking nut 409 increases the friction, and increases the force required to pivot the front foldable member 218a relative to the front side member 209a. In some embodiments, this friction may prevent front foldable member 218a from falling rapidly when the interlocking joint 242a (not shown) is disconnected. That is, some amount of force is required to overcome the friction associated with the interaction of the surfaces based on the amount of force applied by shoulder bolt 408 and locking nut 409.

In some embodiments, to prevent pivoting of the first pivot component 400 relative to the second pivot component 402, first locking pin 410a is provided through aperture 414a and aperture 416a and second locking pin 410b is provided through aperture 414b and aperture 416b. When the ROPS 201 is installed (i.e., operational), the apertures 414a, 414b associated with the first pivot component 400 should be aligned or approximately aligned with apertures 416a, 416b associated with the second pivot component 402 to allow locking pins 410a, 410b to be place through the respective apertures. In some embodiments, the location of the apertures 414a, 414b on first pivot component 400 is approximately the same as the location of apertures 416a, 416b on second pivot component 402. However, in some embodiments due to the geometry of the members to which the first pivot component and second pivot component are attached may require the apertures to be placed in different locations relative to each other. In some embodiments, first and second locking pins 410a and 410b are tethered to prevent loss of the pins during removal from the apertures. When installed, first and second locking pins 410a, 410b prevent front pivot joint 240a from pivoting about the central axis.

To stow the foldable members, the first and second locking pins 410a and 410b are removed from the respective apertures 414a, 414b, and 416a, 416b. Once removed, front foldable member 218a will be allowed to fold forward (or rearward) to stow the first ROPS portion 212. In some embodiments, one or more portions 212, 214, 216, 268 of the ROPS can be locked in a stowed configuration, for example, with the locking pins 410a, 410b that were removed from the ROPS members. In this way, the ROPS members can be constrained in a stowed configuration, or in a multitude of stowed configurations. As discussed above, the friction provided between the surfaces of first and second bushing 404 and 406 and the surfaces of first and second pivot components 400 and 402 prevent the front foldable member 218a from falling following disengagement of the front interlocking joint 242a.

Figure 34:
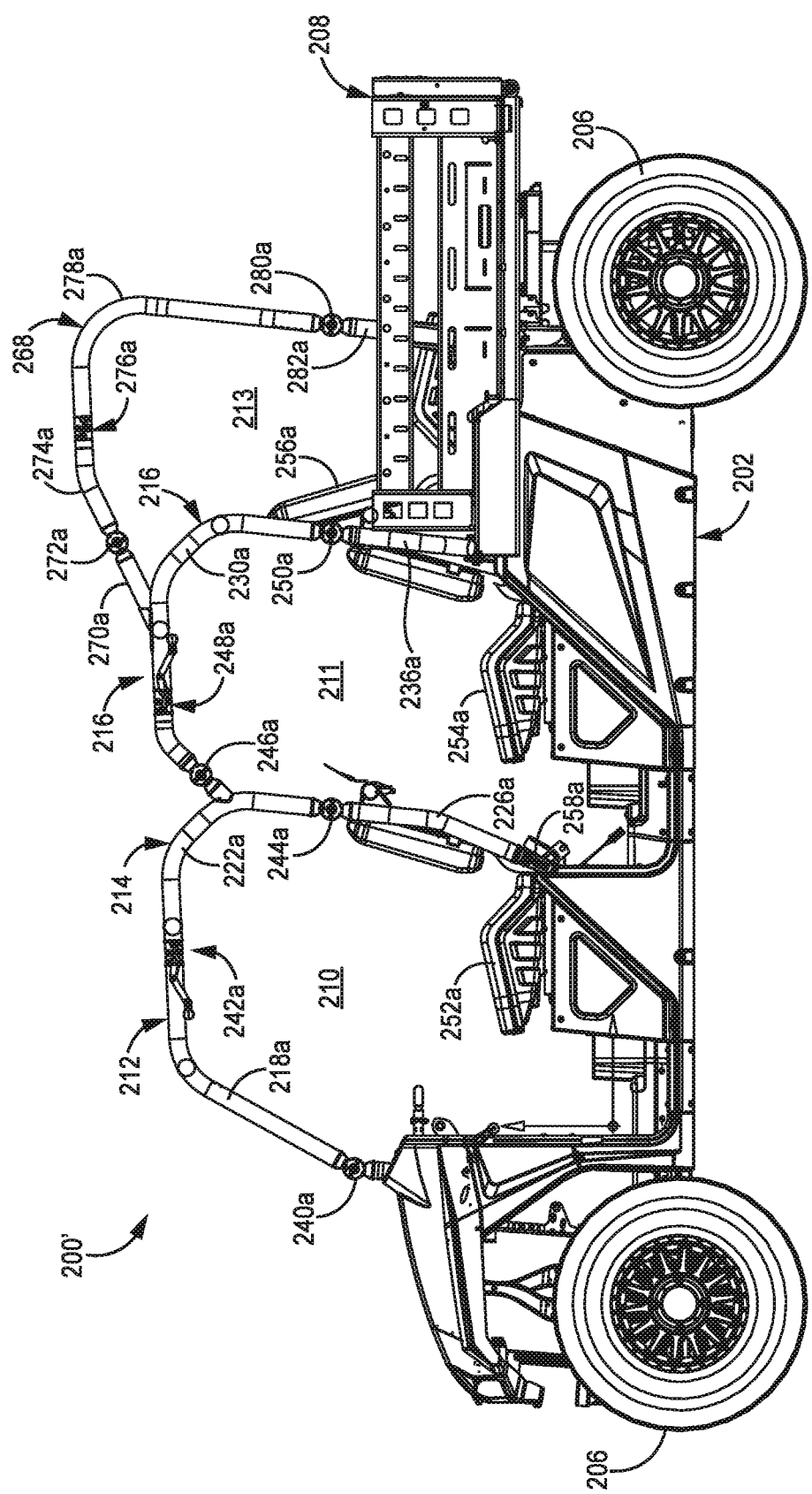
FIG. 34 is a side view of a utility vehicle illustrating a rear ROPS portion positioned over the cargo area according to some embodiments.

With respect to FIG. 34, a side view of a utility vehicle is shown that further includes additional rearward facing seating 256a, 256b located within cargo box 208 and a cargo box ROPS portion 268 located rearward of third ROPS portion 216. In some embodiments, cargo box ROPS portion 268 includes side members 270a, 270b, pivot joints 272a, 272b, foldable side members 274a, 274b, interlocking joint 276a, 276b, foldable side members 278a, 278b, cargo box pivot joints 280a, 280b, and cargo box side members 282a, 282b. One or more lateral members may be included between the various side members and foldable members. In some embodiments, cargo box ROPS portion 268 folds forward into the seating area 211. In some embodiments, seats 256a, 256b fold down or can be removed, allowing cargo box ROPS portion 268 to fold down to a height approximately equal to the other ROPS portions.

Figure 35A:
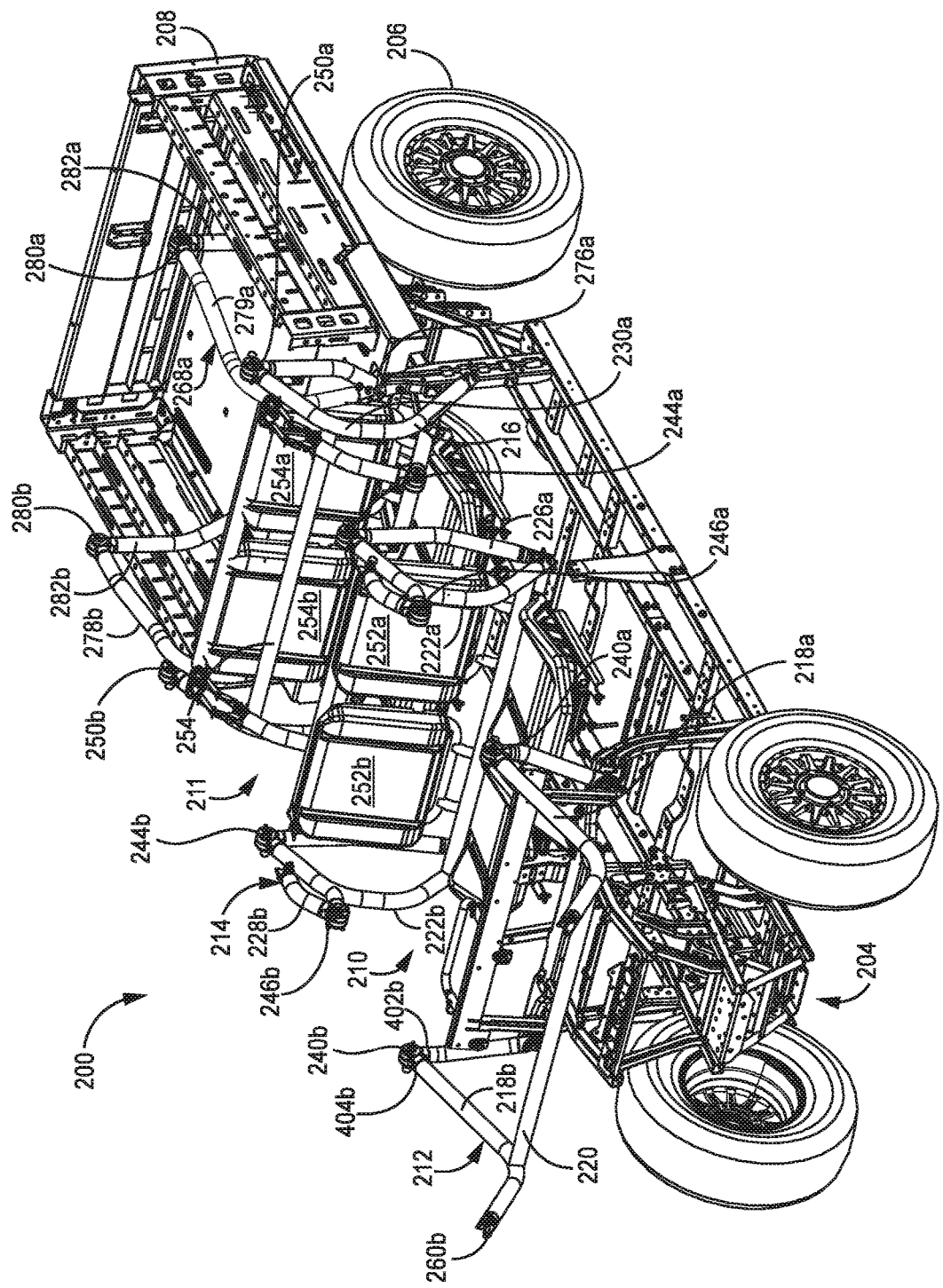
FIGS. 35A-E illustrate a front perspective view (35A), a partial rear perspective view (35B), a side view (35C), a rear view (35D), and a top view (35E) of a utility vehicle rear ROPS portion positioned over the cargo area according to some embodiments.
Figure 35B:
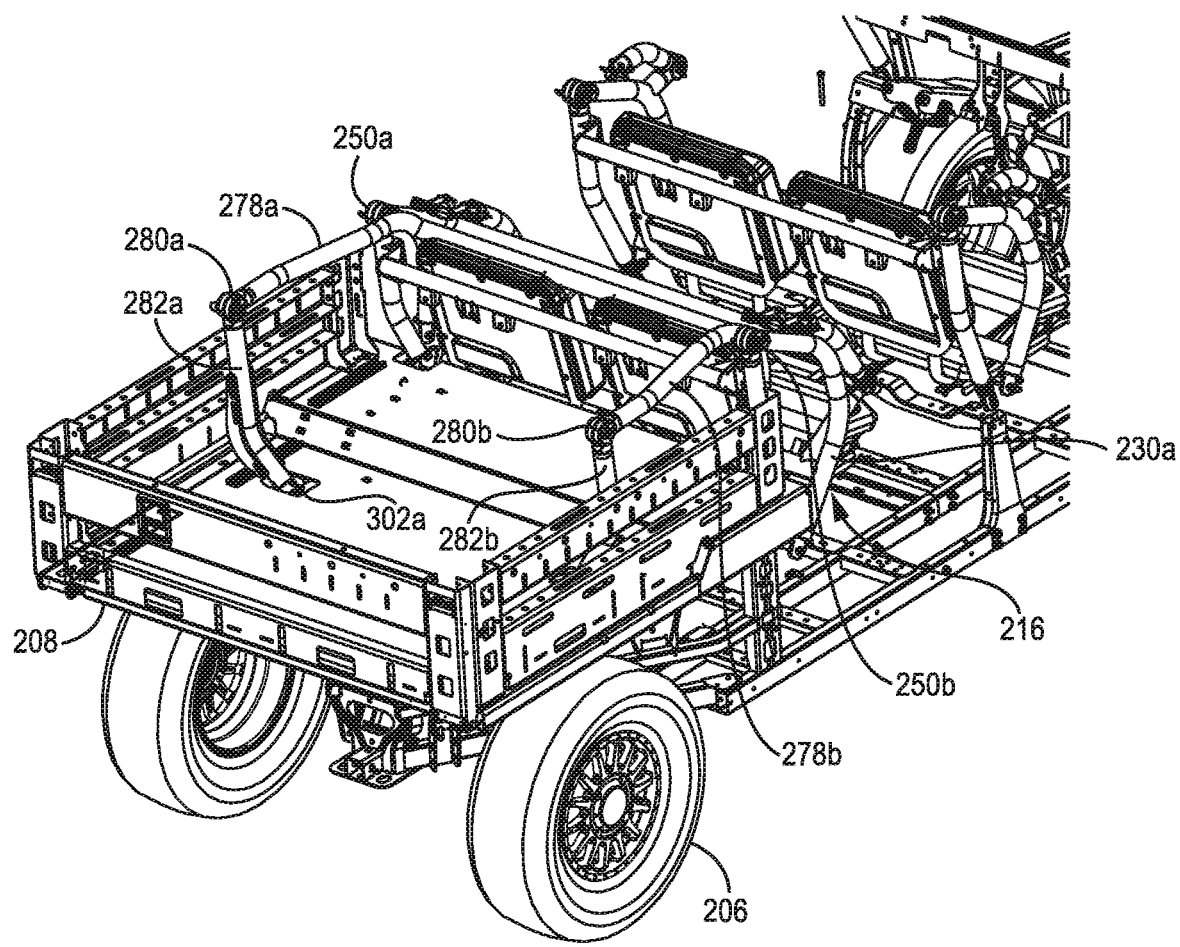
Figure 35C:
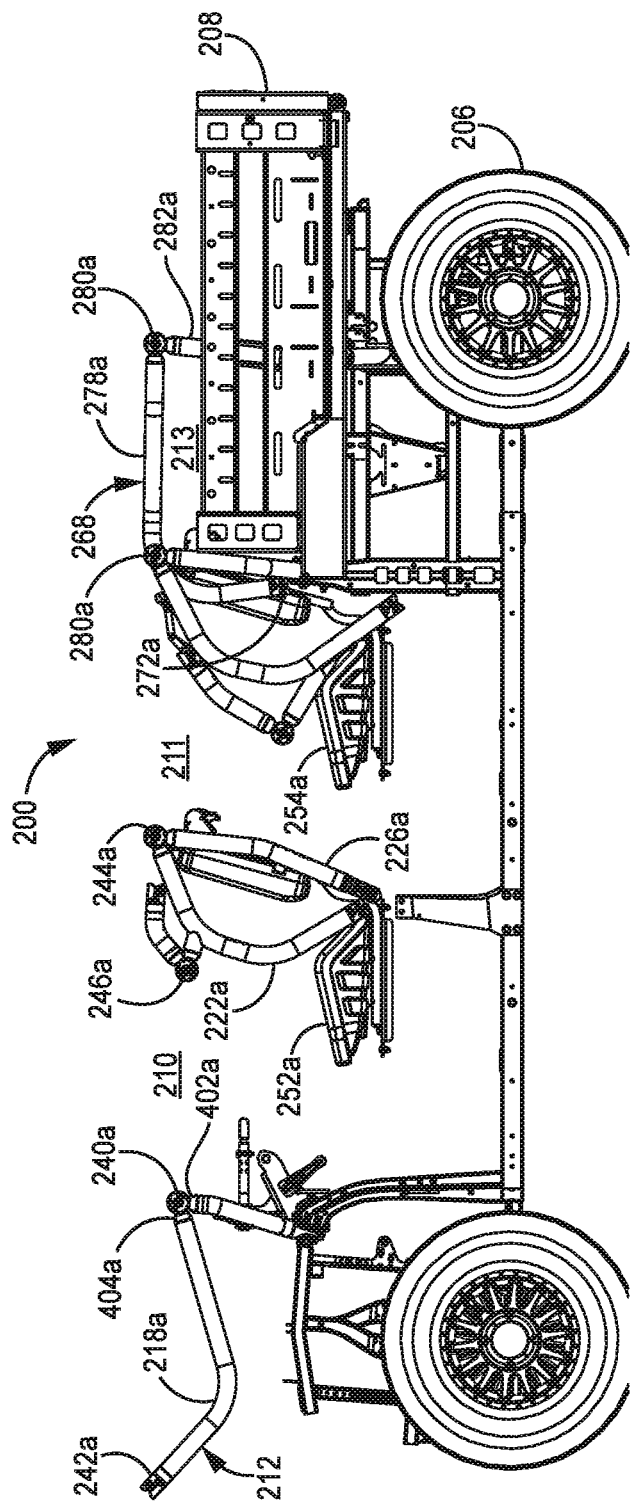
Figure 35D:
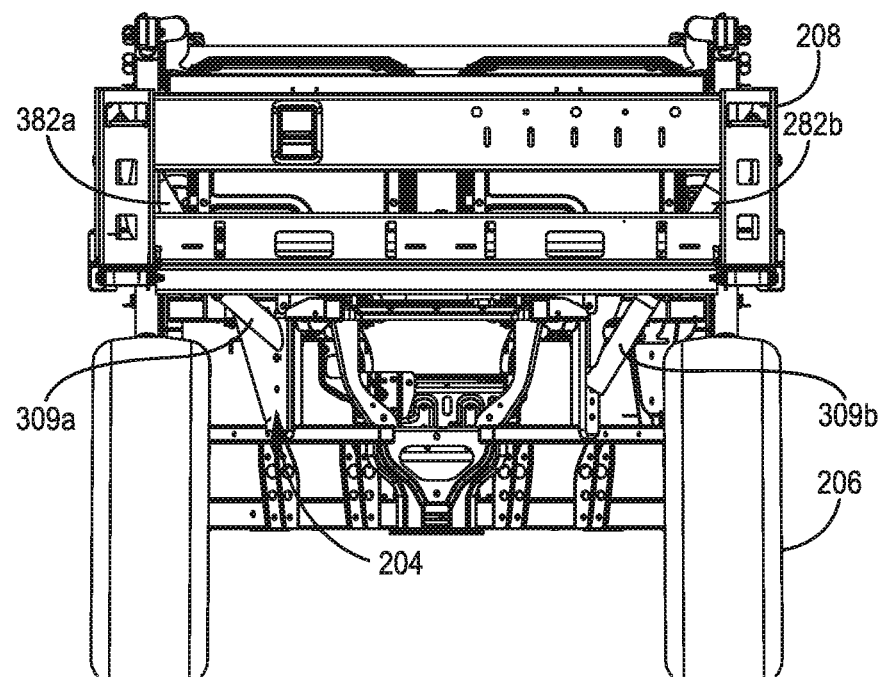
Figure 35E:
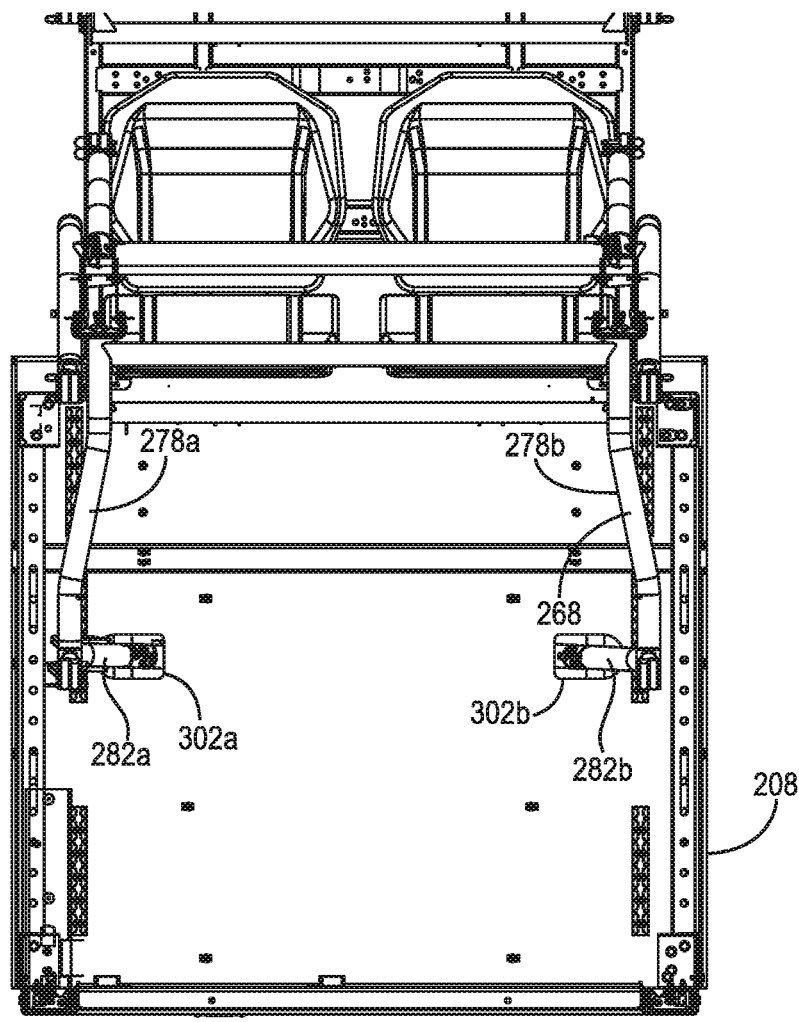
Figure 36A:
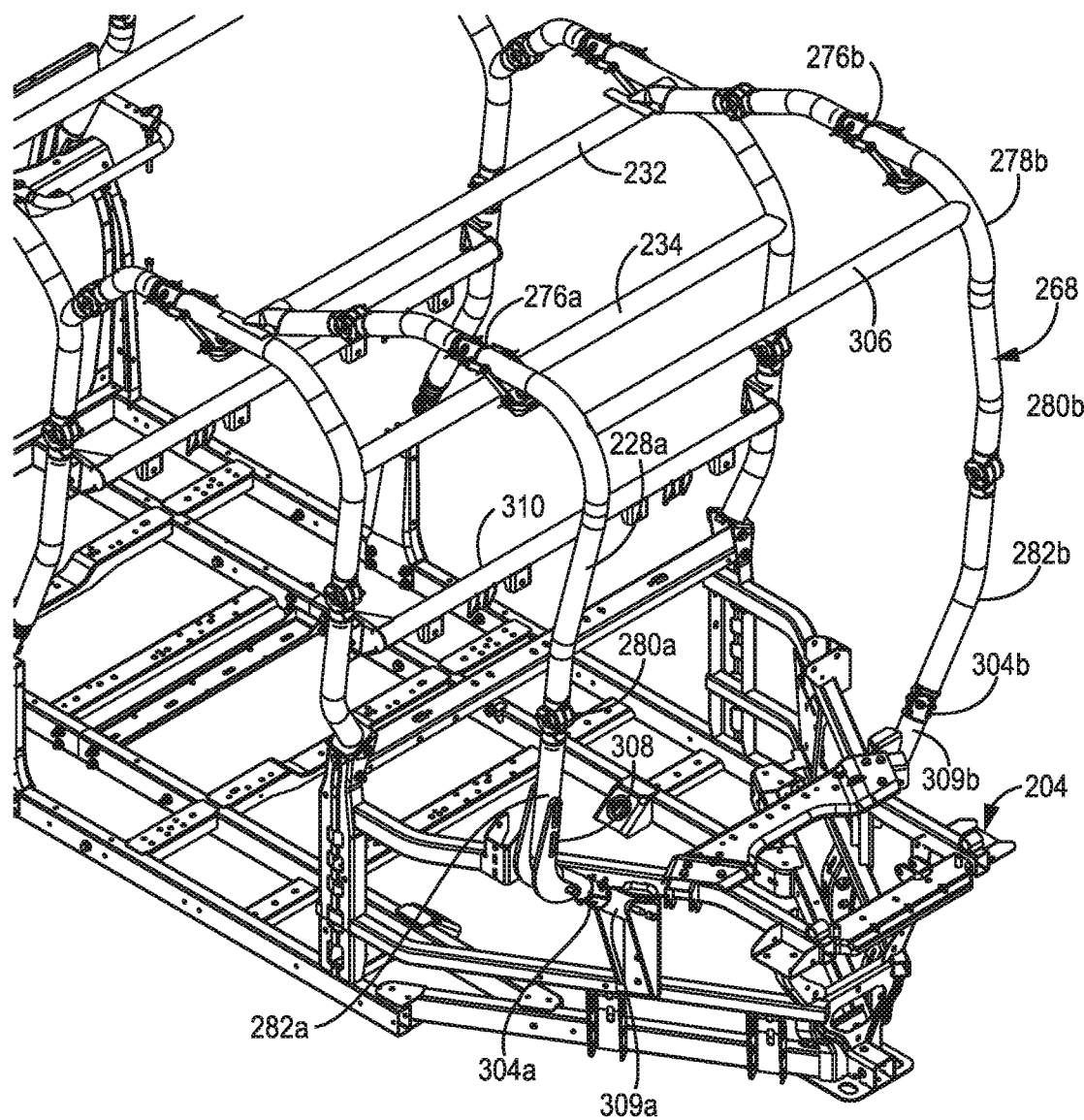
FIGS. 36A-D illustrate a partial rear perspective view (36A), a partial rear view (36B), a partial rear perspective view (36C), and a partial side view (36D) of a rear ROPS connected to the utility vehicle frame according to some embodiments.
Figure 36B:
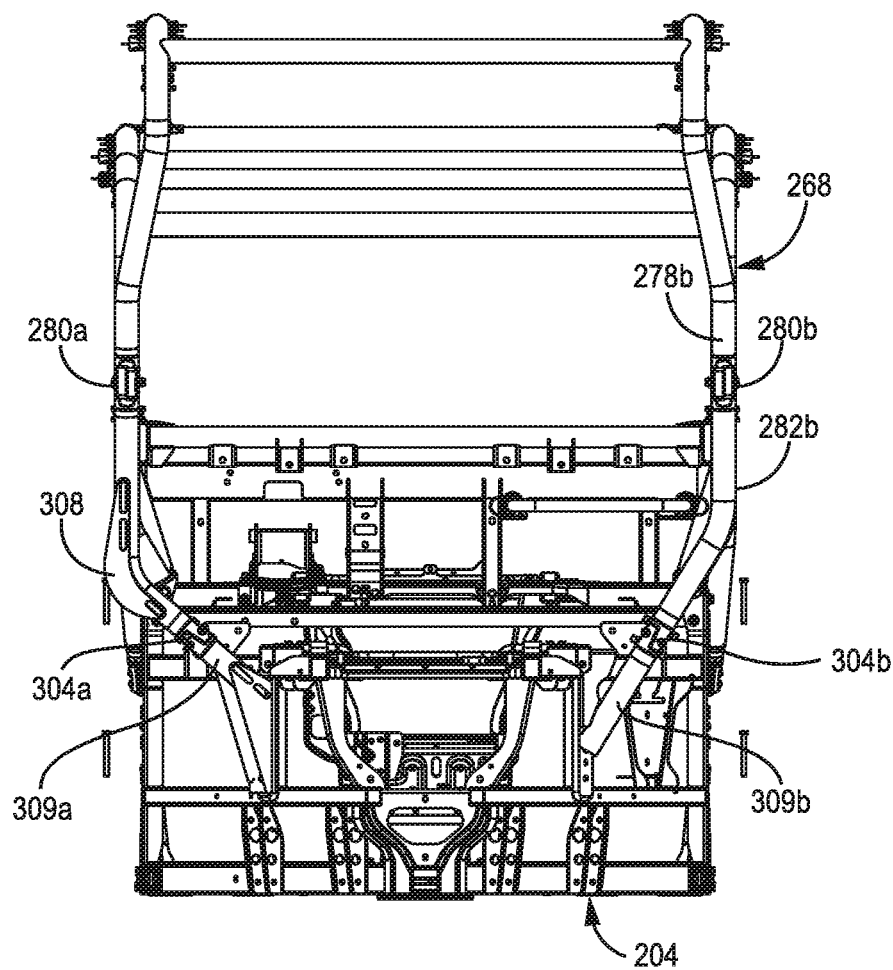
Figure 36C:
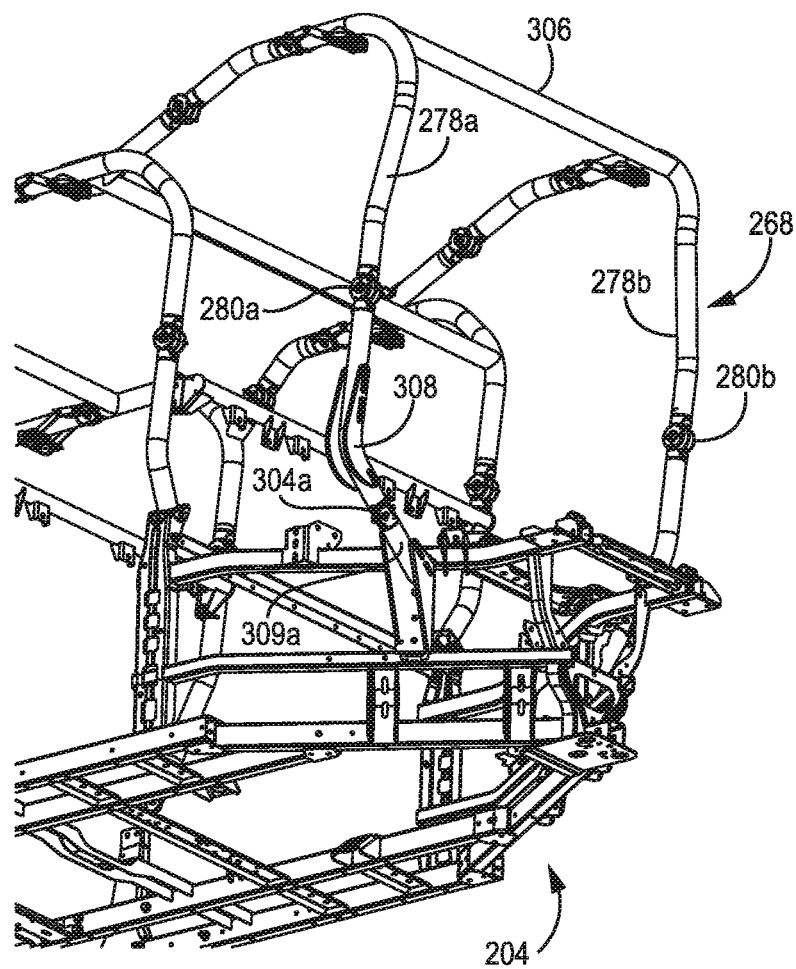
Figure 36D:
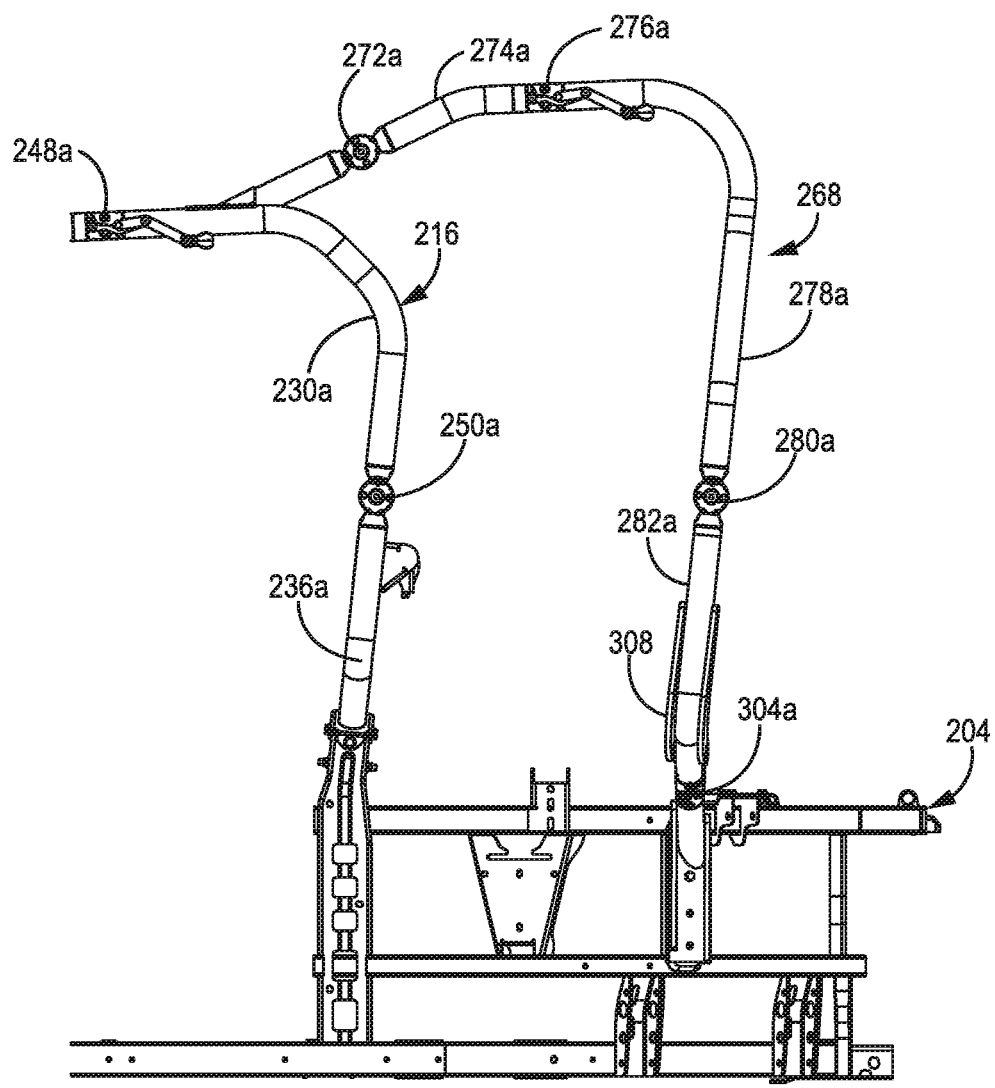
Figure 37A:
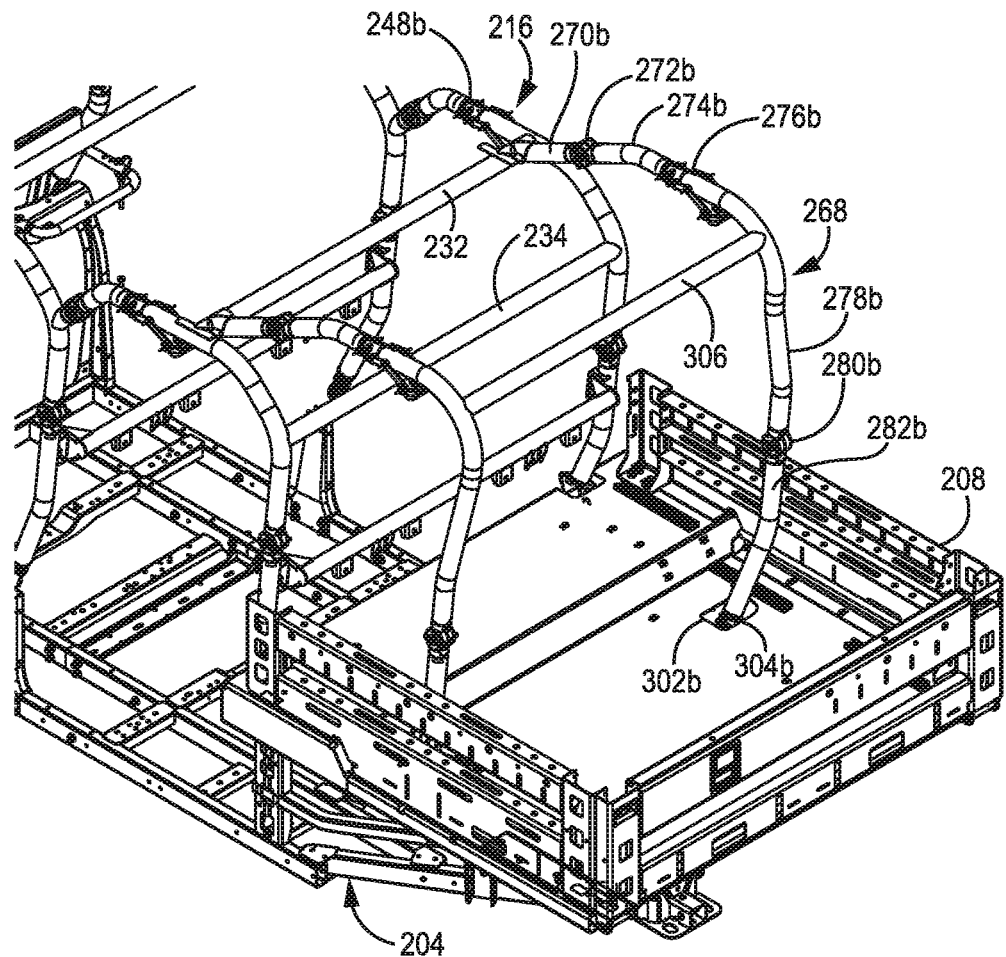
FIGS. 37A-D illustrate a partial rear perspective view (37A), a partial rear view (37B), a partial rear perspective view (37C), and a partial side view (37D) of a rear ROPS connected to the utility vehicle frame with a cargo box according to some embodiments.
Figure 37B:
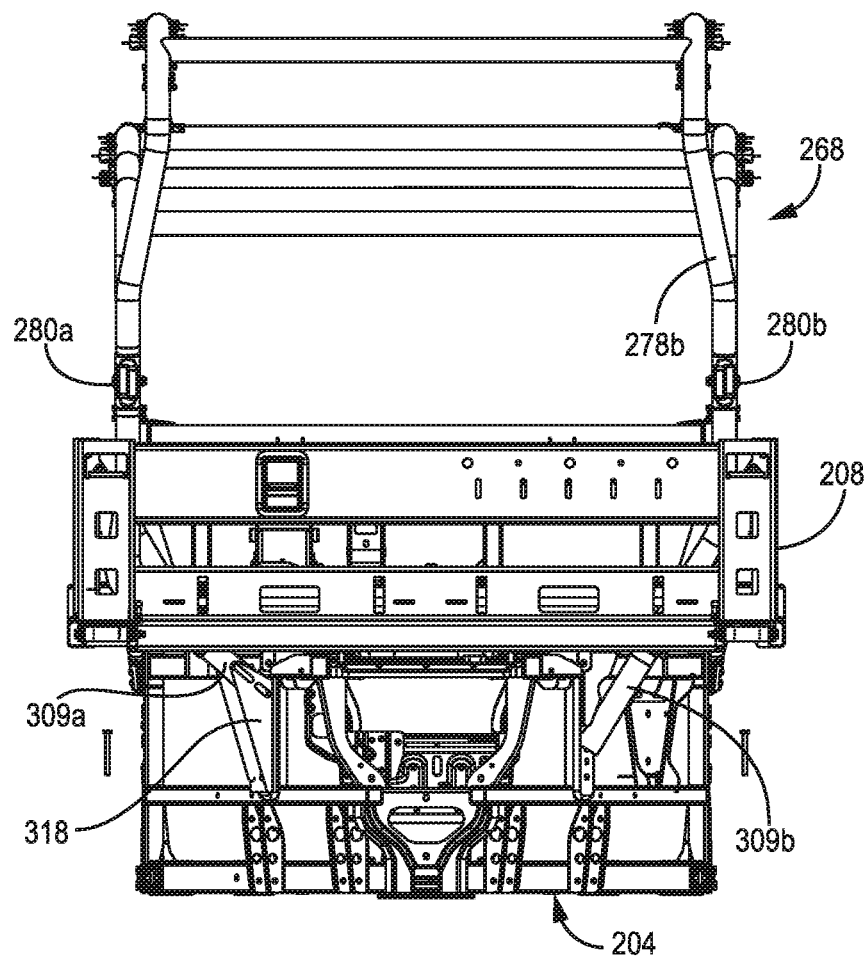
Figure 37C:
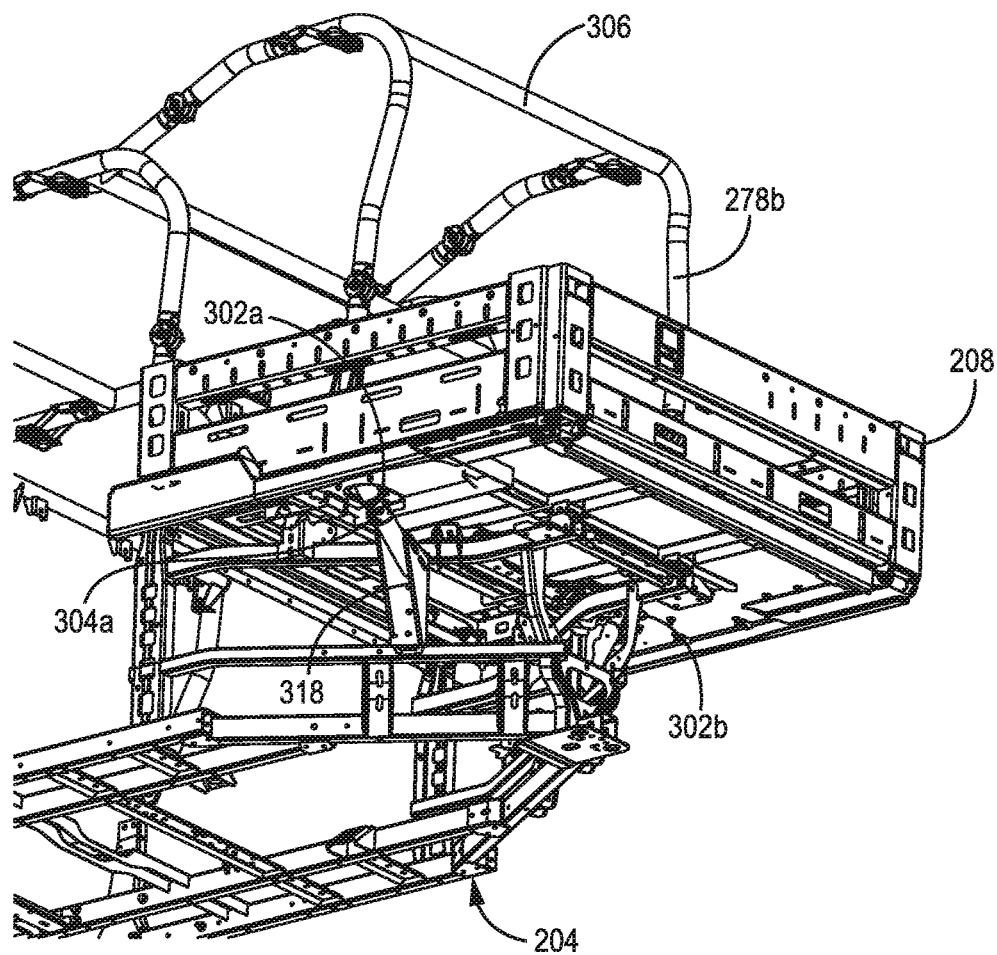
Figure 37D:
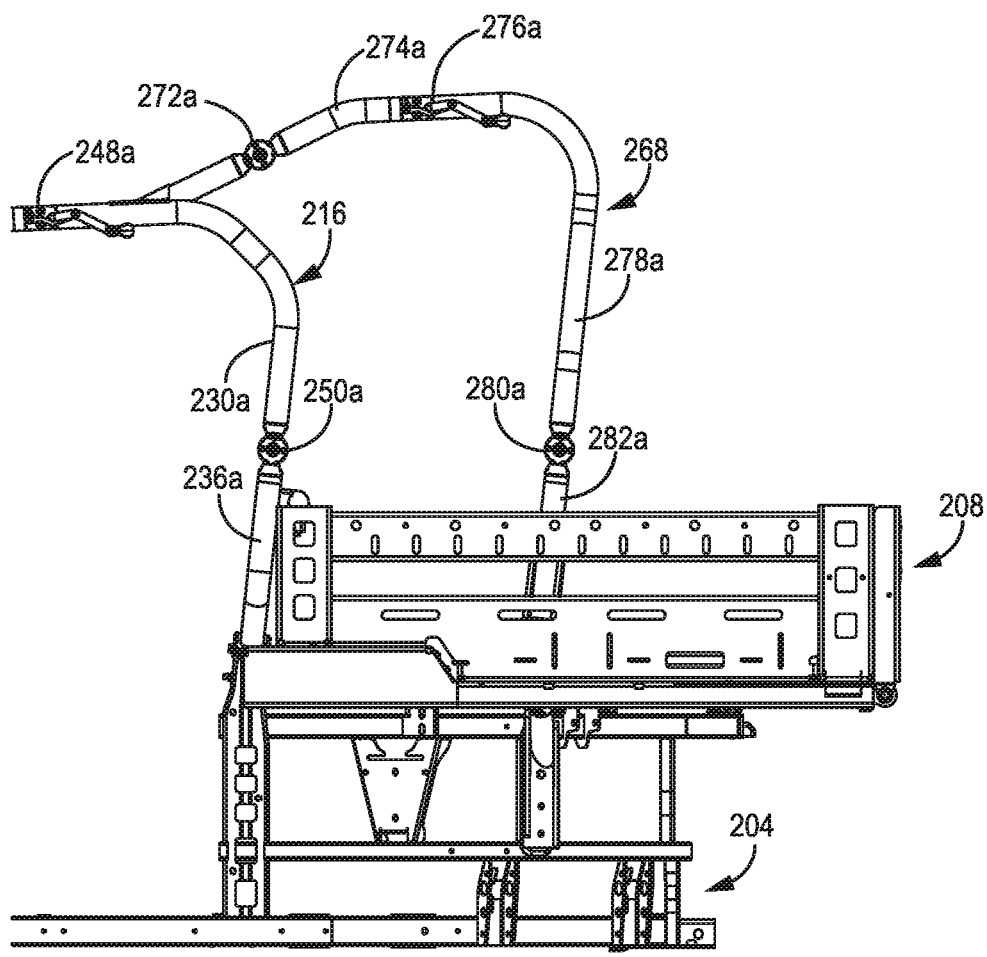

Referring to FIGS. 35A-E, a front perspective view (35A), a partial rear perspective view (35B), a side view (35C), a rear view (35D), and a top view (35E) of a utility vehicle rear ROPS portion positioned over the cargo are illustrated, area according to some embodiments. FIG. 35A shows an embodiment without body 202, with the ROPS in a folded configuration. In one embodiment, FIG. 35B shows a cargo box aperture 302a (302b not shown in this view) in which cargo box side member 282a passes through for attachment or integration with frame 204. The apertures 302a, 302b can be holes, slots, or alternatively, can be attachment points for cargo box side members 282a, 282b (see FIG. 35E). The apertures 302a, 302b can include a clearance between the cargo box 208 and cargo box side members 282a, 282b or be in contact. If in contact, the cargo box side members 282a, 282b may be connected to or attached to the cargo box 208 at or near the apertures 302a, 302b. The side view in FIG. 35C shows a folded configuration of the ROPS including a cargo box ROPS portion 268. The rear view (shown in FIG. 35D) shows lower cargo box side members 309a, 309b. The lower cargo box side members 309a, 309b may connect with cargo box side members 282a, 282b at joints 304a, 304b (see FIG. 36A for example) or be integrated with each cargo box side member as a single piece. The lower cargo box side members 309a, 309b may connect or be integrated with frame 204 at or below the base of the cargo box 208.

Each of the ROPS portions 212, 214, 216, and 268 can fold in a forward direction, a rearward direction, or positions in between. Additionally, each of the ROPS portions 212, 214, 216, and 268 may be secured in a folded or partially folded position, such as by using locking pins. In a folded position, the ROPS portions 212, 214, 216, and 268 allow for a driver to operate the vehicle, in a sitting or partially sitting position. In a folded or partially folded configuration, a driver may drive and maneuver the vehicle. A folded configuration may include any combination of the ROPS portions 212, 214, 216, and 268 being in a non-deployed or non-engaged state, even if individual ROPS portions are positioned or secured forwardly, rearwardly, or any combination of positions thereof.

Figure 40A:
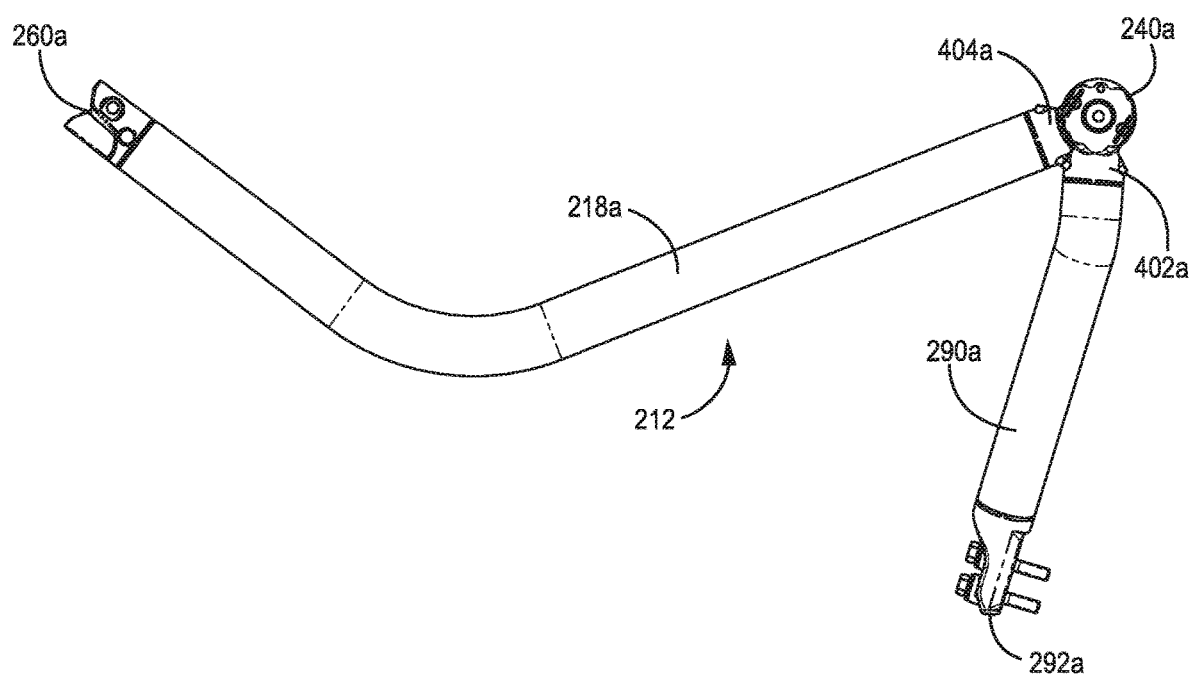
FIGS. 40A-B illustrate a side view (40A), and top view (40B) of second ROPS portion, according to some embodiments.
Figure 40B:
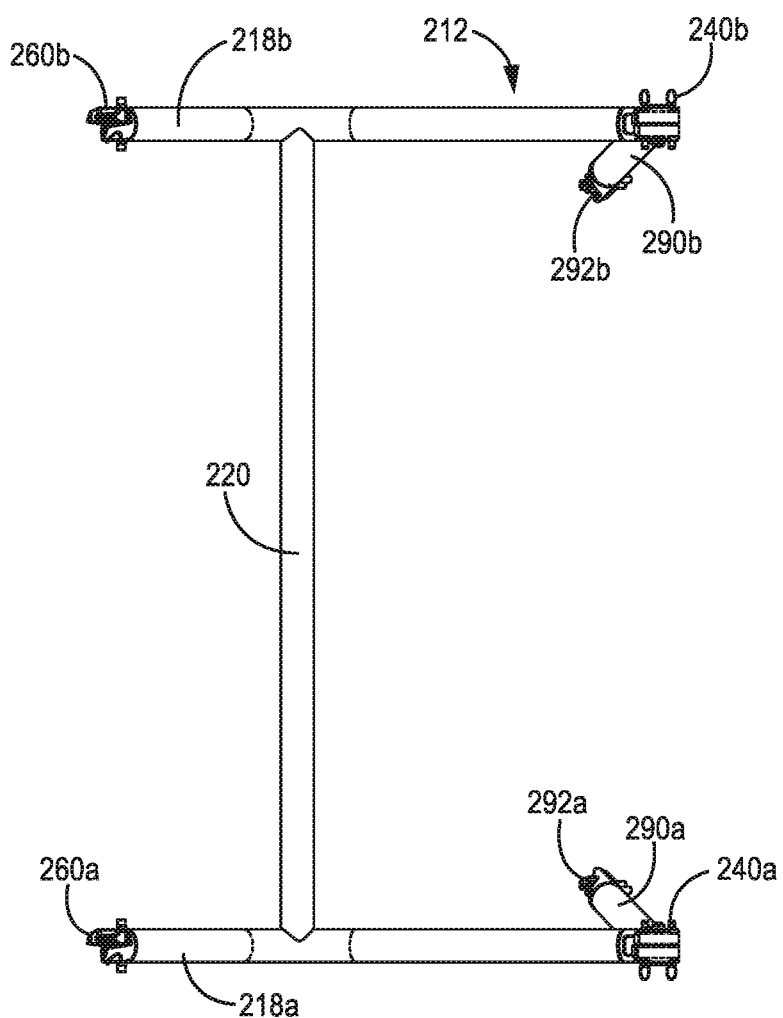

In some embodiments, each joint within ROPS portions 212, 214, 216, and 268 can include a bumpered upper portion and corresponding bumpered lower portion (see 404a, 402a of FIG. 40A or 402b and 404b of FIG. 35A, for examples). The bumpered upper and lower portions may be configured to hold a folded ROPS portion 212, 214, 216, and 268 in a specific position, even without the use of any additional locking pin or mechanism. For example, first ROPS portion 212 includes upper bumpered portions 404a, 404b that when in a folded position, contact corresponding lower bumpered portions 402a, 402b to hold the front foldable members 218a, 218b from touching or contacting a hood of the vehicle. This prevents damage to both the hood and members 218a, 218b. The bumpered portions can be a casted material and in contact or connected with tubing of any of the ROPS portions 212, 214, 216, and 268.

Referring to FIGS. 36A-D, a partial front perspective view (36A), a partial rear view (36B), a partial rear perspective view (36C), and a partial side view (36D) of a rear ROPS connected to the utility vehicle frame are illustrated, according to some embodiments. As discussed above, lower cargo box side members 309a, 309b are shown in contact with cargo box side members 282a, 282b through joints 304a, 304b. Support components 308 may be attached or integrated to provide further rigidity to the cargo box ROPS portion 268, or provide a fitting function with cargo box 208 or body 202. The cargo box ROPS portion 268 may be attached or integrated directly with the frame 204 or secured with additional support components 318 that attach to the frame 204, such as a plate or bracket.

Referring to FIGS. 37A-D, a partial front perspective view (37A), a partial rear view (37B), a partial rear perspective view (37C), and a partial side view (37D) of a rear ROPS connected to the utility vehicle frame with a cargo box are shown, according to some embodiments.

Figure 38A:
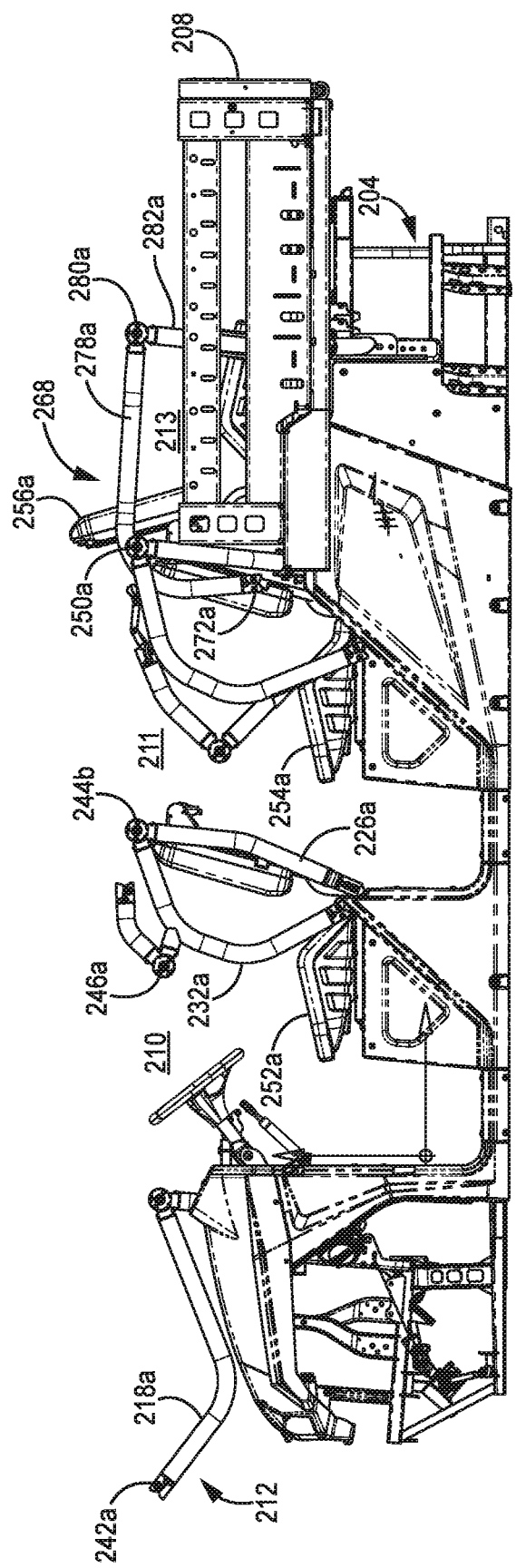
FIGS. 38A-B illustrate a partial side view (38A) and a partial top view (38B) of a utility vehicle rear ROPS portion positioned over the cargo area in a folded configuration according to some embodiments.
Figure 38B:
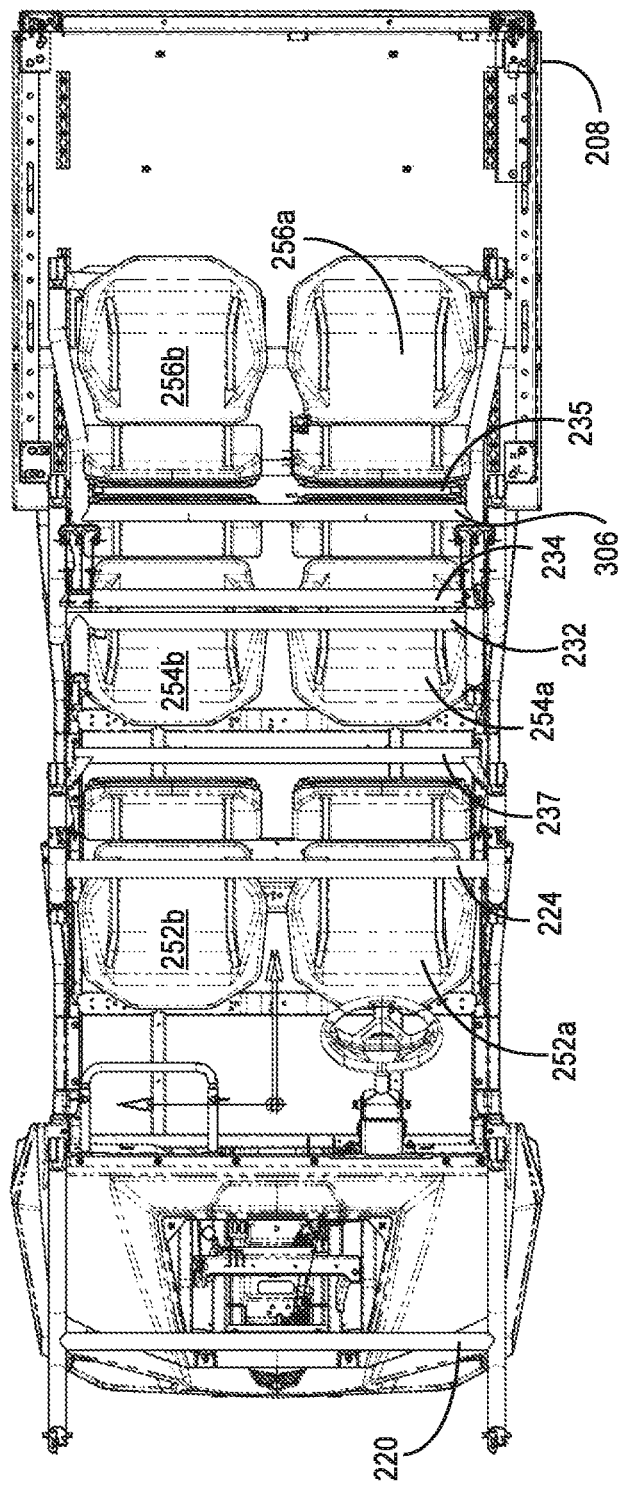

Referring to FIGS. 38A-B, a partial side view (38A) and a partial top view (38B) of a utility vehicle rear ROPS portion positioned over the cargo area in a folded configuration are shown, according to some embodiments. A side view with a folded ROPS includes at least some body 202 components. Rearward facing seats 256a, 256b may be optionally folded (not shown) when the ROPS is in a folded configuration. In one embodiment, the seats may be removed or partially removed in a folded configuration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An interlocking joint between first and second members, the interlocking joint comprising:
   a first interlocking joint component comprising:
      a first end;
      a first male component extending away from the first end and having at least a bottom surface, a side surface, and an outer surface, wherein the male component includes a locking feature extending away from the bottom surface of the male component;
      a first female component extending away from the first end and having at least a top surface and a side surface, wherein a groove/alignment feature is formed within the top surface; and
   a second interlocking joint component comprising:
      a first end;
      a second male component extending away from the first end of the second interlocking joint component and having at least a bottom surface, a side surface, and an outer surface, wherein the male component includes a locking feature extending away from the bottom surface of the male component;
      a second female component extending away from the first end and having at least a top surface and a side surface, wherein an alignment feature is formed within the top surface;
   wherein the first interlocking joint component is interlocked with the second interlocking joint component by interlocking the first male component with the second female component and the first female component with the second male component, wherein the locking feature of the first male component interlocks with the alignment feature of the second female component and the locking feature of the second male component interlocks with the alignment feature of the first female component.

2. The interlocking joint of claim 1, wherein the first female component includes a ramp portion located at an end distal from the first end that increases in height toward the groove/alignment feature located on the top surface of the first female component.

3. The interlocking joint of claim 1, wherein the first male component includes a first aperture located through a side wall of the first male component and wherein the second male component includes a second aperture located through a side wall of the second male component, wherein when interlocked the first aperture is approximately aligned with the second aperture to receive a locking pin.

4. The interlocking joint of claim 3, further including a locking mechanism utilized to retain the locking pin within the first and second apertures.

5. The interlocking joint of claim 4, wherein the locking mechanism provides a mechanical advantage for securing the locking pin within the first and second apertures.

6. The interlocking joint of claim 5, wherein the locking mechanism is an over center locking mechanism.

7. The interlocking joint of claim 1, wherein the first interlocking joint and the second interlocking joint include outer surfaces, wherein the radius of the outer surfaces are approximately equal to the radius of the first and second members connected by the interlocking joint.

8. The interlocking joint of claim 1, wherein the first interlocking joint component further includes protrusions located on opposite outer surfaces of the first interlocking joint component.

9. The interlocking joint of claim 8, further including a locking mechanism that includes a first pair of arms pivotally affixed to the second interlocking joint component on one end and a second pair of arms pivotally affixed on a first end to the first pair of arms and configured on an opposite end to contact the protrusions located on the first interlocking joint component.

10. A foldable roll-over protection system (ROPS) utilized in an utility vehicle, the ROPS comprising:
  front side members having first and second ends, wherein the first end includes a bracket for rigid attachment to the utility vehicle;
  front pivot joints connected to the second end of the front side members;
  front foldable members having first and second ends, wherein the first ends are pivotally connected to the front pivot joints, wherein the front pivot joints allow the front foldable members to pivot about the front pivot joints;
  front interlocking components connected to the second ends of the front foldable members, wherein each of the front interlocking components includes:
    a first end;
    a first male component extending away from the first end and having at least a bottom surface, a side surface, and an outer surface, wherein the male component includes a locking feature extending away from the bottom surface of the male component;
    a first female component extending away from the first end and having at least a top surface and a side surface, wherein an alignment feature is formed within the top surface for receiving the locking feature;
  rear side members having first and second ends, wherein the first end includes a bracket for rigid attachment to the utility vehicle;
  rear pivot joints connected to the second end of the rear side members;
  rear foldable members having first and second ends, wherein the first ends are pivotally connected to the rear pivot joints, wherein the rear pivot joints allow the rear foldable members to pivot about the rear pivot joints; and
  rear interlocking components connected to the second ends of the rear foldable members, wherein each of the rear interlocking components includes:
    a first end;
    a second male component extending away from the first end and having at least a bottom surface, a side surface, and an outer surface, wherein the second male component includes a locking feature extending away from the bottom surface of the second male component;
    a second female component extending away from the first end and having at least a top surface and a side surface, wherein an alignment feature is formed within the top surface for receiving the locking feature.

11. The ROPS of claim 10, wherein the front interlocking component is interlocked with the rear interlocking component by interlocking the first male component with the second female component and the first female component with the second male component, wherein the locking feature of the first male component interlocks with the alignment feature of the second female component and the locking feature of the second male component interlocks with the alignment feature of the first female component.

12. The ROPS of claim 11, wherein the first male component includes a first aperture located through a side wall of the first male component and wherein the second male component includes a second aperture located through a side wall of the second male component, wherein when interlocked the first aperture is approximately aligned with the second aperture to receive a locking pin.

13. The ROPS of claim 12, further including a locking mechanism utilized to retain the locking pin within the first and second apertures.

14. The ROPS of claim 13, wherein the locking mechanism provides a mechanical advantage for securing the locking pin within the first and second apertures.

15. The ROPS of claim 13, wherein the locking mechanism is an over center locking mechanism.

16. An off-road vehicle comprising:
  a frame;
  a passenger compartment;
  a cargo box; and
  a foldable roll-over protection system (ROPS) having a front ROPS section and a rear ROPS section, wherein in a first position the front ROPS section is folded at least partially into the passenger compartment and the rear ROPS section is folded at least partially into the passenger compartment, wherein in a second position the front ROPS section is connected to the rear ROPS section;
  a front interlocking joint component connected to the front ROPS and a rear interlocking joint component connected to the rear ROPS, wherein the front interlocking joint component and the rear interlocking joint component are mirrored components having features that allow the front interlocking joint component to be interlocked with the rear interlocking joint component to interlock the front ROPS and the rear ROPS in the second position.

17. The off-road vehicle of claim 16, wherein a height of the ROPS in the folded first position is less than 60" from the ground plane with the vehicle at curb-weight.

18. The off-road vehicle of claim 16, wherein the front interlocking joint component comprises:
  a first end connected to the front ROPS section;
  a first male component extending away from the first end and having at least a bottom surface, a side surface, and an outer surface, wherein the male component includes a locking feature extending away from the bottom surface of the male component; and
  a first female component extending away from the first end and having at least a top surface and a side surface, wherein an alignment feature is formed within the top surface for receiving the locking feature.

19. The off-road vehicle of claim 18, wherein the rear interlocking joint component comprises:
- a first end connected to the rear ROPS section;
- a second male component extending away from the first end and having at least a bottom surface, a side surface, and an outer surface, wherein the second male component includes a locking feature extending away from the bottom surface of the second male component; and
- a second female component extending away from the first end and having at least a top surface and a side surface, wherein an alignment feature is formed within the top surface for receiving the locking feature.

20. The off-road vehicle of claim 19, wherein the first interlocking joint component is interlocked with the second interlocking joint component by interlocking the first male component with the second female component and the first female component with the second male component, wherein the locking feature of the first male component interlocks with the alignment feature of the second female component and the locking feature of the second male component interlocks with the alignment feature of the first female component.

* * * * *